(12) United States Patent
Kawamoto

(10) Patent No.: US 7,203,798 B2
(45) Date of Patent: Apr. 10, 2007

(54) DATA MEMORY CACHE UNIT AND DATA MEMORY CACHE SYSTEM

(75) Inventor: Takuji Kawamoto, Nagoya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 303 days.

(21) Appl. No.: 10/802,930

(22) Filed: Mar. 18, 2004

(65) Prior Publication Data

US 2004/0186959 A1 Sep. 23, 2004

(30) Foreign Application Priority Data

Mar. 20, 2003 (JP) .............................. 2003-078026

(51) Int. Cl.
*G06F 12/00* (2006.01)
(52) U.S. Cl. ...................... 711/123; 711/126; 711/143
(58) Field of Classification Search ................ 711/123, 711/126, 132, 143
See application file for complete search history.

(56) References Cited

U.S. PATENT DOCUMENTS

| | | | |
|---|---|---|---|
| 4,701,844 A * | 10/1987 | Thompson et al. | 711/119 |
| 5,603,004 A * | 2/1997 | Kurpanek et al. | 711/118 |
| 5,706,465 A * | 1/1998 | Kurokawa et al. | 711/123 |
| 7,065,613 B1 * | 6/2006 | Flake et al. | 711/132 |
| 2003/0191902 A1 * | 10/2003 | Snyder et al. | 711/144 |
| 2004/0186959 A1 * | 9/2004 | Kawamoto | 711/132 |

FOREIGN PATENT DOCUMENTS

| | | |
|---|---|---|
| JP | 5-143330 | 6/1993 |
| JP | 2001-222467 | 8/2001 |

* cited by examiner

*Primary Examiner*—Brian R. Peugh
(74) *Attorney, Agent, or Firm*—Wenderoth, Lind & Ponack, L.L.P.

(57) ABSTRACT

A data memory cache unit is provided which is capable of heightening the speed of memory access. The cache unit 117 executes reading and writing of data in a 16-byte width line unit in a main memory unit 131, executes reading and writing of data in an MPU 113 in the unit of a four-byte width small area included in each line. When the MPU 113 executes a push instruction, if a cache miss takes place on a line which includes a small area that holds data which should be read out to the MPU 113 (NO at S1), then the cache unit 117 opens the line (S301). If a small area into which the data sent from the MPU 113 should be written is adjacent to a line boundary on the side where an address is larger or on the side where write-in is earlier executed (YES at S56), then the cache unit 117 does not execute a refill, and if this small area is not adjacent to the line boundary (NO at S56), then it executes a refill (S21).

32 Claims, 38 Drawing Sheets

FIG.2

|   | INSTRUCTION | OPERATION |
|---|---|---|
| (a) | PUSH Rn,[−Rm] | Rm=Rm−4<br>[Rm]=Rn<br>PUSH/POP MODIFIER=1 |
| (b) | POP [Rn+],Rm | PUSH/POP MODIFIER=1<br>Rm=[Rn]<br>Rn=Rn+4 |
| (c) | LOAD [Rn+OFFSET],Rm | SP-RELATIVE MODIFIER=1<br>Rm=[Rn+OFFSET] |
| (d) | STORE Rn,[Rm+OFFSET] | [Rm+OFFSET]=Rn<br>SP-RELATIVE MODIFIER=1 |

FIG.3

| | CACHE-READ DEMAND | CACHE-WRITE DEMAND | PUSH/POP MODIFIER | SP-RELATIVE MODIFIER | INSTRUCTION/ OPERATION |
|---|---|---|---|---|---|
| (a) | 0 | 0 | × | × | — |
| (b) | 0 | 1 | 0 | 0 | RANDOM WRITE |
| (c) | 0 | 1 | 0 | 1 | SP-RELATIVE WRITE |
| (d) | 0 | 1 | 1 | 0 | PUSH |
| (e) | 0 | 1 | 1 | 1 | — |
| (f) | 1 | 0 | 0 | 0 | RANDOM READ |
| (g) | 1 | 0 | 0 | 1 | SP-RELATIVE READ |
| (h) | 1 | 0 | 1 | 0 | POP |
| (i) | 1 | 0 | 1 | 1 | — |
| (j) | 1 | 1 | × | × | — |

FIG.7

| | LINE STATE | | | MEANING |
|---|---|---|---|---|
| | VALID FLAG | DIRTY FLAG | STACK FLAG | |
| (a) | 0 | 0 | 0 | THE CONTENTS OF THE MEMORY INDICATED BY THE TAG ARE NEWER THAN THE CONTENTS OF THE LINE (THIS LINE IS NOW OPENED) |
| (b) | 0 | 0 | 1 | THE LINE WAS ALLOCATED TO THE STACK. THE CONTENTS OF THE MEMORY INDICATED BY THE TAG ARE NEWER THAN THE CONTENTS OF THE LINE (THIS LINE IS NOW OPENED) |
| (c) | 0 | 1 | 0 | — |
| (d) | 0 | 1 | 1 | — |
| (e) | 1 | 0 | 0 | THE CONTENTS OF THE MEMORY INDICATED BY THE TAG COINCIDE WITH THE CONTENTS OF THE LINE |
| (f) | 1 | 0 | 1 | THE LINE IS ALLOCATED TO THE STACK. THE CONTENTS OF THE MEMORY INDICATED BY THE TAG COINCIDE WITH THE CONTENTS OF THE LINE |
| (g) | 1 | 1 | 0 | THE CONTENTS OF THE LINE ARE NEWER THAN THE CONTENTS OF THE MEMORY INDICATED BY THE TAG |
| (h) | 1 | 1 | 1 | THE LINE IS ALLOCATED TO THE STACK. THE CONTENTS OF THE LINE ARE NEWER THAN THE CONTENTS OF THE MEMORY INDICATED BY THE TAG |

FIG.9

| | LINE STATE | | | OPERATION | |
|---|---|---|---|---|---|
| | VALID FLAG | DIRTY FLAG | STACK FLAG | RANDOM READ | RANDOM WRITE |
| (a) | NOT ALLOCATED | | | DECISION OF THE LINE TO BE OPENED, OPENING OF THE DECIDED LINE, REFILL, OPERATION OF (b) | DECISION OF THE LINE TO BE OPENED, OPENING OF THE DECIDED LINE, REFILL, OPERATION OF (b) |
| (b) | 1 | 0 | 0 | DATA READ | DATA WRITE   d=1 |
| (c) | 1 | 0 | 1 | DATA READ   s=0 | DATA WRITE  d=1 s=0 |
| (d) | 1 | 1 | 0 | DATA READ | DATA WRITE |
| (e) | 1 | 1 | 1 | DATA READ   s=0 | DATA WRITE   s=0 |
| (f) | 0 | 0 | 0 | REFILL   v=1<br>DATA READ | REFILL   v=1<br>DATA WRITE   d=1 |
| (g) | 0 | 0 | 1 | REFILL   v=1<br>DATA READ   s=0 | REFILL   v=1<br>DATA WRITE  d=1 s=0 |

FIG.10

| | LINE STATE | | | OPERATION | |
|---|---|---|---|---|---|
| | VALID FLAG | DIRTY FLAG | STACK FLAG | SP MOVES UP (SP−TAG≧4WORDS) | OPENING OF THE LINE |
| (a) | NOT ALLOCATED | | | | — |
| (b) | 1 | 0 | 0 | | v=0 |
| (c) | 1 | 0 | 1 | | v=0 s=0 |
| (d) | 1 | 1 | 0 | WRITE-BACK d=0 | WRITE-BACK v=0 d=0 |
| (e) | 1 | 1 | 1 | WRITE-BACK d=0 | WRITE-BACK v=0 d=0 s=0 |
| (f) | 0 | 0 | 0 | | |
| (g) | 0 | 0 | 1 | | s=0 |

FIG.13

| | LINE STATE | | | OPERATION | |
|---|---|---|---|---|---|
| | VALID FLAG | DIRTY FLAG | STACK FLAG | SP-RELATIVE READ | SP-RELATIVE WRITE |
| (a) | NOT ALLOCATED | | | DECISION OF THE LINE TO BE OPENED, OPENING OF THE DECIDED LINE, REFILL, OPERATION OF (b) | DECISION OF THE LINE TO BE OPENED, OPENING OF THE DECIDED LINE, REFILL, OPERATION OF (b) |
| (b) | 1 | 0 | 0 | DATA READ | DATA WRITE  d=1 |
| (c) | 1 | 0 | 1 | DATA READ | DATA WRITE  d=1 |
| (d) | 1 | 1 | 0 | DATA READ | DATA WRITE |
| (e) | 1 | 1 | 1 | DATA READ | DATA WRITE |
| (f) | 0 | 0 | 0 | REFILL  v=1 DATA READ | REFILL  v=1 DATA WRITE  d=1 |
| (g) | 0 | 0 | 1 | REFILL  v=1 DATA READ | REFILL  v=1 DATA WRITE  d=1 |

FIG.16

| | LINE STATE | | | OPERATION | |
|---|---|---|---|---|---|
| | VALID FLAG | DIRTY FLAG | STACK FLAG | POP OUT OF THE HIGHEST ADDRESS | POP OUT OF OTHER THAN THE HIGHEST ADDRESS |
| (a) | NOT ALLOCATED | | | DECISION OF THE LINE TO BE OPENED, OPENING OF THE DECIDED LINE, REFILL, v=1 d=0 s=1, DATA READ | DECISION OF THE LINE TO BE OPENED, OPENING OF THE DECIDED LINE, REFILL, v=1 d=0, DATA READ |
| (b) | 1 | 0 | 0 | DATA READ  v=0  s=1 | DATA READ |
| (c) | 1 | 0 | 1 | DATA READ  v=0 | DATA READ |
| (d) | 1 | 1 | 0 | DATA READ  v=0  d=0  s=1 | DATA READ |
| (e) | 1 | 1 | 1 | DATA READ  v=0  d=0 | DATA READ |
| (f) | 0 | 0 | 0 | REFILL  v=1 DATA READ  v=0  s=1 | REFILL  v=1 DATA READ |
| (g) | 0 | 0 | 1 | REFILL  v=1 DATA READ  v=0 | REFILL  v=1 DATA READ |

FIG.18

| | LINE STATE | | | OPERATION | |
|---|---|---|---|---|---|
| | VALID FLAG | DIRTY FLAG | STACK FLAG | SP WENT AWAY DOWNWARD (TAG−SP≧12WORDS) | SP CAME CLOSE FROM BELOW (TAG−SP≦8WORDS) |
| (a) | \multicolumn{3}{l|}{NOT ALLOCATED} | | DECISION OF THE LINE TO BE OPENED, OPENING OF THE DECIDED LINE, OPERATION OF (g) |
| (b) | 1 | 0 | 0 | | |
| (c) | 1 | 0 | 1 | | |
| (d) | 1 | 1 | 0 | | |
| (e) | 1 | 1 | 1 | WRITE-BACK d=0 | |
| (f) | 0 | 0 | 0 | | |
| (g) | 0 | 0 | 1 | | REFILL v=1 |

FIG.21

| | LINE STATE | | | OPERATION | |
|---|---|---|---|---|---|
| | VALID FLAG | DIRTY FLAG | STACK FLAG | PUSH INTO THE HIGHEST ADDRESS | PUSH INTO OTHER THAN THE HIGHEST ADDRESS |
| (a) | \multicolumn{3}{c}{NOT ALLOCATED} | | DECISION OF THE LINE TO BE OPENED, OPENING OF THE DECIDED LINE, v=1 d=0 s=0, OPERATION OF (b) | DECISION OF THE LINE TO BE OPENED, OPENING OF THE DECIDED LINE, REFILL, v=1 d=0 s=0, OPERATION OF (b) |
| (b) | 1 | 0 | 0 | DATA WRITE  d=1 s=1 | DATA WRITE  d=1 |
| (c) | 1 | 0 | 1 | DATA WRITE  d=1 | DATA WRITE  d=1 |
| (d) | 1 | 1 | 0 | DATA WRITE  s=1 | DATA WRITE |
| (e) | 1 | 1 | 1 | DATA WRITE | DATA WRITE |
| (f) | 0 | 0 | 0 | v=1 DATA WRITE  d=1 s=1 | REFILL  v=1 DATA WRITE  d=1 |
| (g) | 0 | 0 | 1 | v=1 DATA WRITE  d=1 | REFILL  v=1 DATA WRITE  d=1 |

FIG.28

| | |
|---|---|
| ⋮ | LOWER ADDRESS |
| ⋮ | ⋮ |
| STACK FRAME | NOT ALLOCATED |
| STACK FRAME | NOT ALLOCATED |
| REGISTER RETREAT | v=1　d=1　s=1 |
| REGISTER RETREAT | v=1　d=1　s=1 |
| RETURN ADDRESS | v=1　d=1　s=1 |
| SERIES OF ARGUMENTS | v=1　d=1　s=1 |
| SERIES OF ARGUMENTS | v=1　d=1　s=1 |
| STACK FRAME | ⋮ |
| STACK FRAME | ⋮ |
| REGISTER RETREAT | ⋮ |
| REGISTER RETREAT | ⋮ |
| RETURN ADDRESS | ⋮ |
| SERIES OF ARGUMENTS | ⋮ |
| SERIES OF ARGUMENTS | ⋮ |
| ⋮ | ⋮ |
| ⋮ | UPPER ADDRESS (STACK BOTTOM) |

FIG.29

| | |
|---|---|
| ⋮ | |
| ⋮ | |
| STACK FRAME | v=1  d=1  s=0 |
| STACK FRAME | v=1  d=1  s=0 |
| REGISTER RETREAT | v=1  d=1  s=1 |
| REGISTER RETREAT | v=1  d=1  s=1 |
| RETURN ADDRESS | v=1  d=1  s=1 |
| SERIES OF ARGUMENTS | v=1  d=1  s=0 |
| SERIES OF ARGUMENTS | v=1  d=1  s=0 |
| STACK FRAME | |
| STACK FRAME | |
| REGISTER RETREAT | |
| REGISTER RETREAT | |
| RETURN ADDRESS | |
| SERIES OF ARGUMENTS | |
| SERIES OF ARGUMENTS | |
| ⋮ | |
| ⋮ | |
| ⋮ | |

LOWER ADDRESS

UPPER ADDRESS
(STACK BOTTOM)

DATA MEMORY CACHE UNIT AND DATA MEMORY CACHE SYSTEM

BACKGROUND OF THE INVENTION

1. Field of the Invention

The present invention relates to a memory cache (or cache memory) unit and such a system which are capable of, when a CPU accesses a main memory unit, preventing the low access speed of the main memory unit from causing an overhead, and thus, improving its performance.

Particularly, the present invention relates to a cache for a data memory which stores data. More specifically, it relates to a cache for a so-called stack memory, or a data memory in which addresses are consecutively accessed (i.e., data are read from or written in consecutive addresses) by push-pop instructions.

2. Description of the Related Art

Aiming at reducing the time necessary for execution of push-pop instructions and avoiding holding unnecessary data in a cache after the push-pop, the following stack-cache control method and stack cache have been known conventionally. For example, a microcomputer system including a microcomputer executes data processing by supporting a stack structure in which the data inputted last is first outputted as a data structure in a main memory unit, and by distinguishing the input of data in a stack as a push and the output of data from the stack as a pop, from the other data writing/read-out. In the control method of this system, when the microcomputer pushes, the cache memory holds a set of the corresponding address and data instead of the main memory unit. Then, the hold data which has not been pushed into the main memory unit is pushed into the main memory unit by the microcomputer at a suitable time while its access is not being given to the outside. When the microcomputer pops, if the corresponding data is held, the data is outputted to the microcomputer from the cache memory instead of the main memory unit. Then, the microcomputer pops it from the main memory unit at a suitable time while its access is not being given to the outside, so that the data which has become unnecessary as a result of the microcomputer's pop is replaced with the data at the bottom part of the stack which may be popped later (e.g., refer to Patent Document 1).

Herein, Patent Document 1 is Japanese Patent Laid-Open No. 5-143330 specification.

However, the above described conventional stack-cache system and stack-cache control method do not differ at all from generally-used methods for heightening the speed of memory access based on random access to a data memory. In other words, they could not make good use of the feature of regular access which a stack memory has. This has presented a disadvantage in that it is difficult to execute processing at higher speed.

This disadvantage becomes serious, especially, in a memory system which uses the stack access to a great extent, such as a Java (which is a registered trademark) system. In recent years, the needs of the Java system or the like have become greater, especially for ubiquitous computing or the like. Specific disadvantages will be described below.

(First Disadvantage)

For example, let's assume that the push of data into a stack has been executed in the direction where memory addresses increase in the main memory unit. In addition, this stack is assumed to be cached in a cache memory. Then, a cache miss is assumed to have been made by the push of data A. On this condition, the contents of one cache-unit of new data memory from the memory address in which the cache miss has taken place are read into the cache memory from the main memory unit.

This state is shown in FIG. 35. FIG. 35 shows that a stack pointer 913 is at the memory area of an address 90, and the data A is kept pushed in the memory area of the address 90. At this time, as shown in FIG. 35, the push of the data A allows the stack pointer 913 to move from the memory area of an address 89 to the memory area of the address 90.

As shown in FIG. 35, the memory area of addresses 90, 91, 92 and 93 is one cache-unit. As the memory area of the address 90 of this cache-unit has been accessed, this cache-unit made up of the memory area of the addresses 90, 91, 92 and 93 is read into the cache memory from the main memory unit.

However, the following data push will write on top of, and thus delete, the contents of this cache-unit of new data memory read into the cache memory, according to the regularity of stack access. In other words, the contents are the data which will not be read out at all. Reading such data never to be read out into the cache memory from the main memory unit has a harmful effect on the realization of speedier memory access.

(Second Disadvantage)

Oppositely from the above description, let's assume that the pop of data from a stack has been executed in the direction where memory addresses decrease in the main memory unit. In addition, this stack is assumed to be cached in a cache memory. Then, a cache miss is assumed to have been made by the pop h of data B. On this condition, the contents of one cache-unit of data memory from a larger memory address than the memory address in which the cache miss has taken place are written back to the cache memory from the main memory unit.

This state is shown in FIG. 36. As shown in FIG. 36, the pop of the data B allows a stack pointer 923 to move from the memory area of the address 90 to the memory area of the address 89. As shown in FIG. 36, the memory area of the addresses 90, 91, 92 and 93 is one cache-unit. As the stack pointer 923 has moved to the memory area of the address 89 other than this cache-unit, this cache-unit made up of the memory area of the addresses 90, 91, 92 and 93 is written back to the main memory unit from the cache memory. Thus, the cache memory is opened.

However, the contents of this cache-unit of data memory written back to the main memory unit, according to the regularity of stack access is the contents which have been read out by the already-executed data pop. They will not be read out again at all. Writing back such data never to be read out to the main memory unit from the cache memory has a harmful effect on the realization of speedier memory access.

(Third Disadvantage)

Furthermore, let's assume that the push of data into a stack has been executed in the direction where memory addresses increase in the main memory unit. In addition, this stack is assumed to be cached in a cache memory. Then, the pushes of data C, D, . . . , E have been consecutively executed. On this condition, in the memory area of lower addresses than the address indicated with a stack pointer which is the area where a push-pop is currently executed in the stack, many pieces of stack-pushed data are stored, i.e., C or D in this example. It is not highly probable that these pieces of data stored in the memory area of lower addresses will be read out by a pop for a while.

This state is shown in FIG. 37. FIG. 37 shows that a stack pointer 933 is at the memory area of an address 194, and the data C, D, . . . , E is kept consecutively pushed, for example, from the memory area of an address 80 way below, up to this memory area of the address 194. As shown in FIG. 37, one cache-unit from the address 80 up to the address 83 usually keeps occupying its cache memory area unless the cache memory becomes full, so that it cannot written back to the main memory unit. Then, the cache-unit is only written back to the main memory unit to vacate the cache memory for another memory area, when the cache memory has been filled up.

Thus, after the cache memory has become zero and a demand for a new cache memory area has been made, write-back is executed. This has a harmful effect on the realization of speedier memory access.

For example, as shown in FIG. 37, the memory area way below the memory area of the address 194 in the present position of the stack pointer 933, for example, the memory area of addresses 80 to 83, will not highly probably be read out by a pop for the present. Therefore, different from the prior art disclosed in Patent Document 1, for example, the contents of one cache-unit of cache memory which is the memory area of the addresses 80 to 83 can be written back beforehand to the main memory unit, as a means of resolving the above described disadvantage. This could make the speed of memory access higher than in the case where, when a cache memory has almost been filled up, the contents of the cache memory are written in a rush into the main memory unit so that its empty space can be created.

(Fourth Disadvantage)

Moreover, let's assume that the pop of data from a stack has been executed in the direction where memory addresses decrease in the main memory unit. In addition, this stack is assumed to be cached in a cache memory. Then, the pops of data F, G, . . . , H have been consecutively executed.

On this condition, the data which is stack-pushed into the address area which has lower values than the address indicated with a stack pointer which is the area where a push-pop is currently executed in the stack, for example, into the memory area of addresses 84 to 87 in this example, will highly probably be read out consecutively soon by a pop.

This state is shown in FIG. 38. FIG. 38 shows that a stack pointer 943 is at the memory area of an address 91, and the data F, G, . . . , H is kept consecutively popped, for example, from the memory area of an address 196 way above, up to this memory area of the address 91. As shown in FIG. 38, one cache-unit from the address 84 up to the address 87 cannot usually be read into the cache memory area from the main memory unit, unless a memory which belongs to this area, for example, the memory area of the address 87, is accessed by the execution of a pop. Then, for example, the cache-unit is only read into the cache memory from the main memory unit, when the memory area of this address 87 has been accessed by the execution of a pop.

Thus, the area which belongs to the new cache memory unit is accessed for the first time, and a demand is made for the data which corresponds to the new cache memory area. Thereafter, the data is read into the cache memory area from the main memory unit. This has a harmful effect on the realization of speedier memory access.

For example, as shown in FIG. 38, the cache-unit which occupies the memory area right below the memory area of the address 91 in the present position of the stack pointer 943, for example, the memory area of the addresses 84 to 87, will highly probably be read out consecutively soon by a pop. Therefore, different from the prior art disclosed in Patent Document 1, for example, one cache-unit of data which is the memory area of the addresses 84 to 87 can be read into the cache memory area from the main memory unit, as a means of resolving the above described disadvantage. This could make the speed of memory access higher than in the case where, when access has been executed to the memory area which is not in the cache memory, the contents of the main memory unit are read in a rush into the cache memory.

BRIEF SUMMARY OF INVENTION

In view of the aforementioned disadvantages, it is an object of the present invention to provide a data memory cache unit and a data memory cache system which are capable of heightening the speed of memory access.

In order to resolve the aforementioned disadvantages, a data memory cache unit according to one aspect of the present invention, which is used between an arithmetic unit and a main memory unit accessed by the arithmetic unit, comprises: a data holding section which includes a plurality of data areas that correspond to addresses of the main memory unit and hold the data on the corresponding addresses; and a control section in which, if consecutive read-out is executed which is read-out of data from consecutive addresses of the main memory unit to the arithmetic unit, then opens the data area in which the consecutive read-out is completed of the data holding section, without writing back to the main memory unit the data held in the data area in which the consecutive read-out is completed.

These and other objects, features and advantages of the present invention will become more apparent upon reading of the following detailed description along with the accompanied drawings.

BRIEF DESCRIPTION OF THE DRAWINGS

FIG. 2 is a table, showing each instruction format and operation of push, pop, load and store instructions.

FIG. 3 is a table, showing the relation between instructions which are executed by a MPU and the state of each control line.

FIG. 7 is a table, showing possible combinations of a valid-flag, a dirty-flag and a stack-flag, and the state of those combination lines.

FIG. 9 is a table, showing the contents of an operation which corresponds to the state of each line when random-read and random-write instructions are executed.

FIG. 10 is a table, showing the contents of an operation which corresponds to the state of each line when the opening of a line and the upward movement of an SP are executed.

FIG. 13 is a table, showing the contents of an operation which corresponds to the state of each line when SP-relative read and SP-relative write instructions are executed.

FIG. 16 is a table, showing the contents of an operation which corresponds to the state of each line when the pop instruction is executed.

FIG. 18 is a table, showing the contents of an operation which corresponds to the state of each line when an operation in which the SP has moved away downward and an operation in which the SP has come close from downward are executed.

FIG. 21 is a table, showing the contents of an operation which corresponds to the state of each line when the push instruction is executed.

FIG. 28 is a representation, showing the state of cache lines immediately after stack frames have been generated.

FIG. 29 is a representation, showing the state of the cache lines immediately after random access has been executed.

FIG. 37 is a representation, showing the state in which the data stored in a memory area of lower addresses will not highly probably be read by a pop for a while.

DETAILED DESCRIPTION OF INVENTION

Hereinafter, the embodiment of the present invention will be described with reference to the accompanied drawings.

(1. Configuration of the System)

Figure 1:
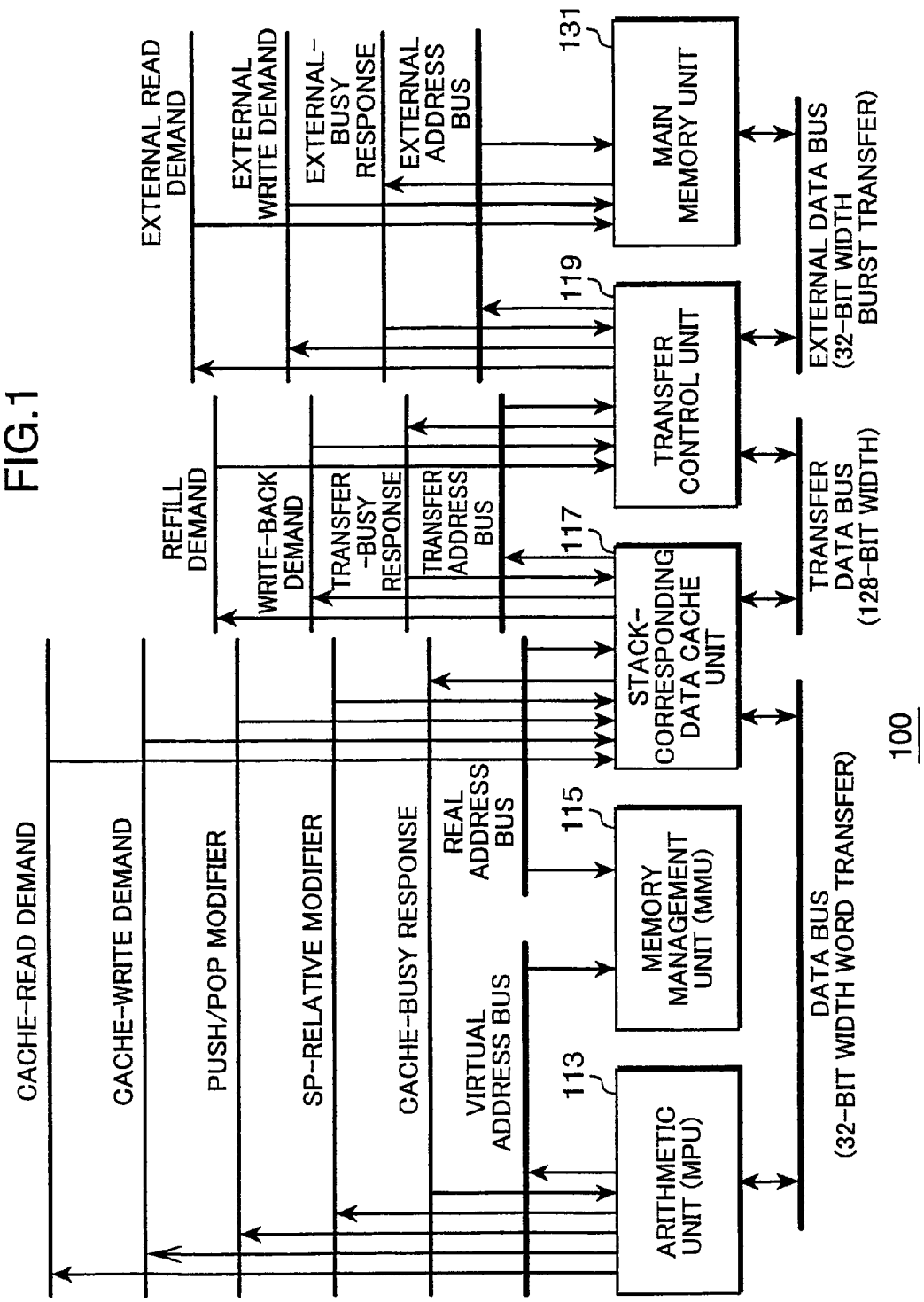
FIG. 1 is a block diagram, showing the configuration of a data memory cache system according to the embodiment of the present invention.

FIG. 1 shows the block configuration of a data memory cache unit and a data memory cache system including this unit (hereinafter, which are each called simply the "cache unit" and "cache system", except some cases where they should be especially distinguished) according to the first embodiment of the present invention. Description will be omitted of an instruction memory cache unit and an instruction memory cache system, because they are not directly related to the present invention.

A cache system 100 according to this embodiment mainly includes: an arithmetic unit 113; a memory management unit 115 (hereinafter, simply called the "MMU 115"); a stack-corresponding data cache unit 117 (hereinafter, which is simply called the "cache unit 117", except some cases where it should be especially distinguished); a transfer control unit 119; and a main memory unit 131. The cache unit 117 is equivalent to the data memory cache unit according to an embodiment of the present invention.

The arithmetic unit 113 is generally called an MPU, or a CPU or a processor in the narrow sense. It fetches from an instruction memory various arithmetic instructions, data move instructions, control instructions and other instructions, and executes them. Hereinafter, as an example of the arithmetic unit 113, an MPU is taken up, which is simply described as the "MPU 113." However, as a matter of course, this does not mean that the arithmetic unit according to the present invention is limited to an MPU.

The MPU 113 includes, particularly, an exclusive-purpose register SP (or stack pointer) which stores a memory address. A memory reference (or memory address) indicated with this stack pointer is called a stack top. Besides, as this stack pointer, a general-purpose register Rm (or register-m) can also be used, instead of the exclusive-purpose SP. If such a component is used, that will be especially effective in some cases, such as when a general-purpose CPU is used as a Java (which is a registered trademark) virtual machine.

Hereinafter, unless confusion seems to arise especially, the term such as a "stack pointer (SP)" and "stack pointer (SP) access" will be used especially without distinguishing the case where the exclusive-purpose SP register is used from the case where the general-purpose register (e.g., described as Rm or Rn) is used. In other words, such a term includes both of those cases.

The MPU 113 is ready as a part of the data move instructions for a push instruction, a pop instruction, a load instruction, a store instruction, and other instructions. The push instruction is an instruction which executes the contents of the SP minus four (i.e., executes a decrement of four) and then writes four bytes of data into its stack top (i.e., writes it into the memory from the MPU 113). The pop instruction is an instruction which reads, for example, four bytes of data from the stack top (i.e., reads it out to the MPU 113 from the memory) and then executes the contents of the SP plus four. The load instruction is an instruction which executes memory read-out with a relative address from the stack top. The store instruction is an instruction which executes memory writing with a relative address from the stack top. The MPU 113 is ready, as other data move instructions, for example, to execute memory access at direct random to an optional address which is designated in various methods, such as a direct address, a register indirect address and a register relative address.

Among these data move instructions, each instruction format of typical push, pop, load and store instructions is shown in the left columns of "instructions" in FIG. 2(*a*), (*b*), (*c*), (*d*). The push instruction is a specific example of the instruction which writes data into consecutive addresses of the main memory unit 131. The pop instruction is a specific example of the instruction which reads data out of consecutive addresses of the main memory unit 131. In an instruction format exemplified in FIG. 2, the general-purpose register Rm or the general-purpose register Rn is used as the stack pointer. In this description here, the memory-access unit by these instructions is four bytes, and the unit value by which the stack pointer increases and decreases before and after data moves by push/pop instructions is four. However, this is merely an example, and thus, any such values may also be used.

The left "instruction" column in FIG. 2(*a*) shows an instruction format of the push instruction. In this format, the MPU 113 uses the Rm register as the stack pointer. The right "operation" column in FIG. 2(*a*) shows an operation which is executed by the execution of this instruction.

When this push instruction is executed, first, the contents of Rm minus four is executed. Next, the contents of the Rn register is written into a memory by Rm indirect-address designation. In other words, the contents of the Rn register are written into the memory of the address shown in the contents of the Rm register. Then, a push/pop modifier bit is turned on. The contents of this push/pop modifier bit, as shown in FIG. 1, is used to notify the cache unit 117 from the MPU 113 through a control line that the push/pop instructions have been executed.

The left "instruction" column in FIG. 2(*b*) shows an instruction format of the pop instruction. In this format, the MPU 113 uses the Rn register as the stack pointer. The right "operation" column in FIG. 2(*b*) shows an operation which is executed by the execution of this instruction.

When this pop instruction is executed, first, a push/pop modifier bit is turned on. The contents of the push/pop modifier bit, in the same way as described above, is used to notify the cache unit 117 from the MPU 113 through the control line that the push/pop instructions have been executed. Next, the contents of a memory is read into the Rm register by Rn indirect-address designation. In other words, the contents of the memory of the address shown in the contents of the Rn register are read into the Rm register. Then, the contents of Rn plus four is executed (i.e., an increment of four is executed).

The left "instruction" column in FIG. 2(*c*) shows an instruction format of the load instruction. In this format, the MPU 113 uses the Rn register as the stack pointer. The right "operation" column in FIG. 2(*c*) shows an operation which is executed by the execution of this instruction.

When this load instruction is executed, first, an SP-relative modifier bit is turned on. The contents of this SP-relative modifier bit, as shown in FIG. 1, is used to notify the cache unit 117 by SP relative-address designation from the MPU 113 through the control line that load/store-pop instructions have been executed. Next, the contents of a memory is read into the Rm register by indirect-address designation which has added an offset value to the contents of the Rn register. In other words, the contents of the memory of the address which is shown by the value obtained by adding the offset value to the contents of the Rn register are read into the Rm register. The contents of Rn which is used as the SP do not undergo any plus and minus.

The left "instruction" column in FIG. 2(*d*) shows an instruction format of the store instruction. In this format, the MPU 113 uses the Rm register as the stack pointer. The right "operation" column in FIG. 2(*d*) shows an operation which is executed by the execution of this instruction.

When this store instruction is executed, the contents of the Rn register is written into a memory by indirect-address designation which has added an offset value to the contents of the Rm register. In other words, the contents of the Rm register is written into the memory of the address which is shown by the value obtained by adding the offset value to the contents of the Rm register. The contents of Rn which is used as the SP do not undergo any plus and minus. Then, an SP-relative modifier bit is turned on. The contents of the SP-relative modifier bit, in the same way as described above, is used to notify the cache unit 117 by SP relative-address designation from the MPU 113 through the control line that load/store-pop instructions have been executed. In the same way as described above, the contents of Rn which is used as the SP do not undergo any plus and minus.

When the data move instructions which include these instructions are executed by the MPU 113, if those data move instructions accesses an external memory, the MPU 113 outputs to a virtual address bus a logical address of the external memory which is to be accessed. Then, according to whether the data access is the read-out of data from the memory or the writing of data into the memory, it turns on a cache-read demand, or cache-write demand, bit signal-line. If the data access is the writing of data into the memory, then the MPU 113 also outputs the data to be simultaneously written to a data bus which has a 32-bit width. The logical address outputted to the virtual data bus is converted into a physical address by the MMU 115 and is outputted to a real address bus. The cache unit 117 which has received these pieces of data decides whether or not there is the memory to which the data access is to be executed in the cache.

As described above, as the control signal-line which is used to execute the memory access from the MPU used according to this embodiment, four lines (i.e., four bits) are used which transmit a push/pop modifier, an SP-relative modifier, a cache-read demand and a cache-write demand. FIG. 3 shows possible combinations of a demand executed by the MPU 113, its operation and the state of each control line.

FIG. 3(*a*) shows the case where both the cache-read demand and the cache-write demand are OFF (0). In this case, regardless of the push/pop modifier and the SP-relative modifier, no operation is executed with respect to read-and-write in the cache memory.

FIG. 3(*b*) shows the case where the cache-read demand is OFF (0), the cache-write demand is ON (1), and both the push/pop modifier and the SP-relative modifier are OFF (0). In other words, FIG. 3(*b*) shows an operation at the time when a random-write instruction has been executed in the memory, and the state of the control signal-line at that time.

FIG. 3(c) shows the case where the cache-read demand is OFF (0), the cache-write demand is ON (1), the push/pop modifier is OFF (0), and the SP-relative modifier is ON (1). In other words, FIG. 3(c) shows an operation at the time when an SP-relative write (or store) instruction has been executed in the memory, and the state of the control signal-line at that time.

FIG. 3(d) shows the case where the cache-read demand is OFF (0), the cache-write demand is ON (1), the push/pop modifier is ON (1), and the SP-relative modifier is OFF (0). In other words, FIG. 3(d) shows an operation at the time when the push instruction has been executed in the memory, and the state of the control signal-line at that time.

FIG. 3(e) shows the case where the cache-read demand is OFF (0), the cache-write demand is ON (1), the push/pop modifier is ON (1), and both the push/pop modifier and the SP-relative modifier are ON (1). However, usually, this state is not taken into account. In other words, this state usually does not take place.

FIG. 3(f) shows the case where the cache-read demand is ON (1), the cache-write demand is OFF (0), and both the push/pop modifier and the SP-relative modifier are OFF (0). In other words, FIG. 3(f) shows an operation at the time when a random-read instruction has been executed in the memory, and the state of the control signal-line at that time.

FIG. 3(g) shows the case where the cache-read demand is ON (1), the cache-write demand is OFF (0), the push/pop modifier is OFF (0), and the SP-relative modifier is ON (1). In other words, FIG. 3(g) shows an operation at the time when an SP-relative read (or load) instruction has been executed in the memory, and the state of the control signal-line at that time.

FIG. 3(h) shows the case where the cache-read demand is ON (1), the cache-write demand is OFF (0), the push/pop modifier is ON (1), and the SP-relative modifier is OFF (0). In other words, FIG. 3(h) shows an operation at the time when the pop instruction has been executed in the memory, and the state of the control signal-line at that time.

FIG. 3(i) shows the case where the cache-read demand is ON (1), the cache-write demand is OFF (0), and both the push/pop modifier and the SP-relative modifier are ON (1). However, usually, this state is not taken into account. In other words, this state usually does not take place.

FIG. 3(j) shows the case where both the cache-read demand and the cache-write demand are ON (1). Regardless of the push/pop modifier and the SP-relative modifier, usually, this state is not taken into account. In other words, this state usually does not take place.

Figure 4:
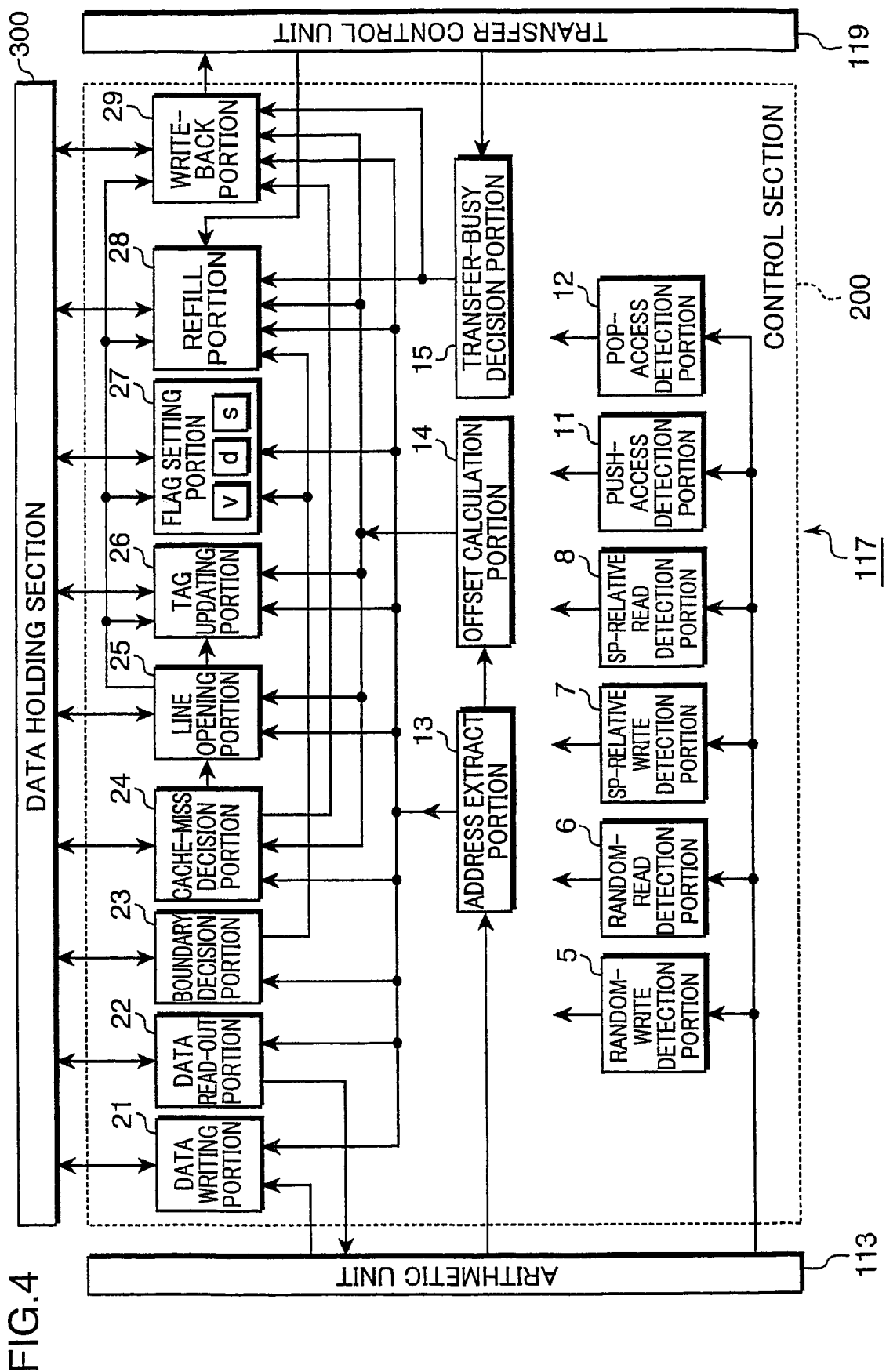
FIG. 4 is a block diagram, showing the configuration of a cache unit in FIG. 1 which is equivalent to a data memory cache unit according to the embodiment of the present invention.
Figure 5:
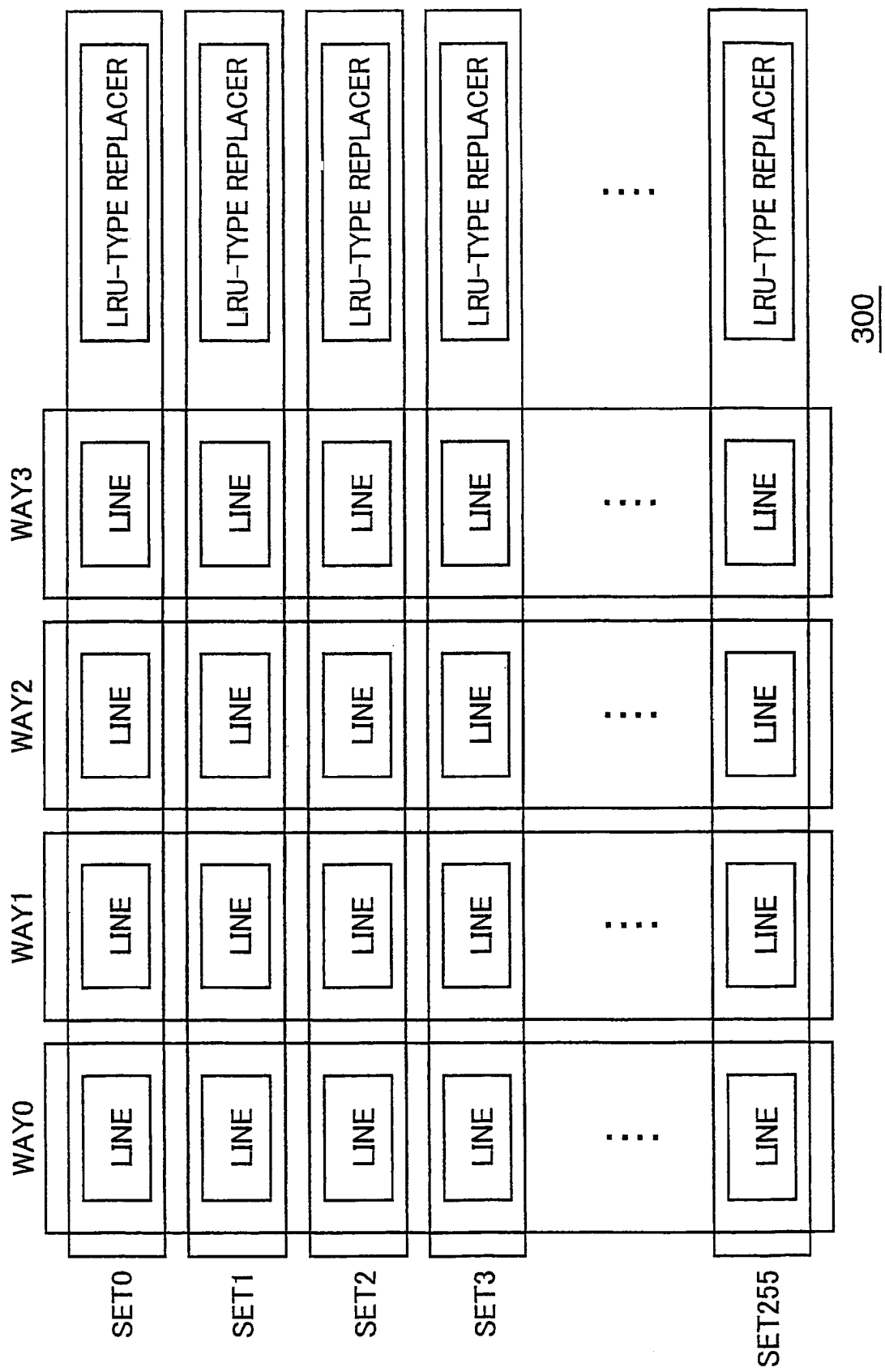
FIG. 5 is a block diagram, showing the configuration of a data holding section of the cache unit in FIG. 4.

FIG. 4 is a block diagram, showing the configuration of the cache unit 117. The cache unit 117 includes a data holding section 300 and a control section 200. The configuration of the data holding section 300 is shown in FIG. 5. The data holding section 300 of the cache unit 117 according to this embodiment has a configuration of 256 sets and four ways. However, the data memory cache unit according to the present invention is not limited to this configuration, and thus, any other configurations can also be used.

Figure 6:
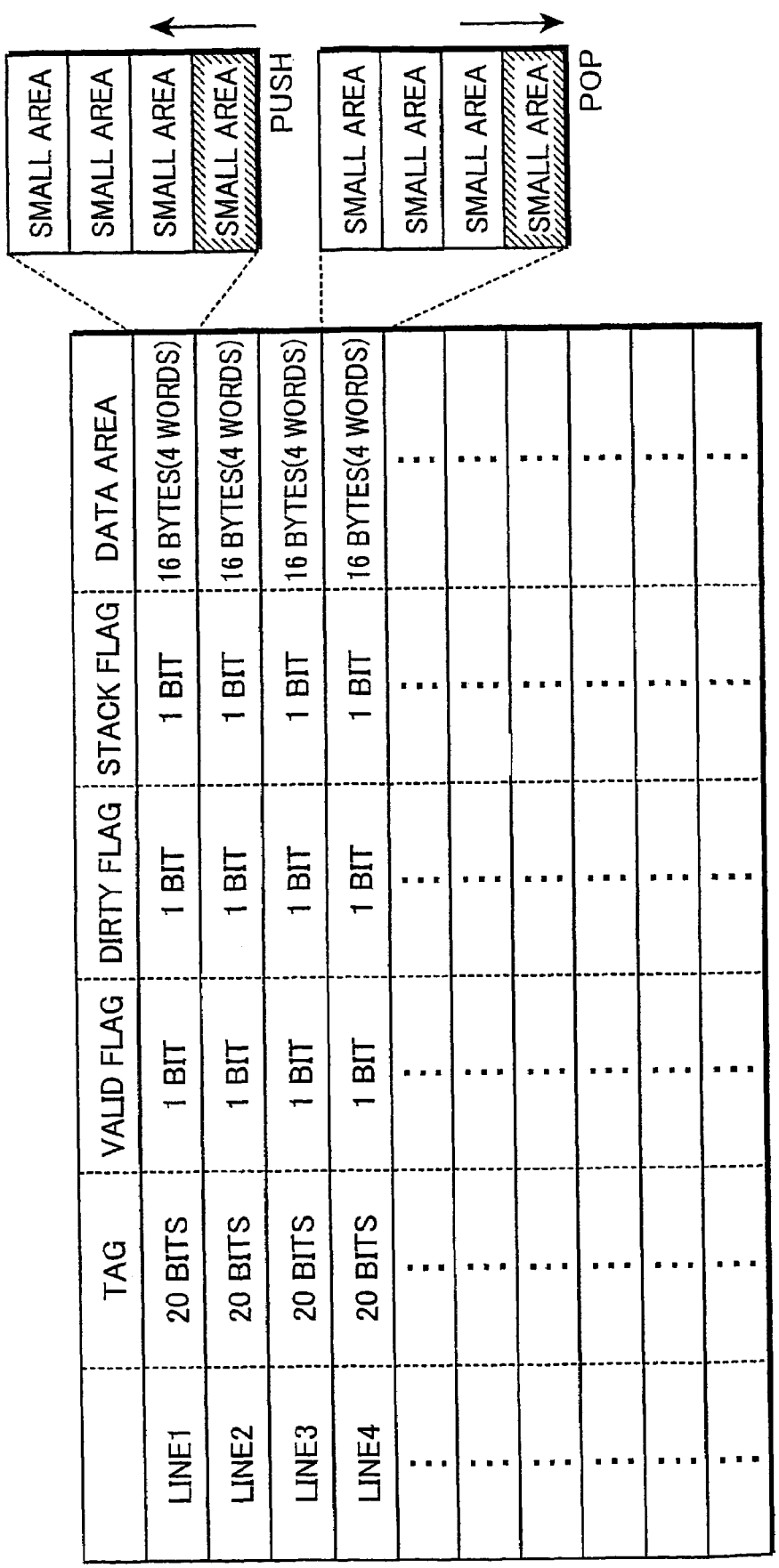
FIG. 6 is a table, showing the configuration of the lines of the data holding section in FIG. 5.

FIG. 6 is a table, showing the configuration of the lines included in the data holding section 300 shown in FIG. 5. As shown in FIG. 6, each line is made up of a data area which holds data, a flag holding portion which holds three kinds of control bits (flags) used for control, and a tag holding portion which holds a tag.

Each data area is used to hold a 16-byte (i.e., four-word or 128-bit) unit of data read from and written in the main memory unit 131 at one time, and has a storage capacity of 16 bytes. In addition, each data area is divided into four small areas which are used to hold one-word (i.e., four-byte) unit of data simultaneously read from and written in the MPU 113 and has a storage capacity of 16 bytes. Each tag holding portion holds a tag which has a 20-bit width. Each flag holding portion is made up of a valid-flag holding portion which holds a valid-flag, a dirty-flag holding portion which holds a dirty-flag and a stack-flag holding portion which holds a stack-flag, each of which is one bit. FIG. 7 shows possible combinations of these three kinds of flags, and what those combinations means. FIG. 7 is also be referred to when an operation of the cache system 100 is described later.

In FIG. 4 mentioned earlier, the control section 200 is used to control the data holding section 300. The control section 200 includes as main components: a random-write detection portion 5; a random-read detection portion 6; an SP-relative write detection portion 7; an SP-relative read detection portion 8; a push-access detection portion 11; a pop-access detection portion 12; an address extract portion 13; an offset calculation portion 14; a transfer-busy decision portion 15; a data writing portion 21; a data read-out portion 22; a boundary decision portion 23; a cache-miss decision portion 24; a line opening portion 25; a tag updating portion 26; a flag setting portion 27; a refill portion 28; and a write-back portion 29.

The random-write detection portion 5 detects a data writing demand when the random-write instruction from the MPU 113 is executed. More specifically, when the push/pop modifier and the SP-relative modifier are negated and the cache-write demand is asserted, the random-write detection portion 5 decides that there is a data writing demand at the time when the random-write instruction is executed.

The random-read detection portion 6 detects a data read-out demand when the random-read instruction from the MPU 113 is executed. More specifically, when the push/pop modifier and the SP-relative modifier are negated and the cache-read demand is asserted, the random-read detection portion 6 decides that there is a data read-out demand at the time when the random-read instruction is executed.

The SP-relative write detection portion 7 detects a data writing demand when the SP-relative write instruction from the MPU 113 is executed. More specifically, when both the SP-relative modifier and the cache-write demand are asserted, the SP-relative write detection portion 7 decides that there is a data writing demand at the time when the SP-relative write instruction is executed. The SP-relative read detection portion 8 detects a data read-out demand when the SP-relative read instruction from the MPU 113 is executed. More specifically, when both the SP-relative modifier and the cache-read demand are asserted, the SP-relative read detection portion 8 decides that there is a data read-in demand at the time when the SP-relative read instruction is executed.

The push-access detection portion 11 detects a data writing demand when the push instruction from the MPU 113 is executed. More specifically, when both the push/pop modifier and the cache-write demand are asserted, the push-access detection portion 11 decides that there is a data writing demand at the time when the push instruction is executed. The pop-access detection portion 12 detects a data read-out demand when the pop instruction from the MPU 113 is executed. More specifically, when both the push/pop modifier and the cache-read demand are asserted, the pop-access detection portion 12 decides that there is a data read-in demand at the time when the pop instruction is executed.

Each of the following components in the control section 200 executes an operation according to each instruction, based on the detection results by the above described random-write detection portion 5, random-read detection portion 6, SP-relative write detection portion 7, SP-relative read detection portion 8, push-access detection portion 11, and pop-access detection portion 12.

The address extract portion 13 extracts, from the 32-bit address outputted by the MPU 113, eight bits of the intermediately significant digital part of the address which corresponds to each set (refer to FIG. 5), 20 bits of the more significant digital part of the address which should be compared with the tag, and two bits of the less significant digital part of the address which corresponds to each small area (refer to FIG. 6). Herein, the less significant two bits are the two bits which are adjacent to the less significant side of the intermediately significant eight bits of the address. In other words, they are the digital part of address which corresponds to the third and fourth bits from the least significant digit. Hereinafter, the more, intermediately and less significant digital parts of address are also represented as the upper, middle and lower parts of address, respectively for short.

When the push instruction or the pop instruction is executed, the offset calculation portion 14 calculates an offset address that is the address located a predetermined distance apart from the address outputted by the MPU 113. The offset address will be described later.

The transfer-busy decision portion 15 decides whether or not the data bus which is used to transfer data between the cache unit 117 and the main memory unit 131 is in operation. More specifically, when the transfer-busy response outputted by the transfer control unit 119 is asserted, the transfer-busy decision portion 15 decides that the data bus is in operation. Herein, the data bus is equivalent to a transfer data bus in the example of FIG. 1 where the transfer control unit 119 is placed between.

When a data writing demand has been given from the MPU 113, the data writing portion 21 writes the address outputted by the MPU 113 into the small area which corresponds to the address outputted by the MPU 113. The data read-out portion 22, when a data read-out demand has been given from the MPU 113, reads out data to the MPU 113 from the small area which corresponds to the address outputted by the MPU 113.

When the MPU 113 executes the push instruction, the boundary decision portion 23 decides whether or not the small area which corresponds to the address outputted by the MPU 113 is adjacent to the boundary (hereinafter, simply called the "line boundary") on the opposite side to the direction where the addresses advances, among the boundaries of the data area to which the small area belongs. In addition, when the MPU 113 executes the pop instruction, the boundary decision portion 23 decides whether or not the small area which corresponds to the address outputted by the MPU 113 is adjacent to the boundary (hereinafter, simply called the "line boundary") in the direction where the addresses advances, among the boundaries of the data area to which the small area belongs.

Assuming that the addresses ascend toward the lower part in FIG. 6, if the address outputted by the MPU 113 goes down as the push instruction is executed, in other words, if the address moves up in FIG. 6, the line boundary is located on the higher side (i.e., on the lower side in FIG. 6) of the address of the data area. In this case, as shown with the hatching at the right end of FIG. 6, the small area which is adjacent to the line boundary among the four small areas which belong to the data area is equivalent to the small area having the highest address (i.e., the small area located at the lowest part in FIG. 6). If the address outputted by the MPU 113 goes up as the pop instruction is executed, in other words, if the address moves down in FIG. 6, the line boundary is located on the higher side (i.e., on the lower side in FIG. 6) of the address of the data area. In this case, as shown with the hatching at the right end of FIG. 6, the small area which is adjacent to the line boundary among the four small areas which belong to the data area is equivalent to the small area having the highest address (i.e., the small area located at the lowest part in FIG. 6). In other words, the line boundary and the small area which is adjacent to the line boundary are common to the push instruction and the pop instruction.

The cache-miss decision portion 24 decides whether or not there is a cache miss with respect to the data area which corresponds to the address outputted by the MPU 113. If the offset calculation portion 14 calculates an offset address, the MPU 113 decides whether or not there is a cache miss with respect to the data area which corresponds to the calculated offset address. The line opening portion 25 opens the data area in which there is a cache miss. Hereinafter, the opening of a data area is simply called the "opening of a line", in accordance with a precedent in the art. In addition, one data area is formed on each line, and thus, the data area is simply called the "line." Herein, the line opening portion 25 is equivalent to a specific example of the data-area opening portion according to the present invention.

The flag setting portion 27 sets three kinds of flags on the positive side or on the negative side. The flag setting portion 27, as shown with reference characters v, d, s in FIG. 4, includes three kinds of flag setting portions which correspond to the three kinds of flags, or a valid-flag setting portion, a dirty-flag setting portion, and a stack-flag setting portion. In addition, the flag setting portion 27 may also be provided on each of the corresponding lines.

When a cache miss takes place with respect to the data area which corresponds to the address outputted by the MPU 113 and as a result the data area is opened, or in other such cases, the write-back portion 29 writes the data back to the main memory unit 131 from the data area. After a cache miss has taken place with respect to the data area which corresponds to the address outputted by the MPU 113 and as a result the data area has been opened, or in other such cases, the refill portion 28 reads (i.e. refills) data from the main memory unit 131 into the data area. The tag updating portion 26 updates, using a new address, the tag that corresponds to the opened data area.

(2. Operation of the System)

Hereinafter, the cache control executed by the cache system 100 according to this embodiment will be described with reference to the already mentioned FIG. 1 to FIG. 7.

(2-1. Random Read)

Figure 8:
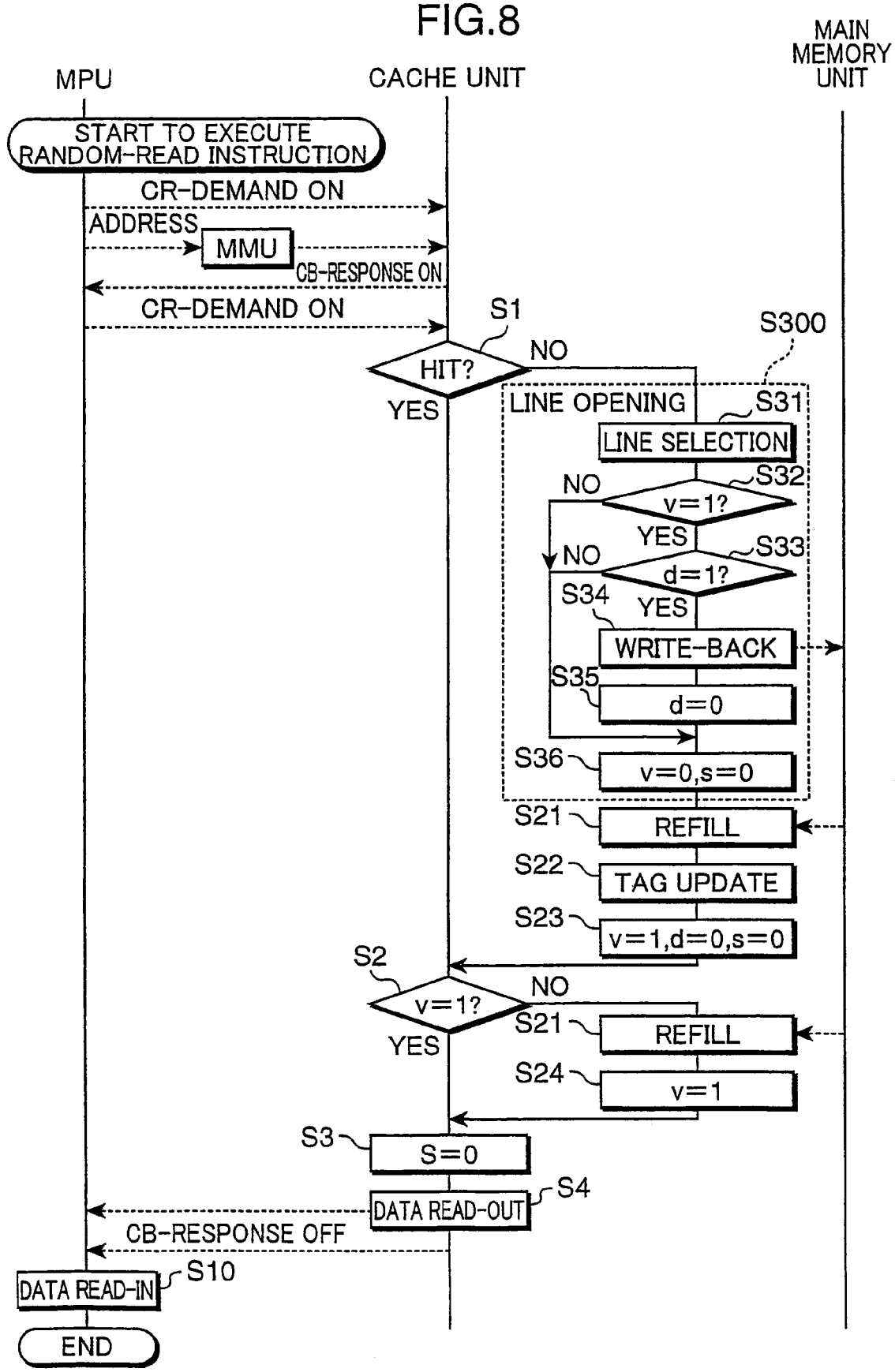
FIG. 8 is a flow chart, showing an operational sequence of the cache system in FIG. 1 when the MPU executes a random-read instruction.

FIG. 8 is a flow chart, showing an operational sequence of the cache system 100 when the MPU 113 executes a random-read instruction. Aiming at describing the operation of the cache unit 117 in detail, the sequences shown in FIG. 8 and the following figures are represented together with their flow charts. In the following sequence figures, each broken line with an arrow represents a signal which is exchanged between the MPU 113, the cache unit 117 and the main memory unit 131.

When the MPU 113 starts to execute a random-read instruction, the MPU 113 shown in FIG. 1 turns on (or asserts) a cache-read demand. At the same time, it outputs to the virtual address bus the logical address which shows the memory area desired to be read. Then, the MPU 113 keeps the SP-relative modifier and the push/pop modifier OFF (or negated). The random-read detection portion 6 of the cache unit 117 receives these signals and thereby detects the MPU 113 executing a data read-out demand which follows the random-read instruction. Along with this, the control section 200 of the cache unit 117 turns on a cache-busy response. The MPU 113 confirms that the cache-busy response has been turned on, and then, turns off (or negates) the cache-read demand. Herein, in this specification, asserting a control signal is simply described as "turning on", and negating is simply described as "turning off."

The MMU 115 converts the upper 20 bits of the virtual address bus into the upper 20 bits of the physical address, and then, outputs them to the real address bus. The lower 15 bits of the virtual address bus are outputted as they are to the real address bus.

As described above, when the control section 200 receives a cache-read demand signal, first, it turns on a cache-busy response signal. Next, in a step 1, the cache-miss decision portion 24 of the cache unit 117 considers the middle eight bits of the real address extracted by the address extract portion 13 to be a key, and then, selects one set in each way. Next, it reads out the value of the tag of the selected set.

As shown in FIG. 5, the cache unit 117 according to this embodiment is assumed to have a configuration of 256 sets and four ways. Accordingly, for example, let's assume the upper 20 bits of the address bus to be "0001 1001 1100 0000 1111 in the binary number system (0x19COF in the hexadecimal number system)", and for example, let's assume the middle eight bits of the address bus to be "0010 1000 in the binary number system (0x28 in the hexadecimal number system and 40 in the decimal number system)." In this case, the cache-miss decision portion 24 selects any one of the four lines included in the "set 40" as the line which is likely to be used in the cache.

Next, the cache-miss decision portion 24 compares the upper 20 bits of the real address bus with the value (which is 20 bits) of the tag which has been read out. Then, if there is a coincidence between them, it decides that the cache has been hit, or that no cache miss takes place (YES at S1). In the above described example, since the upper 20 bits of the address bus are "0x19COF", if any value of the tag which is included the lines included in the set 40 is the same as this, or "0x19COF", then the cache-miss decision portion 24 decides that the cache has been hit.

The operation (S2 to S4, S21, S24) at the time (YES at S1) when it is decided that the cache has been hit, is shown in the left column "random read" of the "operation" in FIG. 9(b) to (g). In addition, the operation (S21, S24) at the time when the cache has been hit (YES at S1) and the valid-flag on this line is 1 (YES at S2), is shown in FIG. 9(b) to (e). The state at this time is equivalent to FIG. 7(e) to (h). The contents of the line at this time correspond to the contents of the main memory unit 131, or are newer than the contents of the main memory unit 131. Therefore, the data read-out portion 22 reads out the data which is equivalent to the lower four bits of the real address bus from the total 16 bytes included in this line. Then, it outputs it to the data bus which has a 32-bit width (S3). Thereafter, the control section 200 turns off the cache-busy response signal.

Furthermore, at this time, if the stack-flag is 1, the operational state is equivalent to the state of FIG. 7(f), (h). As shown in FIG. 9(c), (e), the flag setting portion 27 sets the stack-flag to 0 (S3). The MPU 113 detects the cache-busy response signal having been turned off, and then, reads in the data sent out to the data bus (S10).

The operation (S21, S24) at the time when the cache has been hit, but the valid-flag is 0 (NO at S2), is shown in FIG. 9(f) to (g). The state at this time is equivalent to FIG. 7(a) to (b). This state is equivalent to the case where the value of the upper 20 bits of the address bus coincides by chance with the contents of the tag, but the line is already opened and thus the cache has not been executed. In other words, in this state, the contents of the main memory unit 131 is newer than the contents of the line. This requires the control section 200 to execute a refill (S21) for reading the corresponding contents of the main memory unit 131 into the cache memory. After the refill portion 28 has executed the refill (S21), the flag setting portion 27 sets the valid-flag to 1 (S24). If the stack-flag is 1, it sets it to 0 (S3).

By the operation described above, it becomes the same state as FIG. 9(b). Accordingly, thereafter, in the same way as in FIG. 9(b), the data read-out portion 22 reads out the data which is equivalent to the lower four bits of the real address bus from the total 16 bytes included in this line (S4). Then, it outputs it to the 32-bit width data bus. Thereafter, the control section 200 turns off the cache-busy response signal. Herein, the refill (S21) will be described in detail, in the following description of a cache miss.

On the other hand, the cache-miss decision portion 24 compares the upper 20 bits of the real address bus with the value (which is 20 bits) of the tag which has been read out. As a result, if there is not a coincidence in any way included in the selected set, it decides that the cache has not been hit, or that a cache miss has taken place (S1). The operation (S300, S21 to S23, S2, S3) at this time is shown in the left column "random read" of the "operation" in FIG. 9(a).

If it is decided that a cache miss has taken place, first, the line opening portion 25 selects one from among the four lines inside of the identical set, and then, opens the line (S300). In selecting the line to be opened (S31), for example, the LRU (or least recently used) algorithm is used. To execute this, a "LRU-type replacer" included in each set of FIG. 5 is used. In other words, the line opening portion 25 executes the selection of a line, using the "LRU-type replacer." This algorithm is, as can be seen from its name, a method of opening something that has recently been least used, or something that has been least frequently used. However, its contents are not related directly to the essential part of the present invention, and thus, their description is omitted. Besides, it is not necessarily limited to this algorithm. Hence, Therefore, needless to say, the line to be opened may also be decided, using some other algorithm.

Next, the opening of the line selected in this way is executed. The operation of opening the line differs according to the state of each line, or the state which is determined according to the value of each flag on any line at any time. This contents are shown in the right column of the "operation" in FIG. 10.

The state shown in FIG. 10(a) means that the line is not allocated as the cache of the main memory unit 131, or it is opened. Therefore, there is no need for the line opening portion 25 to open this line anew (NO at S31). This state can be usually indicated from the fact that the valid-flag is 0.

In the state of FIG. 10(b), (c), as shown in FIG. 7(e), (f), the contents of the line coincide with the contents of the main memory unit 131 (YES at S32, NO at S33). Therefore, there is no need for the line opening portion 25 to execute write-back. All it has to do is to set the valid-flag to 0, so that the line will be shown to have been opened (S36). The line opening portion 25 can set various flags, for example, using the flag setting portion 27. In addition, as shown in FIG. 10(c), if the stack-flag is 1 and thus the allocation to the stack is shown, then the line opening portion 25 also sets the stack-flag to 0 (S36) when the line is opened.

In the state of FIG. 10(d), (e), the dirty-flags are 1 (YES at S33). As shown in FIG. 7(g), (h), the contents of the lines are updated newer than the contents of the main memory unit 131. Therefore, the line opening portion 25 needs to write the contents of the lines back to the main memory unit 131. The line opening portion 25 can execute the write-back, for example, by activating the write-back portion 29. This write-back is executed at high speed and automatically via a transfer data bus and an external data bus, using the transfer control unit 119 shown in FIG. 1. However, this method is not related directly to the essential part of the present invention, and thus, its description is omitted. After the line opening portion 25 has executed the write-back, it sets the valid-flag and the dirty-flag to 0, so that this line can be shown to have once been opened (S36).

As shown in FIG. 10(e), the state in which the valid-flag is 1 (YES at S32), the dirty-flag is 1 (YES at S33) and the stack-flag is also 1, is equivalent to the state of FIG. 7(h). This state means that this line has been allocated to the stack. Accordingly, in this case, in the same way as described above, the line opening portion 25 lifts the allocation to the stack when it opens the line, and also sets the stack-flag to 0 (S36).

As shown in FIG. 10(f), (g), the state in which the valid-flag is 0 is equivalent to the state of FIG. 7(a) to (f). In this state, the value of the tag coincides by chance, however, this line is not used as the cache any more. In other words, it is opened, and thus, there is no need for the line opening portion 25 to execute the write-back. If the stack-flag is 1, the line opening portion 25 only sets the stack-flag to 0 when it opens the line (S36).

As described above, the opening of one line is completed. Next, in order to use this opened line as a cache, the refill portion 28 refills this line with the 16-byte contents of the main memory unit 131 which includes the demanded address. This refill is also executed at high speed and automatically via a transfer data bus and an external data bus, using the transfer control unit 119 shown in FIG. 1. However, this method is not related directly to the essential part of the present invention, and thus, its description is omitted.

The tag updating portion 26 writes the upper 20 bits of the real address into the tag which corresponds to the line where the refill has been executed (S22). Next, the flag setting portion 27 sets the valid-flag to 1, the dirty-flag to 0, and the stack-flag to 0, in other words, to the state shown in FIG. 7(e) (S23).

The state in which the step S23 is completed is the same as the state of FIG. 9(b). Hence, thereafter, the control section 200 executes the same operation as that of FIG. 9(b) (S2 to S4). In other words, the data read-out portion 22 reads out the data of the small area which is equivalent to the lower four bits of the real address bus from the total 16 bytes included in the line where the tag has been updated. Then, it outputs it to the data bus which has a 32-bit width (S3). Thereafter, the control section 200 turns off the cache-busy response signal. The MPU 113 detects the cache-busy response signal having been turned off, and then, reads in the contents of the data which is sent in through the data bus (S10).

(2-2. Random Write)

Figure 11:
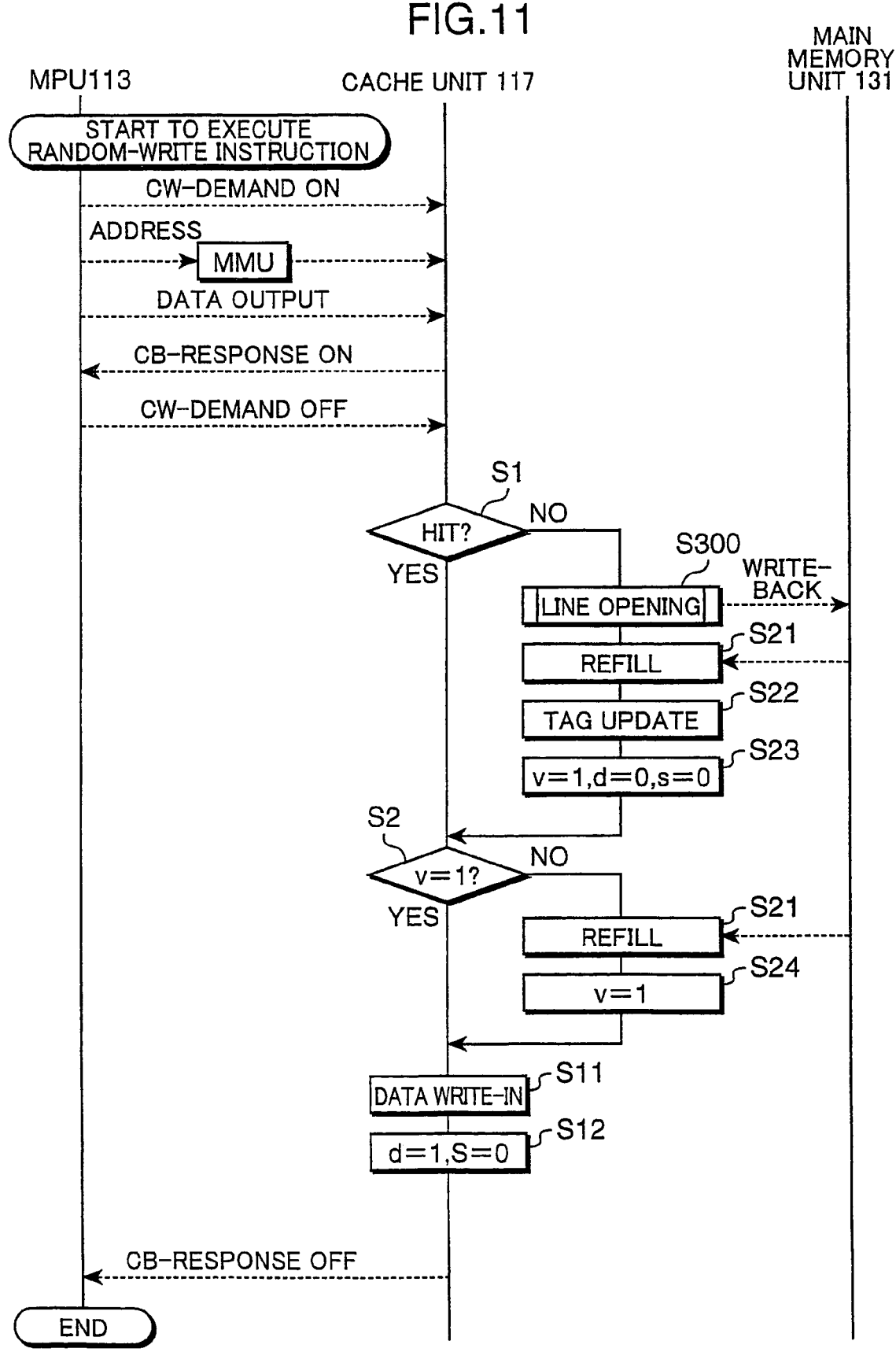
FIG. 11 is a flow chart, showing an operational sequence of the cache system in FIG. 1 when the MPU executes the random-write instruction.

FIG. 11 is a flow chart, showing an operational sequence of the cache system 100 when the MPU 113 executes a random-write instruction. When the MPU 113 starts to execute the random-write instruction, the MPU 113 shown in FIG. 1 turns on a cache-write demand. At the same time, it outputs to the virtual address bus the logical address which shows the memory area desired to be written. In addition, it outputs the data desired to be written to the data bus which has a 32-bit width. Then, the MPU 113 keeps the SP-relative modifier and the push/pop modifier OFF. The random-write detection portion 5 of the cache unit 117 receives these signals and thereby detects the MPU 113 executing a data writing demand which follows the random-write instruction. Along with this, the control section 200 turns on a cache-busy response. The MPU 113 confirms that the cache-busy response has been turned on, and then, turns off (or negates) the cache-write demand.

Next, in the same way as the random read, the cache-miss decision portion 24 executes the selection of a set and a way, and the decision of a cache hit or a cache miss (S1). This has already been described, and thus, its description is omitted.

The operation (S2, S11, S12) at the time (YES at S1) when it is decided that the cache has been hit, is shown in the right column "random write" of the "operation" in FIG. 9(b) to (g). In addition, the operation (S11, S12) at the time when the cache has been hit (YES at S1) and the valid-flag on this line is 1 (YES at S2), is shown in FIG. 9(b) to (e). The state at this time is equivalent to FIG. 7(e) to (h). The contents of the line at this time correspond to the contents of the main memory unit 131, or are newer than the contents of the main memory unit 131. Therefore, the data writing portion 21 writes the contents of the data bus, in other words, the data which has been sent in through the data bus, into the area which is equivalent to the lower four bits of the real address bus of this line (S11). Next, unless the dirty-flag is 1, as shown in FIG. 9(b), (c), then the flag setting portion 27 sets the dirty-flag to 1 (S12). Thereafter, the control section 200 turns off the cache-busy response signal.

Furthermore, at this time, if the stack-flag is 1, the operational state is equivalent to the state of FIG. 7(f), (h). As shown in FIG. 9(c), (e), the flag setting portion 27 sets the stack-flag to 0 (S3). The MPU 113 detects the cache-busy response signal having been turned off, and then, it is recognized that the random write is completed.

The operation (S21, S24) at the time when the cache has been hit, but the valid-flag is 0 (NO at S2), is shown in FIG. 9(f) to (g). The state at this time is equivalent to FIG. 7(a) to (b). This state is equivalent to the case where the value of the upper 20 bits of the address bus coincides by chance with the contents of the tag, but the line is already opened and thus the cache has not been executed. In other words, in this state, the contents of the main memory unit 131 is newer than the contents of the line. This requires that a refill be executed (S21) for reading the corresponding contents of the main memory unit 131 into the cache memory. After the refill portion 28 has executed the refill (S21), the flag setting portion 27 sets the valid-flag to 1 (S24). Next, the data writing portion 21 writes the contents of the data bus into the area which is equivalent to the lower four bits of the real address bus of this line (S11). Thereafter, the flag setting portion 27 sets the dirty-flag to 1 (S12).

If the operational state is equivalent to the state of FIG. 7(b) and the stack-flag is 1, as shown in FIG. 9(g), then the control section 200 lifts the allocation of the line to the stack. In other words, the flag setting portion 27 sets the stack-flag to 0 (S12).

On the other hand, the operation at the time when it is decided that a cache miss has taken place at the step S1 (NO at S1) is shown in the right column "random write" of the "operation" in FIG. 9(a). In order to secure the line to be newly used for the cache, the line opening portion 25 decides the line opened by the LRU-type replacer from the set selected with the middle eight bits of the address bus. Then, it opens the decided line (S300). Next, in order to use the opened line as a cache anew, it executes refill (S21). However, this operation is the same as the opening of a line in the random read described already, and thus, its description is omitted here.

By these operations, the contents of the data area on the line coincide with the contents of the main memory unit 131, and the operational state is the state of FIG. 9(b). Therefore, after this, the control section 200 executes the same operation as that of FIG. 9(b). In other words, the data writing portion 21 writes the contents of the data bus into the small area which is equivalent to the lower four bits of the real address bus of the line where the refill has been executed. Next, the control section 200 turns off the cache-busy response signal. The MPU 113 detects the cache-busy response signal having been turned off, and then, it is recognized that the random write is completed.

(2-3. SP Relative Read)

Figure 12:
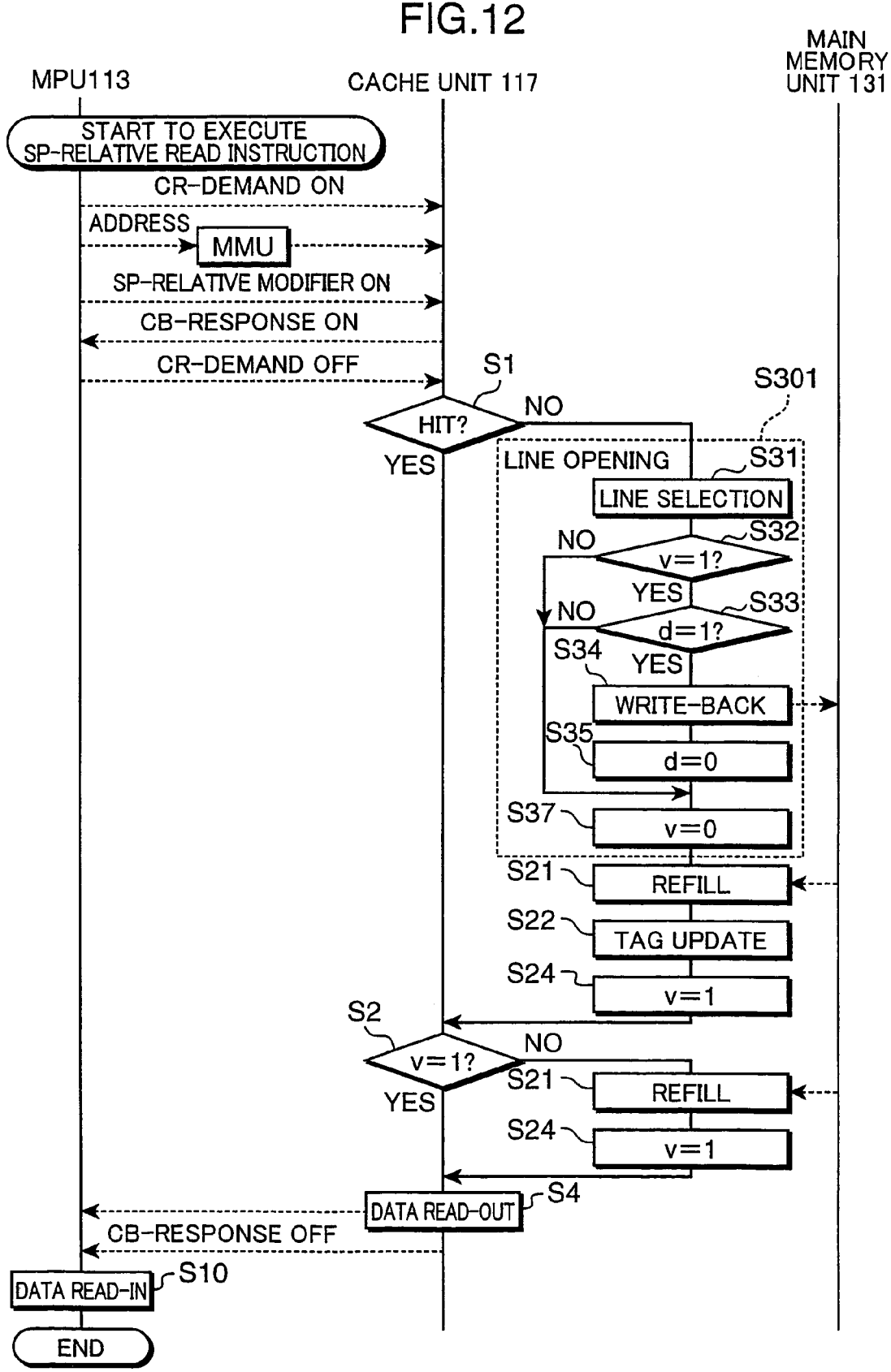
FIG. 12 is a flow chart, showing an operational sequence of the cache system in FIG. 1 when the MPU executes an SP-relative read instruction.

FIG. 12 is a flow chart, showing an operational sequence of the cache system 100 when the MPU 113 executes an SP-relative read instruction. When the MPU 113 starts to execute the SP-relative read instruction, the MPU 113 shown turns on a cache-read demand. At the same time, it outputs to the virtual address bus the logical address which shows the memory area desired to be read. Simultaneously, the MPU 113 turns on an SP-relative modifier signal. The SP-relative read detection portion 8 of the cache unit 117 receives these signals and thereby detects the MPU 113 executing a data read-out demand which follows the SP-relative read instruction. In this respect, the SP-relative read and the above described random read differ in operations. Along with this, the control section 200 of the cache unit 117 turns on a cache-busy response. The MPU 113 confirms that the cache-busy response has been turned on, and then, turns off the cache-read demand.

The MMU 115 converts the upper 20 bits of the virtual address bus into the upper 20 bits of the physical address, and then, outputs them to the real address bus. The lower 15 bits of the virtual address bus are outputted as they are to the real address bus.

As described above, when the control section 200 receives a cache-read demand signal, first, it turns on a cache-busy response signal. Next, in the step 1, the cache-miss decision portion 24 considers the middle eight bits of the real address extracted by the address extract portion 13 to be a key, and then, selects one set in each way. Next, it reads out the value of the tag of the selected set. In addition, the cache-miss decision portion 24 decides whether the cache has been hit or missed. These operations are the same as those of the random read.

If the cache has been hit (YES at S1) and the valid-flag on this line is 1 (YES at S2), the data read-out portion 22 reads out the data which is equivalent to the lower four bits of the real address bus from this line. Then, it outputs it to the data bus which has a 32-bit width (S3). Thereafter, the control section 200 turns off the cache-busy response signal. The above described operations are shown in the left column "SP-relative read" of the "operation" in FIG. 13(b) to (e). The MPU 113 detects the cache-busy response signal having been turned off, and then, reads in the contents of the data bus (S10).

If the cache has been hit (YES at S1), but the valid-flag is 0 (NO at S2), as described earlier, that means that the value of the upper 20 bits of the address bus has coincided by chance with the contents of a certain tag, but that line is already opened and thus the cache has not been executed. Accordingly, in this case, after the refill portion 28 has executed the refill (S21), the flag setting portion 27 sets the valid-flag to 1 (S24). Thereafter, the control section 200 executes the same operation as that of FIG. 13(b). The operation at this time is shown in the left column "SP-relative read" of FIG. 13(f), (g).

On the other hand, the cache-miss decision portion 24 compares the upper 20 bits of the real address bus with the value (which is 20 bits) of the tag which has been read out. As a result, unless there is a coincidence in any way included in the set selected by the middle eight bits of the address bus, it is decided that the cache has not been hit (i.e., the cache has been missed). Then, one line is selected from among the four lines inside of the identical set, and then, the line is opened (S301). In the step S301, different from the step S300 (refer to FIG. 8), the flag setting portion 27 sets only the valid-flag to 0 (S37), without setting the stack-flag to 0 (S36). Otherwise, the processing in the step S301 is the same as that that in the step S300.

Thereafter, the refill portion 28 refills the opened line with the corresponding from the memory area of the main memory unit 131 (S21). Next, the tag updating portion 26 updates the tag which corresponds to the refilled line (S22). Then, the flag setting portion 27 sets the valid-flag to 1 (S24). Thereafter, the control section 200 executes the same operation as that of FIG. 13(b). The operation at this time is shown in the left column "SP-relative read" of FIG. 13(a).

In any states shown in FIG. 13(a) to (g), the setting of the stack-flag is not executed, and thus, the state of the stack-flag is kept in its initial state. Also in this respect, the SP-relative read and the random read differs in operations.

(2-4. SP Relative Write)

Figure 14:
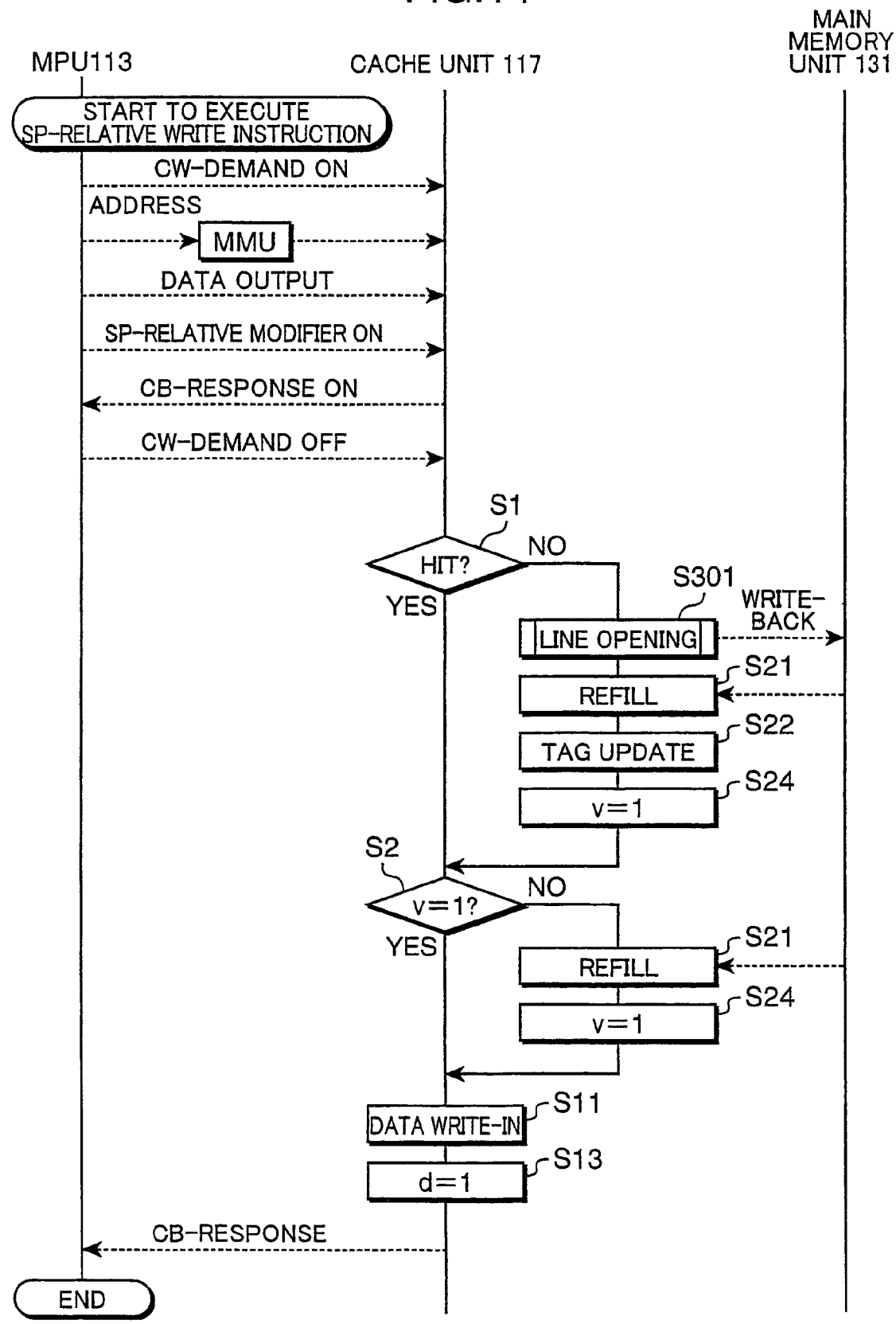
FIG. 14 is a flow chart, showing an operational sequence of the cache system in FIG. 1 when the MPU executes an SP-relative write instruction.

FIG. 14 is a flow chart, showing an operational sequence of the cache system 100 when the MPU 113 executes an SP-relative write instruction. When the MPU 113 starts to execute the SP-relative write instruction, the MPU 113 shown turns on a cache-write demand. At the same time, it outputs to the virtual address bus the logical address which shows the memory area desired to be read. In addition, it outputs the data desired to be written to the data bus which has a 32-bit width. Simultaneously, the MPU 113 turns on an SP-relative modifier signal. The SP-relative write detection portion 7 of the cache unit 117 receives these signals and thereby detects the MPU 113 executing a data writing demand which follows the SP-relative write instruction. In this respect, its operation is different from that of the above described random write. Along with this, the control section 200 of the cache unit 117 turns on a cache-busy response. The MPU 113 confirms that the cache-busy response has been turned on, and then, turns off the cache-read demand.

Next, using the same operation as that of the step S1 in the SP-relative read, the cache-miss decision portion 24 decides on the selection of a set and a way, and a cache hit or a cache miss (S1). The operation at the time when it is decided that the cache has been hit (NO at S1) is shown in the right column "SP-relative write" of the "operation" in FIG. 13(b) to (g).

If the cache has been hit (YES at S1) and the valid-flag on this line is 1 (YES at S2), the data writing portion 21 writes the contents of the data bus into the area which is equivalent to the lower four bits of the real address bus of this line (S11). Thereafter, if the dirty-flag is not yet 1, as shown in FIG. 13(b), (c), then the flag setting portion 27 sets the dirty-flag to 1 (S13). Then, the control section 200 turns off the cache-busy response signal. The operation at this time is shown in the right column "SP-relative write" of the "operation" in FIG. 13(b) to (e). The MPU 113 detects the cache-busy response signal having been turned off, and then, it is recognized that the SP-relative write is completed.

If the cache has been hit (YES at S1), but the valid-flag is 0 (NO at S2), as described earlier, that means that the value of the upper 20 bits of the address bus has coincided by chance with the contents of a certain tag, but that line is already opened and thus the cache has not been executed. Accordingly, in this case, after the refill portion 28 has executed the refill (S21), the flag setting portion 27 sets the valid-flag to 1 (S24). Thereafter, the control section 200 executes the same operation as that of FIG. 13(b). The operation at this time is shown in the right column "SP-relative write" of FIG. 13(f), (g).

On the other hand, the cache-miss decision portion 24 compares the upper 20 bits of the real address bus with the value (which is 20 bits) of the tag which has been read out. As a result, unless there is a coincidence in any way included in the set selected by the middle eight bits of the address bus, it is decided that the cache has not been hit (i.e., the cache has been missed). Then, one line is selected from among the four lines inside of the identical set, and then, the line is opened (S301).

Thereafter, the refill portion 28 refills the opened line with the corresponding from the memory area of the main memory unit 131 (S21). Next, the tag updating portion 26 updates the tag which corresponds to the refilled line (S22). Then, the flag setting portion 27 sets the valid-flag to 1 (S24). Thereafter, the control section 200 executes the same operation as that of FIG. 13(b). The operation at this time is shown in the right column "SP-relative write" of FIG. 13(a).

In any states shown in FIG. 13(a) to (g), the setting of the stack-flag is not executed, and thus, the state of the stack-flag is kept in its initial state. Also in this respect, the SP-relative write and the random read differs in operations. However, its operation is the same as that of the above described SP-relative read.

(2-5. Pop)

Figure 15:
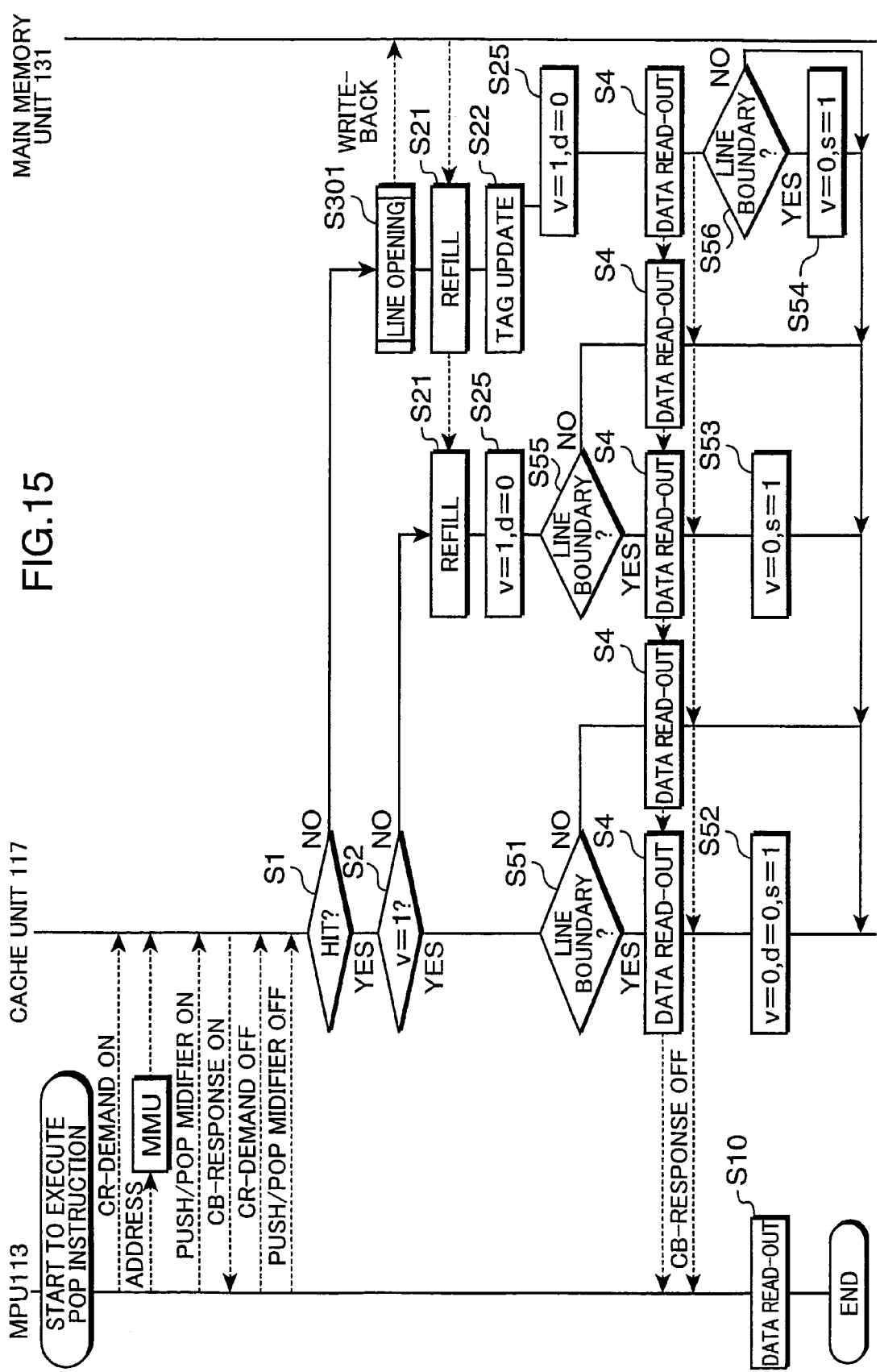
FIG. 15 is a flow chart, showing an operational sequence of the cache system in FIG. 1 when the MPU executes the pop instruction.

FIG. 15 is a flow chart, showing an operational sequence of the cache system 100 when the MPU 113 executes a pop instruction. When the MPU 113 executes the pop instruction, the MPU 113 shown turns on a cache-read demand. At the same time, it outputs to the virtual address bus the logical address which shows the memory area desired to be popped. Simultaneously, the MPU 113 turns on a push/pop modifier signal. The pop-access detection portion 12 of the cache unit 117 receives these signals and thereby detects the MPU 113 executing a data read-out demand which follows the pop instruction. In this respect, the pop and the above described random read and SP-relative read differ in operations. Along with this, the control section 200 of the cache unit 117 turns on a cache-busy response. The MPU 113 confirms that the cache-busy response has been turned on, and then, turns off the cache-read demand and the push/pop modifier signal.

The MMU 115 converts the upper 20 bits of the virtual address bus into the upper 20 bits of the physical address, and then, outputs them to the real address bus. The lower 15 bits of the virtual address bus are outputted as they are to the real address bus.

As described above, when the control section 200 receives a cache-read demand signal, first, it turns on a cache-busy response signal. Next, in the step 1, the cache-miss decision portion 24 considers the middle eight bits of the real address extracted by the address extract portion 13 to be a key, and then, selects one set in each way. Next, it reads out the value of the tag of the selected set. In addition, the cache-miss decision portion 24 decides whether the cache has been hit or missed. These operations are the same as those of the random read or the SP-relative read, and thus, their description is omitted.

If the value of the upper 20 bits of the real address bus coincides with the contents of the tag of a certain line inside of the selected set (YES at S1; the cache is hit) and the valid-flag of this line is 1 (YES at S2), then the control section 200 executes the operation of FIG. 16(b) to (e). At this time, from the decision (S51) by the boundary decision portion 23, if both the third bit of the real address bus (i.e., the fourth bit from the lowest figure, or the bit which shows the figure of the cube of two, and which is shown in the same way, hereinafter) and the second bit (i.e., the third bit from the lowest figure, or the bit which shows the figure of the square of two, and which is shown in the same way, hereinafter) are 1 (YES at S51), then the control section 200 executes the operation in the left column "pop out of the highest address" of the operation in FIG. 16(b) to (e). In other words, the data read-out portion 22 reads out the data which is equivalent to the lower four bits of the real address bus from this line, and then, outputs it to the 32-bit width data bus (S4). Thereafter, the control section 200 turns off the cache-busy response signal.

Next, the flag setting portion 27 sets the valid-flag of this line to 0 (S52), and opens this line. This is because data has been popped out of the highest address, and thereby, this stack has become empty. Although the flag setting portion 27 sets the valid-flag to 0 and opens this line, at this time, the write-back portion 29 does not execute write-back. This is because the contents of this line are not referred to again, and thus, there is no need to execute the write-back and store them in a main memory.

In addition, as shown in the left column "pop out of the highest address" of the operation in FIG. 16(b), (d), if the stack-flag of this line is off, the flag setting portion 27 turns on the stack-flag (S52), so that the fact that this line has been used as the stack can be stored.

Furthermore, as shown in the left column "pop out of the highest address" of the operation in FIG. 16(b), (e), if the dirty-flag of this line is on, the flag setting portion 27 turns off the dirty-flag (S52). This is because this line is opened, and thereby, the dirty-flag does not have any meaning. Moreover, in the step S52, the flag setting portion 27 may also turn off only the dirty-flag, without turning off the valid-flag, in other words, without opening the line. Therefore, in the step S300 or S301, when the need to open the corresponding line arises later, the write-back (S34) can be inhibited (NO at S33).

If at least either the third bit or the second bit of the real address bus is 0 (NO at S51), then the control section 200 executes the operation in the right column "pop out of other than the highest address" of the operation in FIG. 16(b) to (e). In other words, the data read-out portion 22 reads out the data which is equivalent to the lower four bits of the real address bus from this line, and then, outputs it to the 32-bit width data bus (S4). Thereafter, the control section 200 turns off the cache-busy response signal. The MPU 113 detects the cache-busy response signal having been turned off, and then, reads in the data which is the contents of the data bus which has a 32-bit width (S10). At this time, the flag setting portion 27 does not execute the operation of the flag or another operation.

If the value of the upper 20 bits of the real address bus coincides with the contents of the tag of a certain line inside of the selected set (YES at S1), but the valid-flag of this line is 0 (NO at S2), then the control section 200 executes the operation of FIG. 16(f), (g). In this case, the contents of the tag of a certain line inside of the selected set coincides by chance with the value of the upper 20 bits of the real address bus, but this state is equivalent to the fact that this line is already opened. Therefore, the refill portion 28 executes a refill (S21). From the decision (S55) by the boundary decision portion 23, if both the third bit and the second bit of the real address bus are 1 (YES at S55), then the control section 200 executes the operation in the left column "pop out of the highest address" of the operation in FIG. 16(f), (g).

In other words, the refill portion 28 refills this line with the information stored in the corresponding address from the main memory unit. Then, the flag setting portion 27 sets the valid-flag to 1 (S25). Then, the data read-out portion 22 reads out the data which is equivalent to the lower four bits of the real address bus from this line, and then, outputs it to the 32-bit width data bus (S4). Thereafter, the control section 200 turns off the cache-busy response signal.

At this time, if the stack-flag is 0, the flag setting portion 27 sets the stack-flag to 1 (in the left column "pop out of the highest address" of the operation in FIG. 16(f); S53). Further, the flag setting portion 27 returns the valid-flag to 0 (in the left column "pop out of the highest address" of the operation in FIG. 16(f), (g); S53). So, this line can be opened by executing the pop out of the highest address.

If at least either the third bit or the second bit of the real address bus is 0 (NO at S55), then the control section 200 executes the operation in the right column "pop out of other than the highest address" of the operation in FIG. 16(f), (g). In other words, even in this case, the flag setting portion 27 refills this line with the information stored in the corresponding address from the main memory unit 131 (S21). Then, the flag setting portion 27 sets the valid-flag to 1 (S25). Then, the data writing portion 21 reads out the data which is equivalent to the lower four bits of the real address bus from this line, and then, outputs it to the 32-bit width data bus (S4). Thereafter, the control section 200 turns off the cache-busy response signal. Thereafter, the flag setting portion 27 does not execute the operation of the flag or another operation. Herein, in FIG. 15, an example is shown in which the processing in the step S21 and S25 is executed before the decision in the step S55. However, the processing in the step S21 and S25 may also be executed, regardless of the decision after the step S55.

If there is no coincidence between the value of the upper 20 bits of the real address bus and the contents of the tag of the line inside of the selected set (NO at S1), the cache-miss decision portion 24 decides that the cache has been missed. Based on that, the control section 200 executes the operation of FIG. 16(a). In other words, using the LRU algorithm, the line opening portion 25 opens one line from this set (S301). The refill portion 28 refills that line with the information stored in the corresponding address from the main memory unit 131. Thereafter, the tag updating portion 26 updates the tag which corresponds to the refilled line. Next, the flag setting portion 27 sets the valid-flag which corresponds to the line to 1 and sets the dirty-flag to 0 (S25). Then, the data read-out portion 22 reads out the data which is equivalent to the lower four bits of the real address bus from this line, and then, outputs it to the 32-bit width data bus (S4). Thereafter, the control section 200 turns off the cache-busy response signal (as shown in FIG. 16(a)).

Furthermore, from the decision (S56) by the boundary decision portion 23, if both the third bit and the second bit of the real address bus are 1 (YES at S56), then the flag setting portion 27 sets the stack-flag to 1 (in the left column "pop out of the highest address" of the operation in FIG. 16(a); S54). In addition, at this time, the flag setting portion 27 returns the valid-flag to 0 (in the left column "pop out of the highest address" of the operation in FIG. 16(a); S54). So, this line can be opened by executing the pop out of the highest address.

As described above, when the MPU 113 executes the pop instruction, if the small area in which data is to be read out is on the line boundary (YES at S51, S55, S56), then the control section 200 opens this line, without writing the data held on the line back to the main memory unit 131 (i.e., the setting of v=0 is executed at S52, S53, S54). No trouble arises even though the line is opened, because it only holds the data which will not be read out again any more by the read-out through the pop instruction. Besides, the data held on this line is useless data, and thus, there is no need to write it back to the main memory unit 131. Thus, the control section 200 opens the line holding the useless data without writing it back. This heightens the speed of memory access, without hindering the MPU 113 from working properly.

Furthermore, if the small area in which read-out is to be executed is not on the line boundary (NO at S51, S55, S56), then the control section 200 opens the line. Therefore, the MPU 113 can complete the read-out of data by the pop instruction, not only with the address which corresponds to the small area which is adjacent to the line boundary, but also with the address which corresponds to the small area which is not adjacent to the line boundary.

As described already, in the step S52, without setting the valid-flag to 0, the valid-flag may be set to 0. Thereby, in the case where the MPU 113 executes other instructions or in other cases, when opening a line after a cache miss (S300, S301), the control section 200 skips the write-back (S34) of the data of the line to the main memory unit 131. This heightens the speed of memory access.

Figure 17:
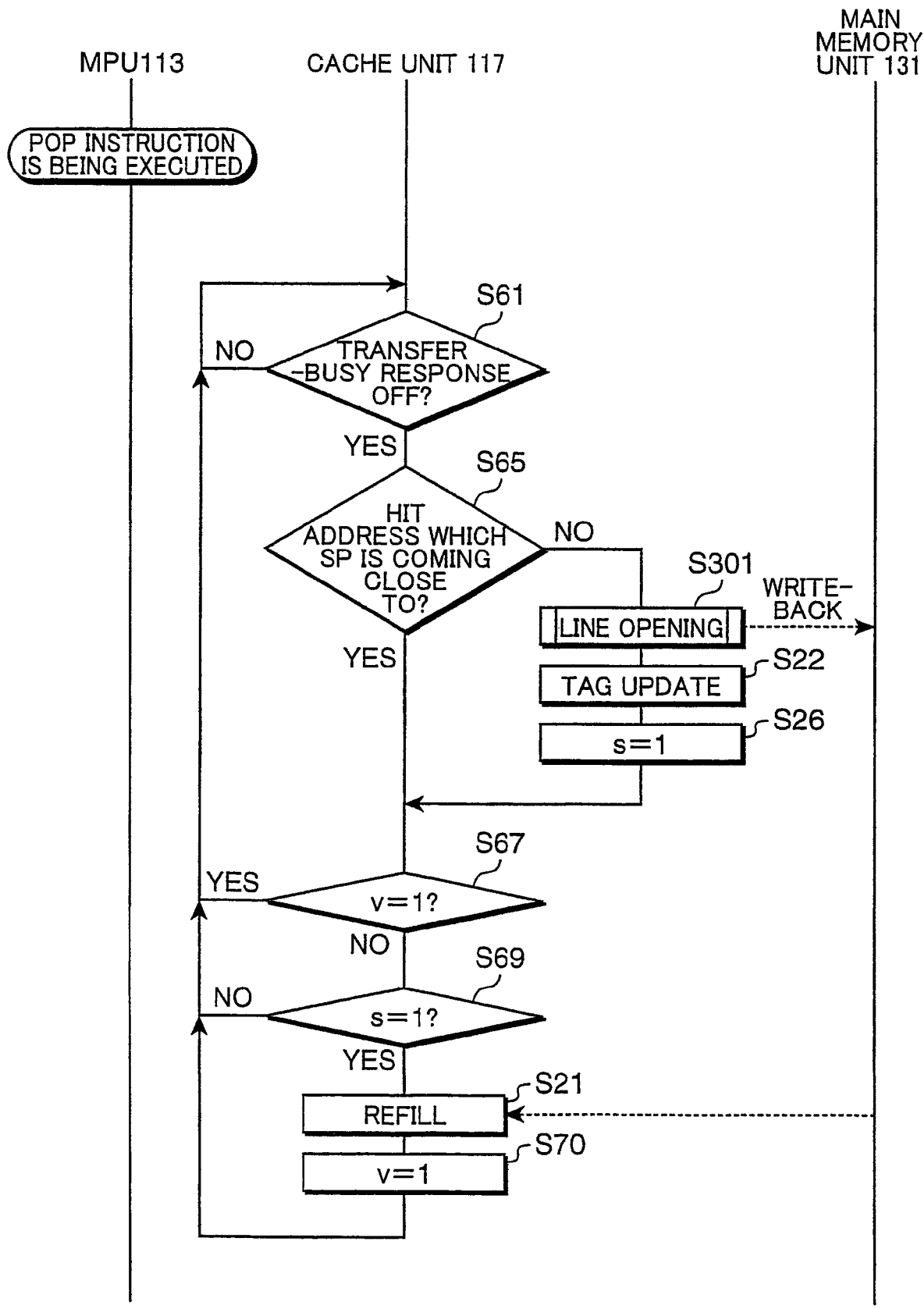
FIG. 17 is a flow chart, showing an operational sequence of another processing which is executed in parallel with the processing of FIG. 15 when the MPU is executing the pop instruction.

As shown in FIG. 17, after the above described operations or in the midst of them, if a transfer-busy response signal is off, the transfer data bus is vacant. Hence, the control section 200 executes in advance the refill of the memory which is likely to be required soon. This makes the speed of memory access far higher. Specifically, if the transfer-busy decision portion 15 detects the transfer-busy response signal being turning off (YES at S61), then the control section 200 finds one line which corresponds to the offset address that is the address where the upper 28 bits of the real address shown by the value of the tag which is included in the line and the set which includes the line is larger by one or two than the upper 28 bits of the real address of the present SP. Then, it executes the operation shown in the right column "the SP has come close from below" of the operation in FIG. 18. In other words, the offset calculation portion 14 calculates that offset address, and the cache-miss decision portion 24 decides whether or not a cache miss has taken place on the line which corresponds to the offset address (S65).

If the cache-miss decision portion 24 was able to find such a line (YES at S65) and the valid-flag of that line is 1 (YES at S67), then the control section 200 executes no operation (refer to the right column (b) to (e) of the operation in FIG. 18).

Even though the cache-miss decision portion 24 was able to find such a line (YES at S65), if the valid-flag of that line is 0 (NO at S67) and the line is allocated to the stack (YES at S69), then the refill portion 28 executes the refill of the line (S21). Thereafter, the flag setting portion 27 sets the valid-flag to 1 (S70) (as shown in the right column (g) of the operation in FIG. 18).

If the cache-miss decision portion 24 was able to find such a line (YES at S65), the valid-flag of that line is 0 (NO at S67) and the line is not allocated to the stack (NO at S69), then the refill portion 28 executes no operation (refer to the right column (f) of the operation in FIG. 18).

In addition, unless the cache-miss decision portion 24 was able to find such a line (NO at S65), that means the cache is not executed in the memory area of the main memory unit, which is right above the present stack pointer SP with respect to the order of addresses and is likely to be read soon by a pop. Therefore, the control section 200 refills the cache in the area of the main memory unit where the upper 28 bits of the real address is larger by one than the upper 28 bits of the real address of the present SP, and the lower four bits are 0 (refer to the right column (a) of the operation in FIG. 18; S21).

Specifically, using the set which corresponds to the address which is larger by one than the upper 28 bits of the real address of the present stack pointer SP, the line opening portion 25 decides the line opened by the LRU, and then, opens the decided line (S301). Thereafter, the tag updating portion 26 updates the tag (S22), and then, the flag setting portion 27 sets the stack-flag to 1 (S26). Next, on the line, the refill portion 28 executes the refill of the area of the main memory unit where the upper 28 bits of the real address is larger by one than the upper 28 bits of the real address of the present SP, and the lower four bits are 0 (S21). Next, the flag setting portion 27 sets the valid-flag of the line to 1 (S70).

Figure 19:
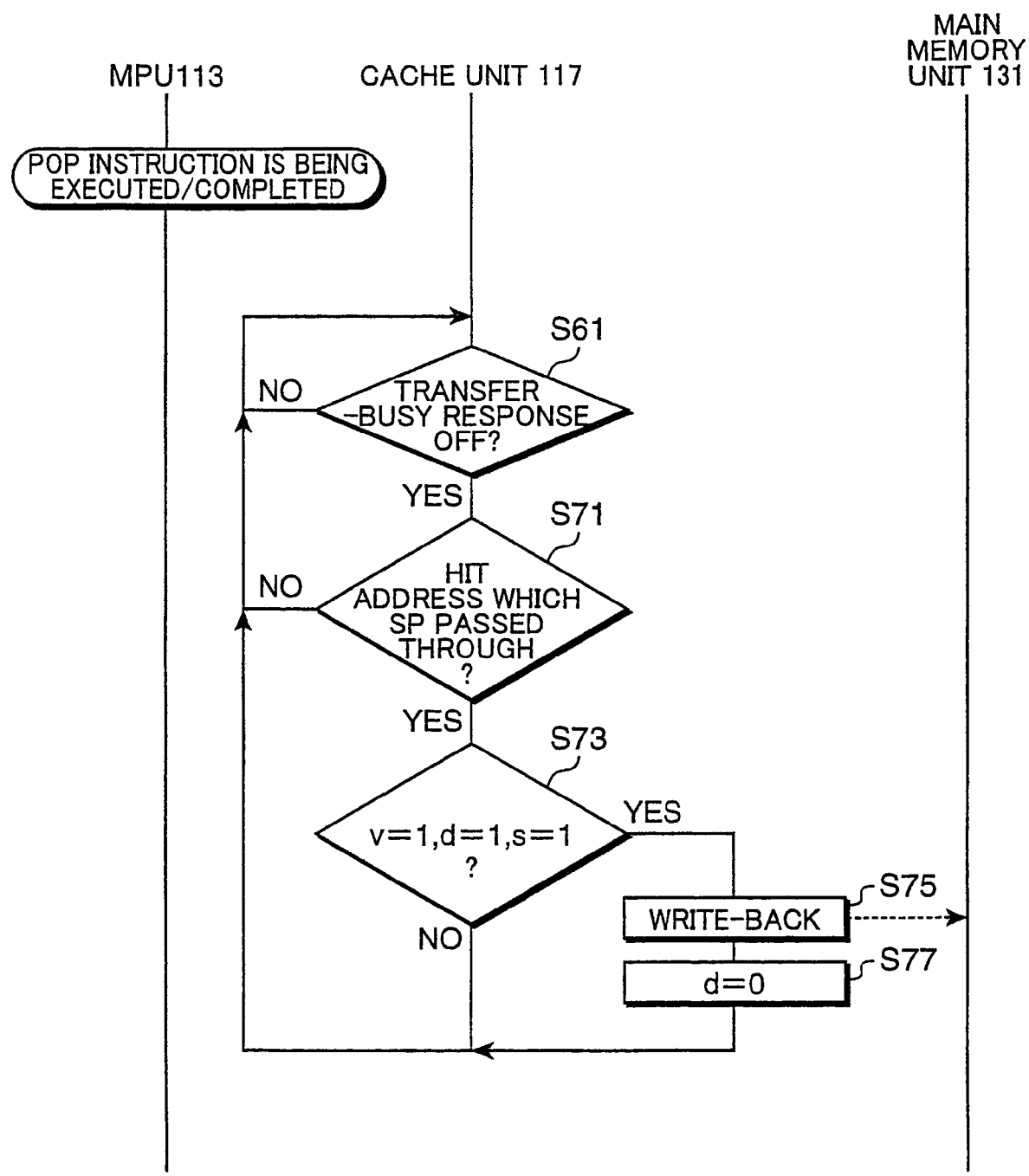
FIG. 19 is a flow chart, showing an operational sequence of still another processing which is executed in parallel with the processing of FIG. 15 when the MPU is executing the pop instruction.

Further, at the same time, as shown in FIG. 19, if the transfer-busy response signal is off (YES at S61), then the offset calculation portion 14 calculates another offset address which is the address where the upper 28 bits of the real address shown by the value of the tag which is included in the line and the set which includes the line is smaller than the upper 28 bits of the real address of the present SP. The cache-miss decision portion 24 searches for the line which corresponds to this offset address (as shown in S71). If the cache-miss decision portion 24 was able to find such a line (YES at S71), then the control section 200 executes the operation shown in the left column "the SP moves up" of the operation in FIG. 10.

In other words, if the cache-miss decision portion 24 was able to find such a line (YES at S71), and in addition, all the valid-flag, the dirty-flag and the stack-flag of the line are 1 (YES at S73), then the write-back portion 29 executes the write-back of the line (S75), and the flag setting portion 27 sets the dirty-flag to 0 (S77) (as shown in the left column (e) of the operation in FIG. 10).

Unless the cache-miss decision portion 24 was able to find such a line (YES at S71), or if any of the valid-flag, the dirty-flag and the stack-flag is 0 (NO at S73) even though it was able to find it, then the control section 200 executes no operation (refer to the left column (a) to (d), (f), (g) of the operation in FIG. 10).

As described above, the control section 200 writes back the data of the line on which the read-out is completed according to the pop instruction, in other words, the data which will not be read out again (S75). Therefore, there is no need to execute write-back (S34) when that line is opened later (S300, S301). This heightens the speed of memory access.

(2-6. Push)

Figure 20:
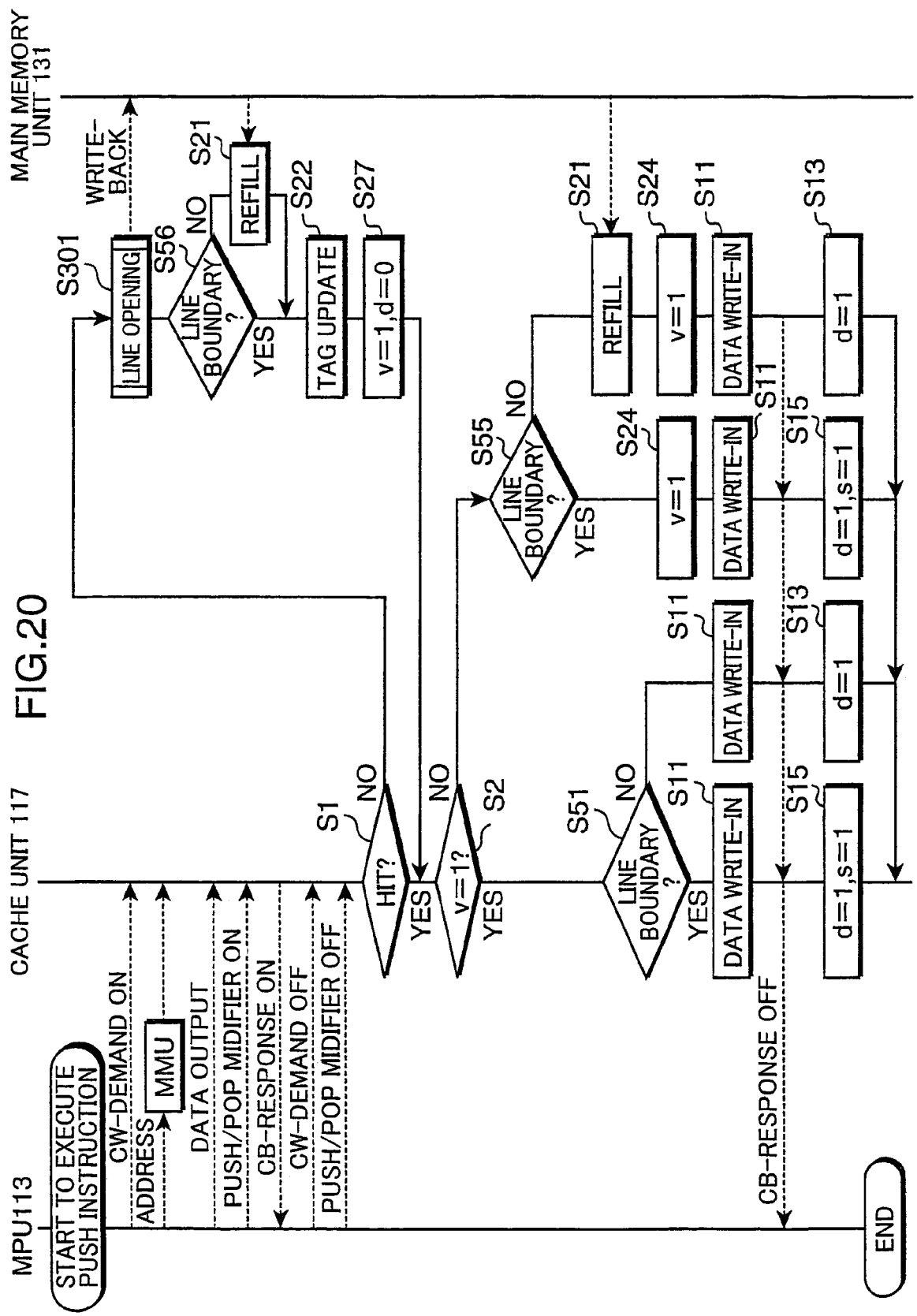
FIG. 20 is a flow chart, showing an operational sequence of the cache system in FIG. 1 when the MPU executes the push instruction.

FIG. 20 is a flow chart, showing an operational sequence of the cache system 100 when the MPU 113 executes a push instruction. When the MPU 113 executes the push instruction, the MPU 113 shown turns on a cache-write demand signal. At the same time, it outputs to the virtual address bus the logical address which shows the memory area desired to be read. In addition, it outputs the word data desired to be written to the data bus which has a 32-bit width. Simultaneously, the MPU 113 turns on a push/pop modifier signal. The push access detection portion 11 of the cache unit 117 receives these signals and thereby detects the MPU 113 executing a data writing demand which follows the push instruction. In this respect, the push and the above described random write and SP-relative write differ in operations. Along with this, the control section 200 of the cache unit 117 turns on a cache-busy response. The MPU 113 confirms that the cache-busy response has been turned on, and then, turns off the cache-write demand and the push/pop modifier signal.

Next, in the same operation as that of the step S1 in the pop, the cache-miss decision portion 24 executes the selection of a set and a way, and the decision of a cache hit or a cache miss (S1). These operations are the same as the corresponding ones in the random write or the SP-relative write, and thus, their description is omitted.

If the value of the upper 20 bits of the real address bus coincides with the contents of the tag of a certain line inside of the selected set (YES at S1; the cache is hit) and the valid-flag of this line is 1 (YES at S2), then the control section 200 executes the operation in the left column "push into the highest address" of the operation or in the right column "push into other than the highest address" of the operation of FIG. 21(b) to (e). At this time, from the decision (S51) by the boundary decision portion 23, if both the third bit and the second bit are 1 (YES at S51), then the control section 200 executes the operation in the left column "push into the highest address" of the operation in FIG. 21(b) to (e). In other words, the data writing portion 21 reads in the word data which should be written from the 32-bit width data bus, and writes it into the area which is equivalent to the lower four bits of the real address bus on this line (S11). Thereafter, the control section 200 turns off the cache-busy response signal (as shown in the left column "push into the highest address" of the operation in FIG. 21(b) to (e)).

Next, if the dirty-flag of this line is 0 (NO at S73), then the flag setting portion 27 sets the dirty-flag to 1 (refer to the left column "push into the highest address" of the operation in FIG. 21(b), (c); S15). Further, if the dirty-flag of this line is 0, then the flag setting portion 27 sets the stack-flag to 1 (refer to the left column "push into the highest address" of the operation in FIG. 21(b), (d); S15). Thereafter, the MPU 113 detects the cache-busy response signal having been turned off, and then, it is recognized that the processing by the push instruction is completed.

If at least either the third bit or the second bit of the real address bus is 0 (NO at S51), then the control section 200 executes the operation in the right column "push into other than the highest address" of the operation in FIG. 21(b) to (e). In other words, the data writing portion 21 reads in the word data desired to be written from the 32-bit width data bus, and writes it into the area which is equivalent to the lower four bits of the real address bus on this line (S11).

Thereafter, the control section 200 turns off the cache-busy response signal (as shown in the right column "push into other than the highest address" of the operation in FIG. 21(*b*) to (*e*)). Next, if the dirty-flag of this line is 0, then the flag setting portion 27 sets the dirty-flag to 1 (refer to the right column "push into other than the highest address" of the operation in FIG. 21(*b*), (*c*); S13). The flag setting portion 27 executes no other flag operation. The MPU 113 detects the cache-busy response signal having been turned off, and then, it is recognized that the processing by the push instruction is completed.

If the value of the upper 20 bits of the real address bus coincides with the contents of the tag of a certain line inside of the selected set (YES at S1), but the valid-flag of this line is 0 (NO at S2), then the control section 200 executes the operation of FIG. 21(*f*), (*g*). In this case, the contents of the tag of a certain line inside of the selected set coincides by chance with the value of the upper 20 bits of the real address bus, but this state is equivalent to the fact that this line is already opened. From the decision (S55) by the boundary decision portion 23, if both the third bit and the second bit of the real address bus are 1 (YES at S55), then the operation is executed which is in the left column "pop into the highest address" of the operation in FIG. 21(*f*), (*g*). In other words, the refill portion 28 does not refill this line with the information stored in the corresponding address from the main memory unit. Then, the flag setting portion 27 sets the valid-flag to 1 (S24).

Next, the data writing portion 21 reads in the word data desired to be written from the 32-bit width data bus, and writes it into the area which is equivalent to the lower four bits of the real address bus on this line (S11). Next, the control section 200 turns off the cache-busy response signal (as shown in the left column "push into the highest address" of the operation in FIG. 21(*f*),(*g*)). The MPU 113 detects the cache-busy response signal having been turned off, and then, it is recognized that the processing by the push instruction is completed. The flag setting portion 27 sets the dirty-flag to 1 (refer to the left column "push into the highest address" of the operation in FIG. 21(*f*), (*g*); S15). At this time, if the stack-flag is 0, then the flag setting portion 27 sets the stack-flag to 1 (refer to the left column "push into the highest address" of the operation in FIG. 21(*f*)); S15).

In the decision at the step 55, if at least either the third bit or the second bit of the real address bus is 0 (NO at S55), then the control section 200 executes the operation in the right column "push into other than the highest address" of the operation in FIG. 21(*f*), (*g*). In other words, the refill portion 28 refills this line with the information stored in the corresponding address from the main memory unit (S21). Next, the flag setting portion 27 sets the valid-flag to 1 (S24). Next, the data writing portion 21 reads in the word data desired to be written from the 32-bit width data bus, and writes it into the area which is equivalent to the lower four bits of the real address bus on this line (S11). Thereafter, the control section 200 turns off the cache-busy response signal. In accordance with this, the flag setting portion 27 sets the dirty-flag to 1.

In the decision at the step S1, if there is no coincidence between the value of the upper 20 bits of the real address bus and the contents of the tag of the line inside of the selected set (NO at S1), the cache-miss decision portion 24 decides that the cache has been missed. Based on that, the control section 200 executes the operation of FIG. 21(*a*). In other words, using the LRU algorithm, the line opening portion 25 opens one line from this set (S301). From the decision (S56) by the boundary decision portion 23, if both the third bit and the second bit of the real address bus are 1 (YES at S56), then the refill portion 28 does not refill this line with the information stored in the corresponding address from the main memory unit. Then, the flag setting portion 27 sets the valid-flag to 1 (S24). Consecutively, the tag updating portion 26 changes the tag which corresponds to the opened line (S22). Next, the flag setting portion 27 sets the valid-flag to 1; the dirty-flag to 0; and the stack-flag to 0 (S27). Thereby, the state becomes the same as in FIG. 21(*b*), and thereafter, the control section 200 executes the operation of FIG. 21(*b*).

In the decision at the step S56, if at least either the third bit or the second bit of the real address bus is 0 (NO at S56), then the refill portion 28 refills this line with the information stored in the corresponding address from the main memory unit (S21). Thereafter, in the same way as the case where the decision at the step S56 is YES, the control section 200 executes the processing in the step S22 and the following steps.

As described above, when the MPU 113 executes the push instruction, if the small area into which data should be written is on the line boundary (YES at S56), then the control section 200 does not execute a useless refill (S21) after the line opening (S301) following the cache miss. This heightens the speed of memory access. Furthermore, if the small area into which the writing of data should be executed is not on the line boundary (NO at S56) and a cache miss has taken place, then the control section 200 executes a refill (S21). Therefore, the MPU 113 can start the consecutive writing of data by the push instruction, not only from the address which corresponds to the small area which is adjacent to the line boundary, but also from the address which corresponds to the small area which is not adjacent to the line boundary.

Moreover, not only if the line has been opened (S301), but also if the valid-flag is 0 which indicates the line opening (NO at S2), then the control section 200 selects whether or not a refill should be executed, according to the position of the small area into which data should be written (S55). Therefore, even though the line is already opened, a useless refill can be avoided, thereby making the speed of memory access far higher.

Figure 22:
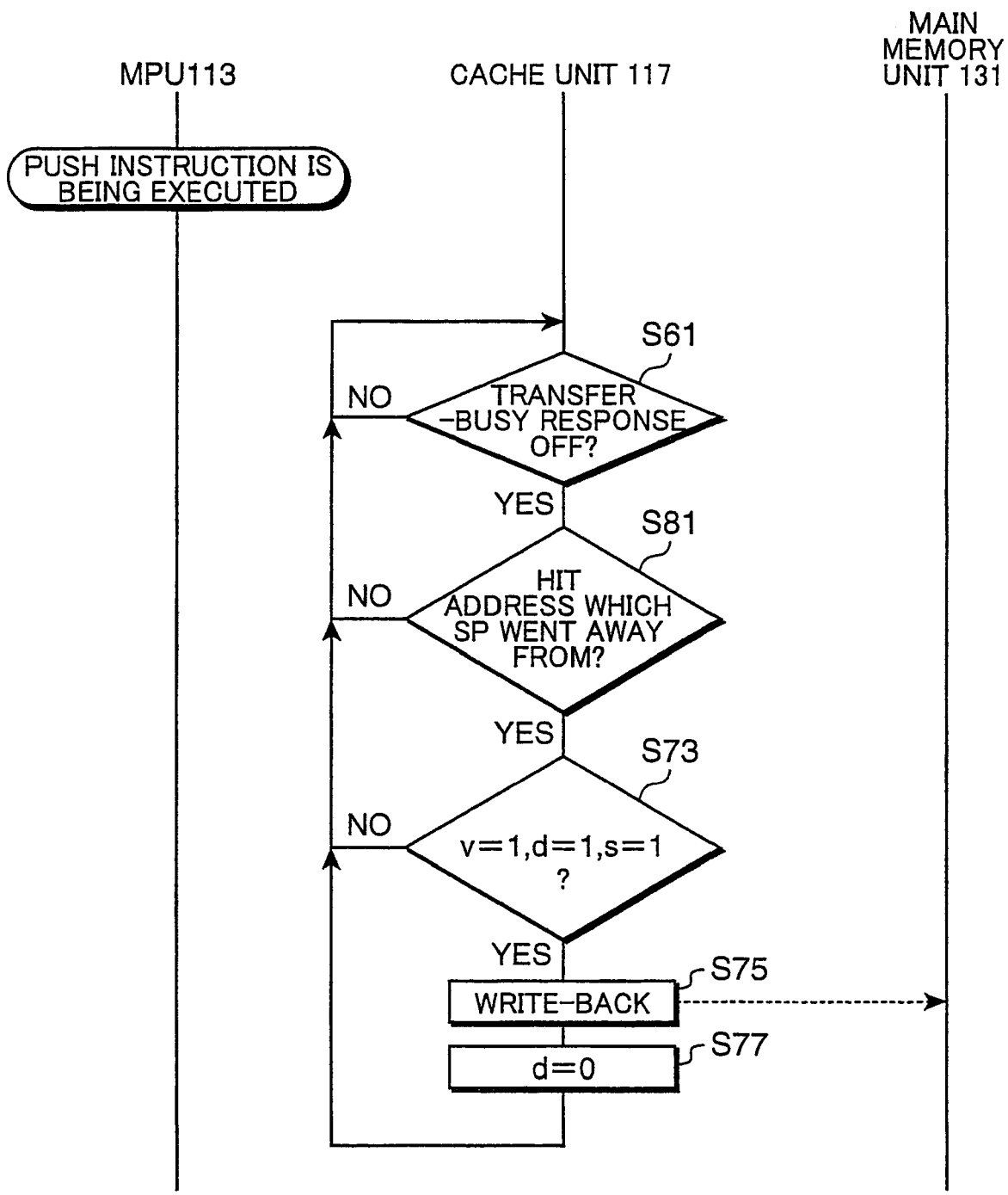
FIG. 22 is a flow chart, showing an operational sequence of another processing which is executed in parallel with the processing of FIG. 21 when the MPU is executing the push instruction.

As shown in FIG. 22, after the above described operations or in the midst of them, if a transfer-busy response signal is off, the transfer data bus is vacant. Hence, the control section 200 executes in advance the write-back of the memory which is unlikely to be required for a while. Specifically, if the transfer-busy decision portion 15 detects the transfer-busy response signal being turning off (YES at S61), then the control section 200 finds one line which corresponds to the offset address that is the address where the value of the tag which is included in the line is larger than the upper 20 bits of the real address of the present SP, or, one line which corresponds to the address (which is also called the offset address) where the upper 28 bits of the real address shown by the value of the tag which is included in the line and the set which includes the line is larger by three or more than the upper 28 bits of the real address of the present SP, which is a unit of the address conversion of the MMU 115. Then, it executes the operation shown in the left column "the SP has gone away downward" of the operation in FIG. 18. In other words, the offset calculation portion 14 calculates that offset address, and the cache-miss decision portion 24 decides whether or not a cache miss has taken place on the line which corresponds to the offset address (S81).

Even though the cache-miss decision portion 24 was able to find such a line (YES at S81), but if at least any one of the valid-flag, the dirty-flag and the stack-flag of the line is 0 (NO at S73), then the control section 200 executes no operation (refer to the left column (b) to (d), (f), (g) of the operation in FIG. 18). If the cache-miss decision portion 24 was able to find such a line (YES at S81), and all the valid-flag, the dirty-flag and the stack-flag of that line are 1 (YES at S73), then the write-back portion 29 executes the write-back of the line (S75). Consecutively, the flag setting portion 27 sets the dirty-flag to 0 (S77) (as shown in the left column (e) of the operation in FIG. 8). Accordingly, when this line is opened later using the LRU algorithm, there is no need to write it back, thereby heightening the speed of processing.

Unless the cache-miss decision portion 24 was able to find such a line (NO at S81), then the control section 200 executes no operation (refer to the left column (a) of the operation in FIG. 18).

3. OPERATION EXAMPLE 1

Hereinafter, an operation example of the data memory cache system according to the embodiment of the present invention will be described in detail with reference to FIG. 23 to FIG. 29, using an example in which a general-purpose CPU which executes a program described in the C-language is used as the MPU 113.

Figure 23:
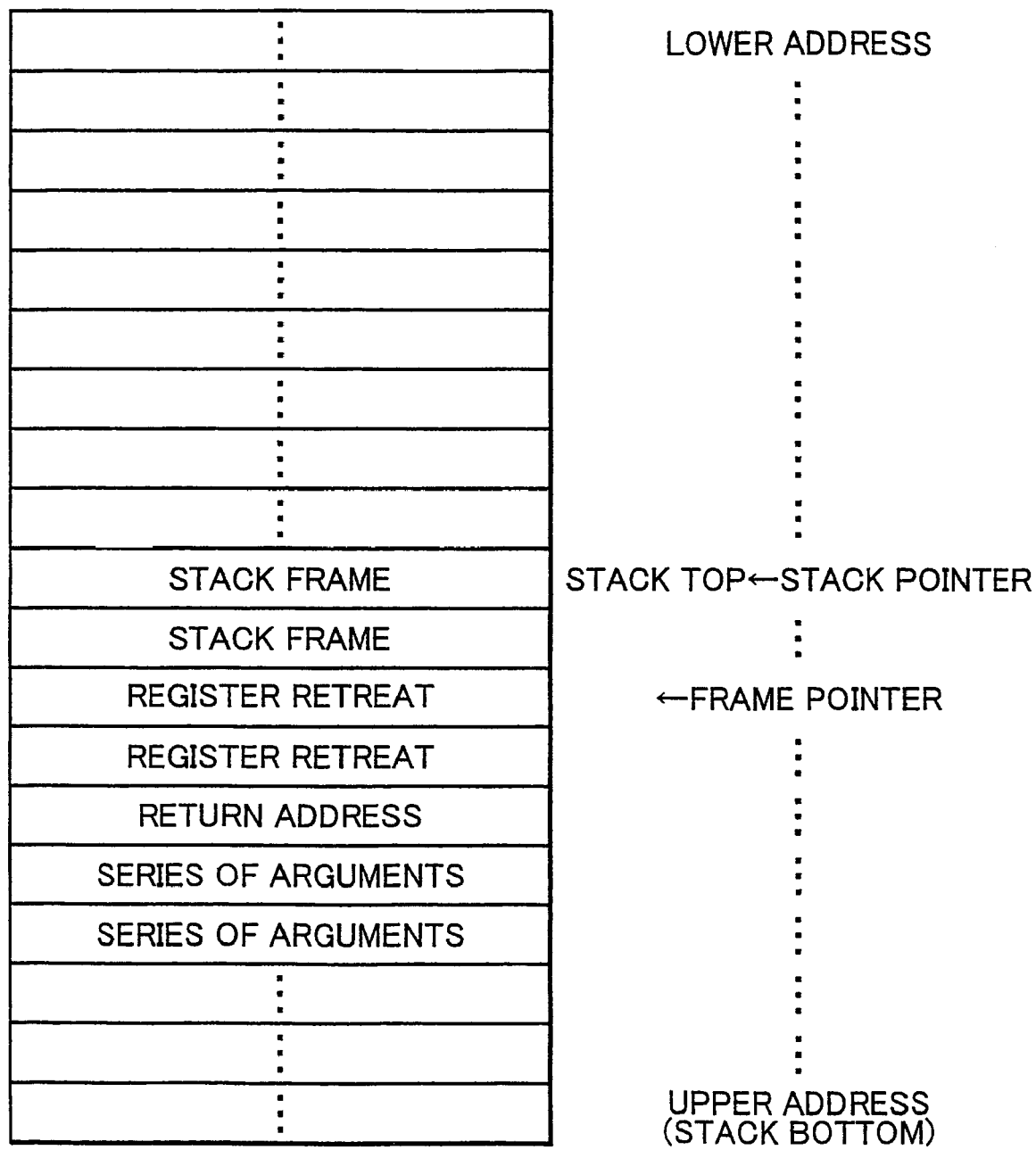
FIG. 23 is a representation, showing the stack structure of a C-language.

In the program described in the C-language, for example, a stack structure is used which grows from the upper address toward the lower address. This program uses an exclusive-purpose stack pointer (or SP) housed in the general-purpose CPU. As a frame pointer (or FP), it uses a general-purpose register housed in the general-purpose CPU, and executes access to this stack structure. An example of the stack structure at this time is shown in FIG. 23. This example shows only the stack structure which relates to the execution of one function. In practice, it has a structure in which the stack structures which correspond to the number of function calls which have already been executed are stacked downward.

Figure 24:
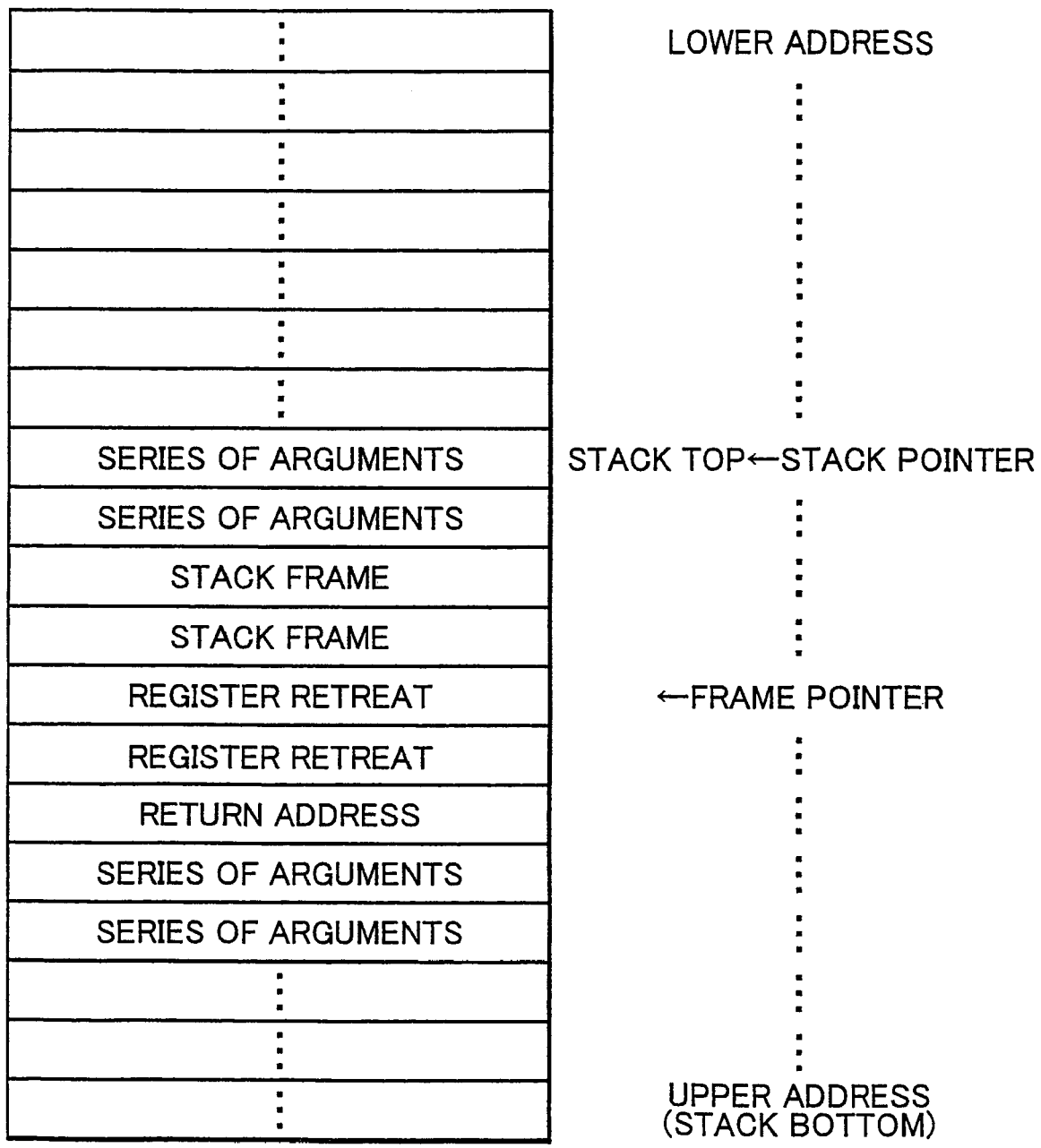
FIG. 24 is a representation, showing a stack structure immediately after arguments have been generated.

Next, description will be given about how this structure is generated (or changed) by a new function call in the C-language. When a function in the C-language is called, first, the side which calls the function uses a push instruction for the stack top and generates an argument necessary for processing on the function side, so that this argument is delivered to the function. The stack structure immediately after this argument has been generated is shown in FIG. 24.

Figure 25:
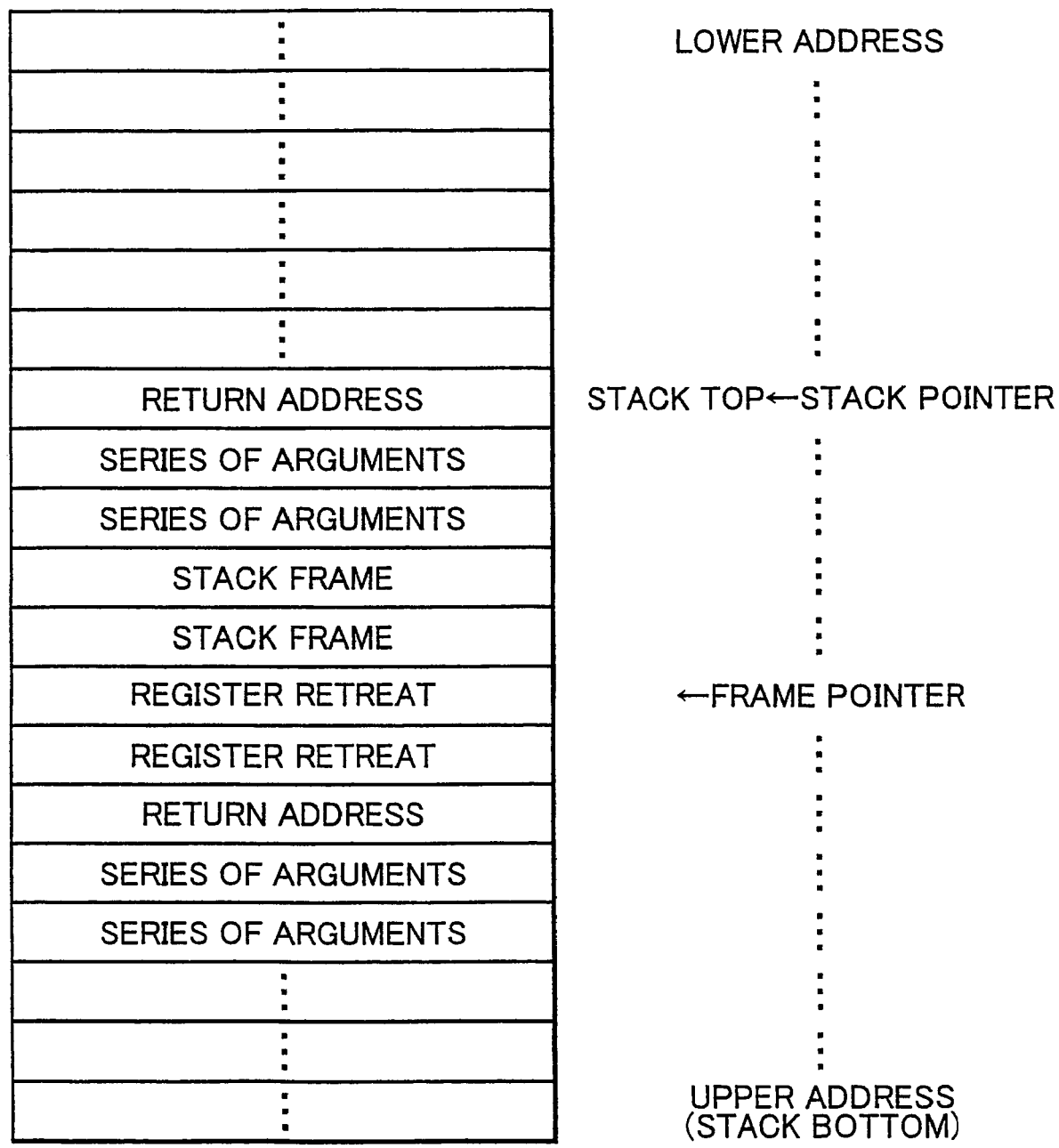
FIG. 25 is a representation, showing a stack structure immediately after a function has been called.

Next, a function call is executed. At this time, a push instruction is executed so that a return address from the function retreats to the stack. The stack structure immediately after this function has been called is shown in FIG. 25.

Figure 26:
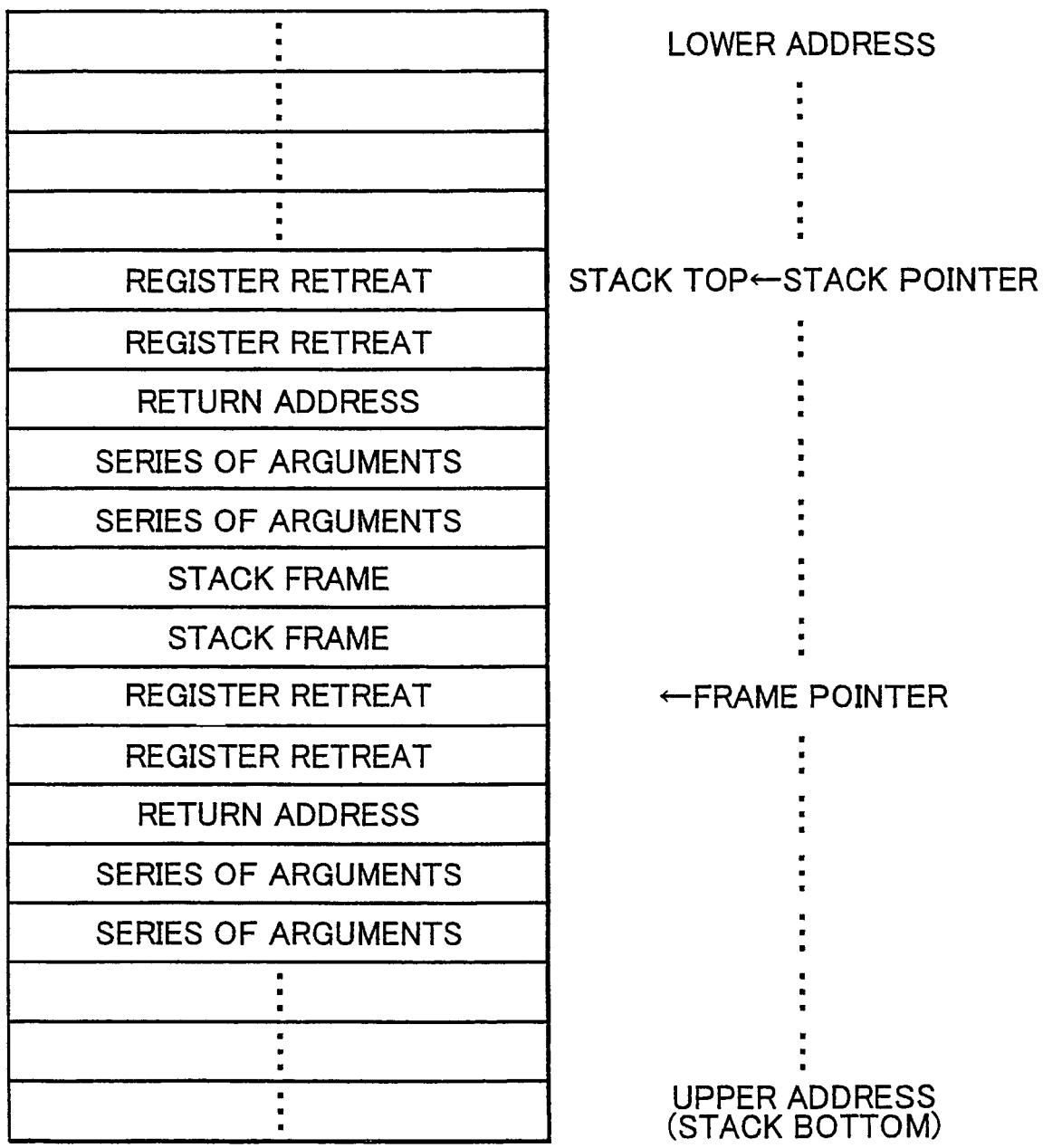
FIG. 26 is a representation, showing a stack structure immediately after registers have retreated.

Next, the execution of the program is shifted to the function side which has been called. The called function side, first, executes the push instruction, and allows the register used in the function which also includes the frame pointer to retreat to the stack. The stack structure immediately after the register has retreated is shown in FIG. 26.

Figure 27:
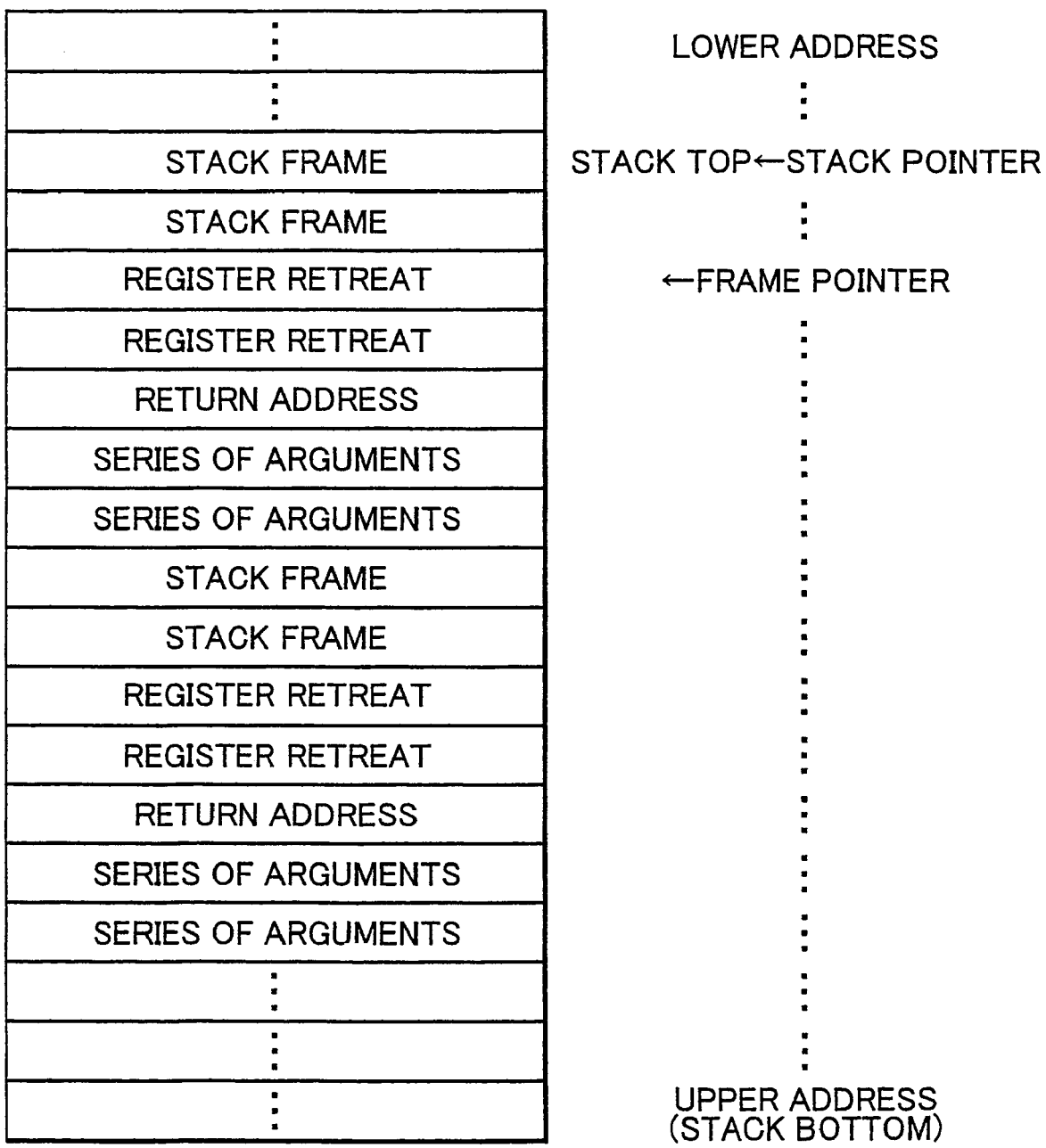
FIG. 27 is a representation, showing a stack structure immediately after stack frames have been generated.

Next, in the function which has been called, the value of the stack pointer is set for the frame pointer. In order to generate a stack frame, the size of the stack frame is subtracted from the stack pointer. Thereby, the stack pointer moves to the lower address side. Then, the stack frame is generated between the stack pointer and the frame pointer. The stack structure immediately after the stack frame has been generated is shown in FIG. 27.

On the called function side, next, instructions are executed, such as frame-pointer relative read and write instructions, stack-pointer relative read and write instructions, and random read and write instructions. Then, processing is executed for the function argument by accessing the argument, accessing the stack frame, and accessing the necessary information. Besides, if necessary, another function call can also be executed.

On the called function side, if the processing for the function is completed, in order to discard the stack frame which has been used, the size of the stack frame is added to the stack pointer. Then, a pop instruction is executed, and the register which has retreated is restored. The stack structure at this time is restored to the same state as the stack structure immediately after the function has been called, as shown in FIG. 25.

Next, the pop instruction is executed, and an address is fetched for returning to the function on the side which has called. By a return instruction, the program execution is returned from the called function to the calling function. The stack structure at this time is restored to entirely the same state as the stack structure immediately after the argument has been generated, as shown in FIG. 24. On the returned calling function side, in order to discard a series of arguments, the size of the series of arguments is added to the stack pointer. For example, in an example of FIG. 24, it is the value which is equivalent to two times the word size.

By the above described processing, the stack structure returns to the structure before the function calling processing starts. The stack structure at this time is shown in FIG. 23.

FIG. 28 shows the state of a cache line immediately after the stack frame has been generated in a series of processing which relates to the above described function calling. As shown in FIG. 28, parts other than the stack frame are used as the stack. Thus, the stack-flag of the line is set to 1. The unit of the cache line is 16 bytes, and the unit of the stack structure is four bytes. Hence, the boundary between the stack frame and the register retreat stack not necessarily coincides with the boundary of the cache line.

According to the present invention, on the line where the register retreat stack and the stack frame are located together, the stack-flag is set to 1. In addition, on the line where the stack frame and the series of arguments are located together, the stack-flag is set to 0. During the period when the function processing is executed, if access is executed to the series of arguments or the stack frame, then such access is usually executed by the random read and write instructions. Therefore, the stack-flag which is set to 1 changes to 0. Accordingly, also on the line where the register retreat stack and the stack frame are located together, or on the line where the series of arguments and the return address are located together, the stack-flag changes to 0. The state of the flag of each line at this time is shown in FIG. 29.

4. OPERATION EXAMPLE 2

Hereinafter, another operation example of the data memory cache system according to the embodiment of the present invention will be described in detail with reference to FIG. 29 to FIG. 34, using an example in which a general-purpose CPU which executes a program described in the Java (which is a registered trademark) language is used as the MPU 113.

The program described in the C-language, for example, is executed by an interpreter described in the C-language. This interpreter includes a program counter for executing the program described in the C-language, and in addition, a Java (which is a registered trademark) program counter necessary for housing a Java (which is a registered trademark) virtual machine. Besides, the stack structure is provided with a stack structure for executing the program described in the C-language, and in addition, a Java (which is a registered trademark) stack structure necessary for housing a Java (which is a registered trademark) virtual machine.

As the Java (which is a registered trademark) stack structure, for example, a stack structure can also used which grows from the upper address toward the lower address. In this Java (which is a registered trademark) stack structure, for example, a general-purpose register housed in the general-purpose CPU is used as a stack pointer (or SP) which executes access to the Java (which is a registered trademark) stack structure.

Figure 30:
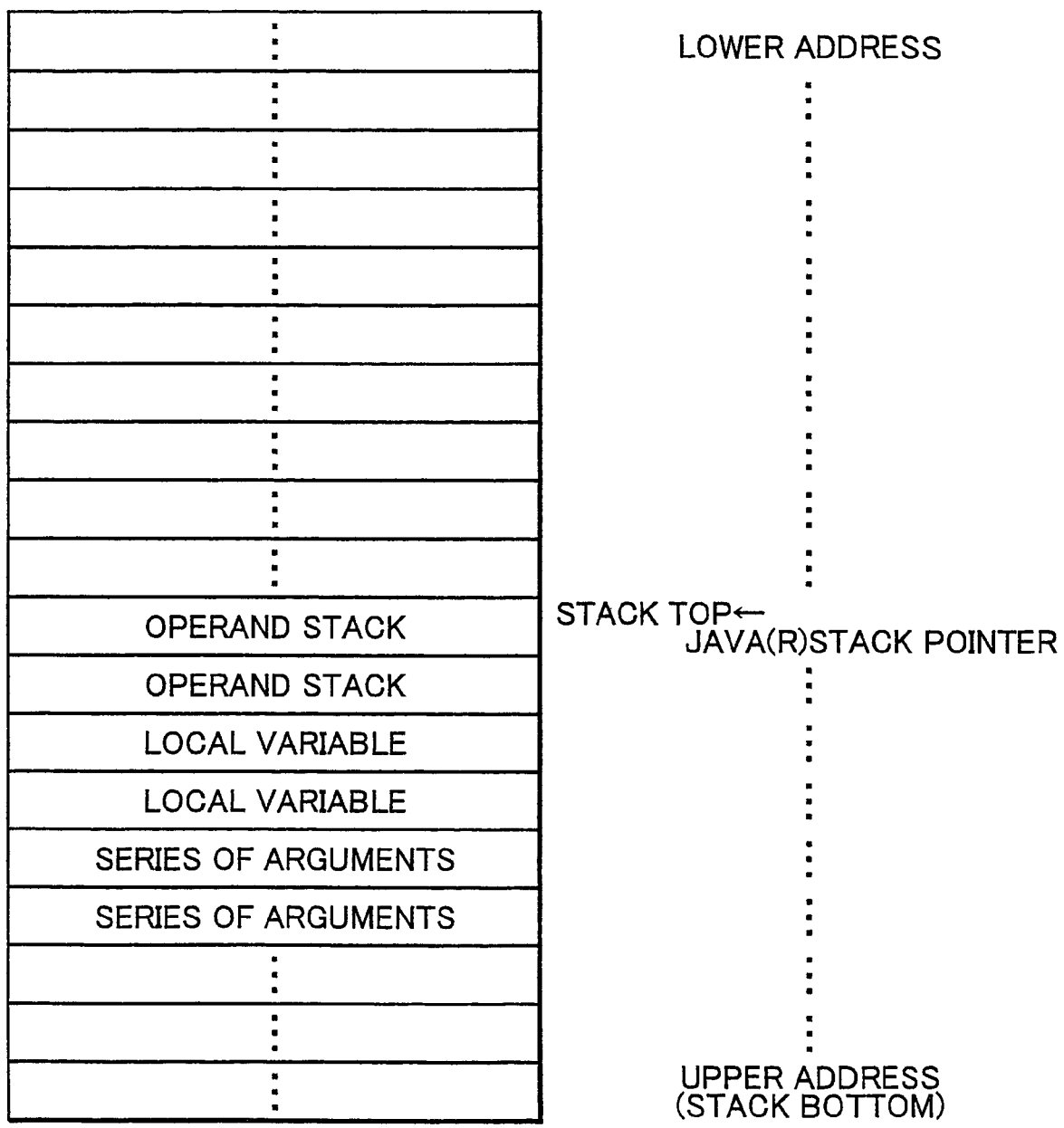
FIG. 30 is a representation, showing the stack structure of Java (which is a registered trademark).

FIG. 30 shows an example of the Java (which is a registered trademark) stack structure. In FIG. 30, there is shown the Java (which is a registered trademark) stack structure which corresponds to processing of one method (which corresponds to a function in the C-language). In practice, it has a structure in which the stack structures of the number which corresponds to method calls which have been made so far are stacked downward.

Figure 31:
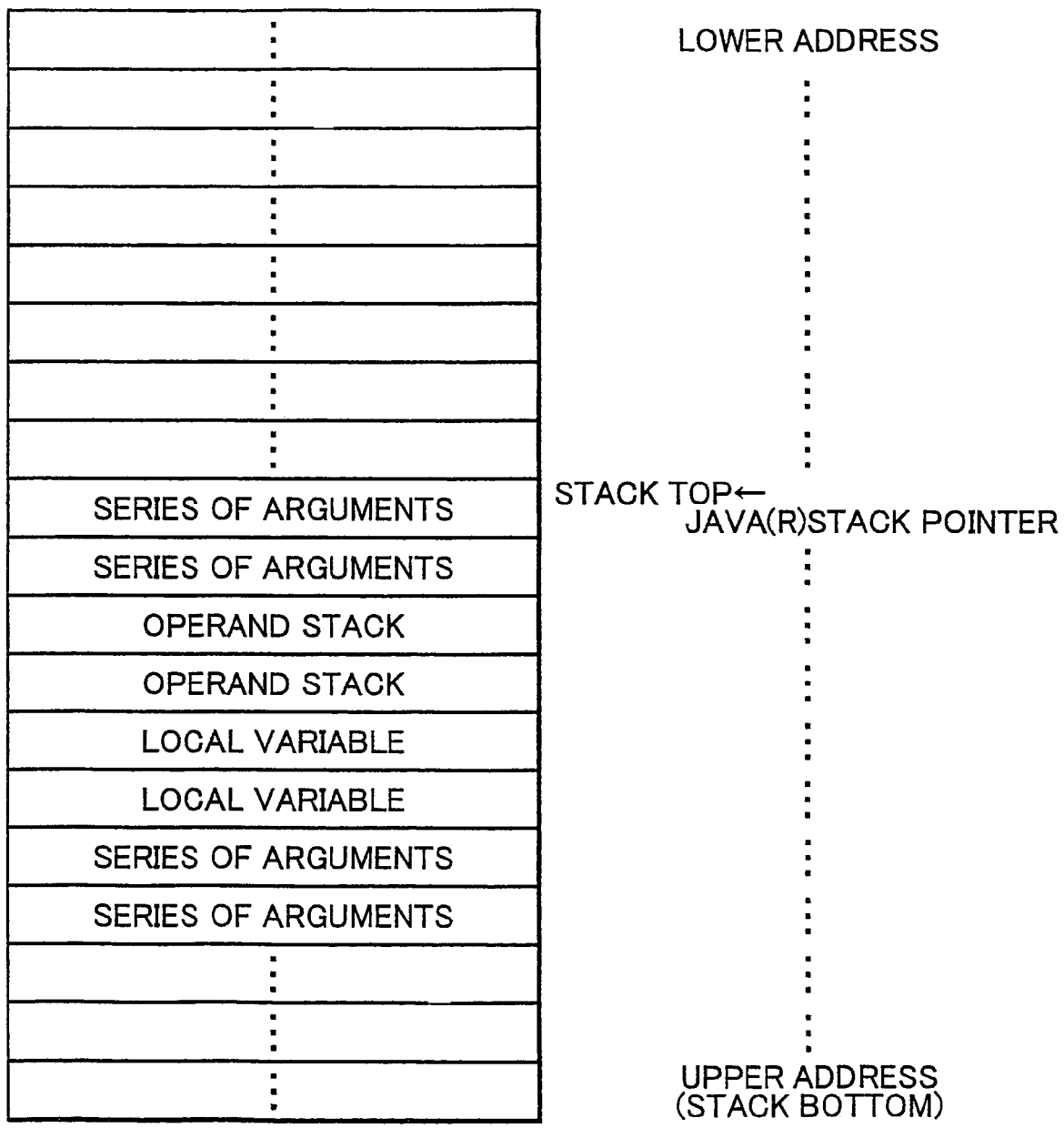
FIG. 31 is a representation, showing the stack structure of Java (which is a registered trademark) immediately after arguments have been generated.

Next, description will be given about how this stack structure is generated (or changed) by a new method call in the Java (which is a registered trademark) language. First, the method calling side which calls the new method executes a push instruction for the stack top. Thereby, an argument is set which is used for processing inside of the method. The Java (which is a registered trademark) stack structure immediately after these series of arguments have been generated is shown in FIG. 31. These series of arguments are used to deliver a value which is necessary for processing on the method side which is called, from the method calling side to the called method side.

Next, a method call is executed. A return Java (which is a registered trademark) address from the method retreats to the C-language stack. This address retreat is not directly related to the Java (which is a registered trademark) stack structure, and thus, its description is omitted. By this method call, the control of the Java (which is a registered trademark) program is shifted to the method side which has been called. If a retreat of the used register is necessary, the called Java (which is a registered trademark) method allows these register values to retreat to the C-language stack. This retreat of the register is not directly related to the Java (which is a registered trademark) stack structure, and thus, its description is omitted.

Figure 32:
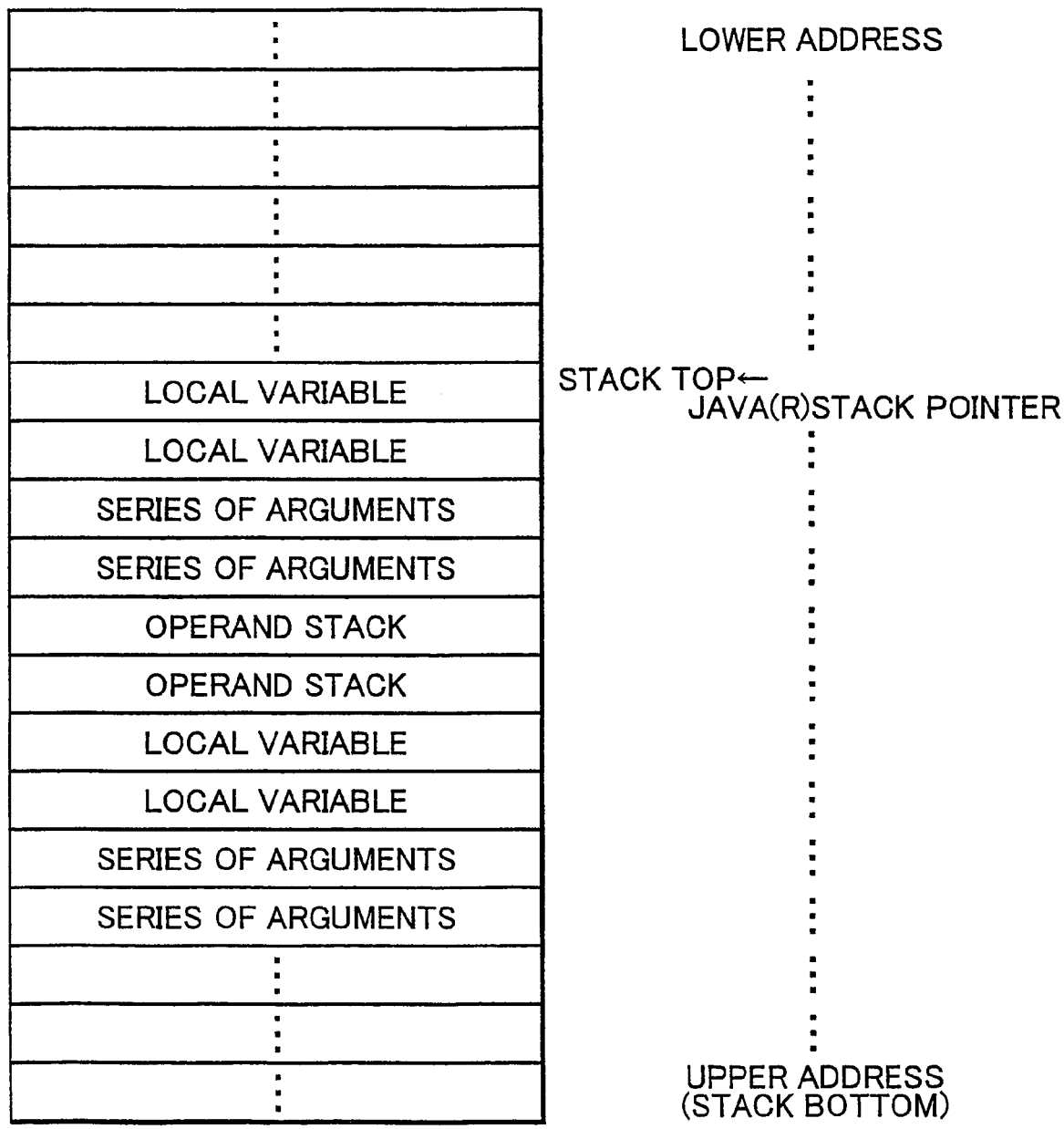
FIG. 32 is a representation, showing the stack structure of Java (which is a registered trademark) immediately after local-variable areas have been generated.

Next, in the method which has been called, in order to generate an area for the local variable which becomes necessary for processing executed by the method, the value which is equivalent to the size of the area of the local variable is subtracted from the value of the Java (which is a registered trademark) stack pointer. The Java (which is a registered trademark) stack structure immediately after this local-variable area has been generated is shown in FIG. 32.

In the method which has been called, thereafter, the processing of the method is executed by accessing the argument or the local variable, using SP-relative read and write instructions which is a Java (which is a registered trademark) stack-pointer relative address designation.

Figure 33:
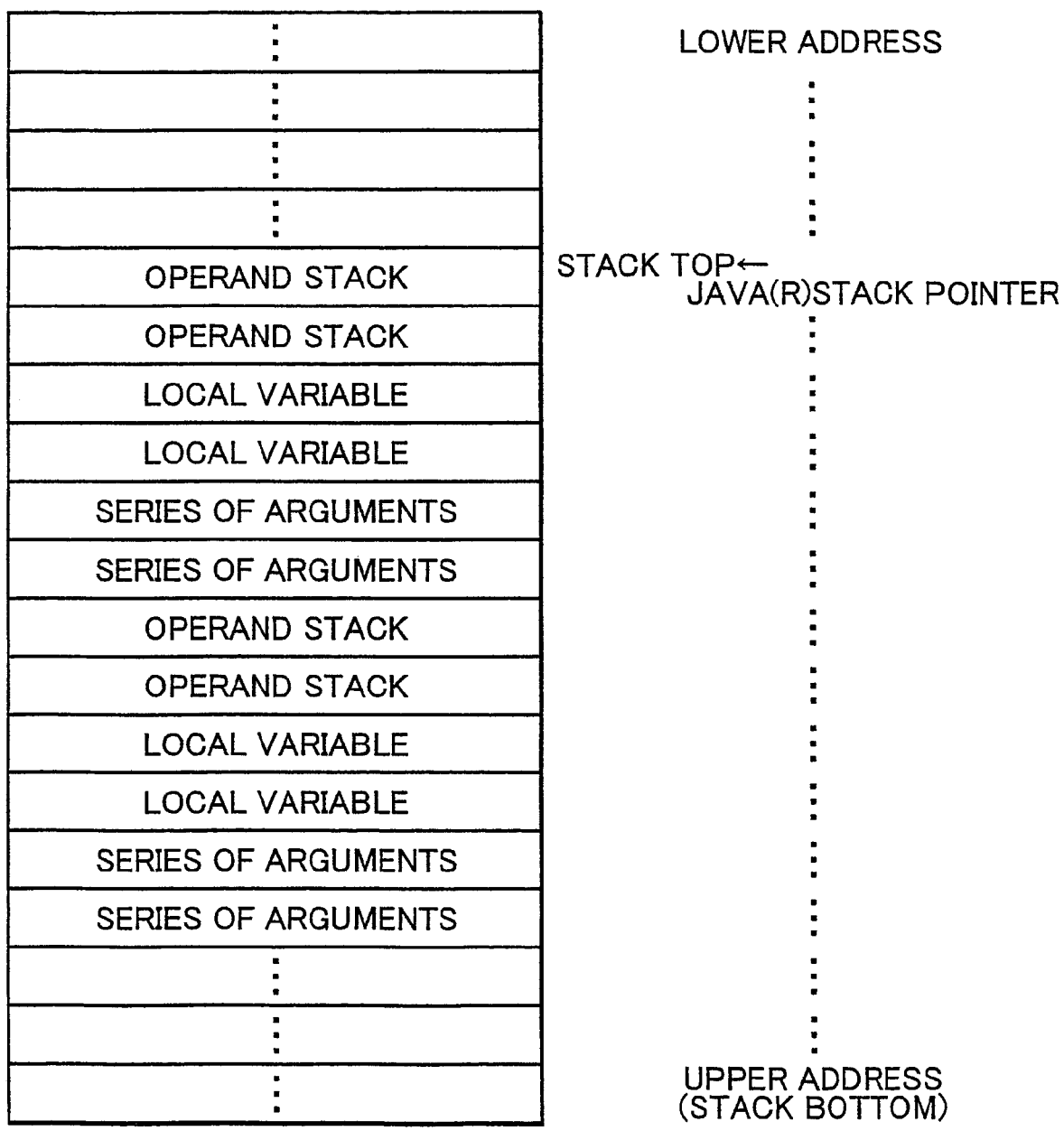
FIG. 33 is a representation, showing the stack structure of Java (which is a registered trademark) immediately while function processing is being executed.

The Java (which is a registered trademark) language is a stack-directed language. Hence, the operand of Java (which is a registered trademark) instructions is necessarily designated as the Java (which is a registered trademark) stack-pointer relativeness. For example, the operand is not obviously designated for an add instruction, but is automatically set to the top and second of the Java (which is a registered trademark) stack. Therefore, in order to execute the add instruction, the Java (which is a registered trademark) interpreter executes the pop instruction twice. Thereby, it reads two values out of the operand stack inside of the Java (which is a registered trademark) stack, and then, executes an addition. That result is stored, by executing the push instruction, in the top of the operand stack inside of the Java (which is a registered trademark) stack. The Java (which is a registered trademark) stack structure during the period when this processing is executed is shown in FIG. 33.

In the method which has been called, if necessary, another method can be called further. At the time when the processing in the called method is completed, the operand stack inside of the Java (which is a registered trademark) stack becomes empty. Then, in order to discard the local-variable area and the series of arguments, the value which is equivalent to their total size is added to the Java (which is a registered trademark) stack pointer. The Java (which is a registered trademark) stack structure at this time is returned to the Java (which is a registered trademark) stack structure before the Java (which is a registered trademark) method calling processing starts. The Java (which is a registered trademark) stack structure at this time is shown in FIG. 30.

Figure 34:
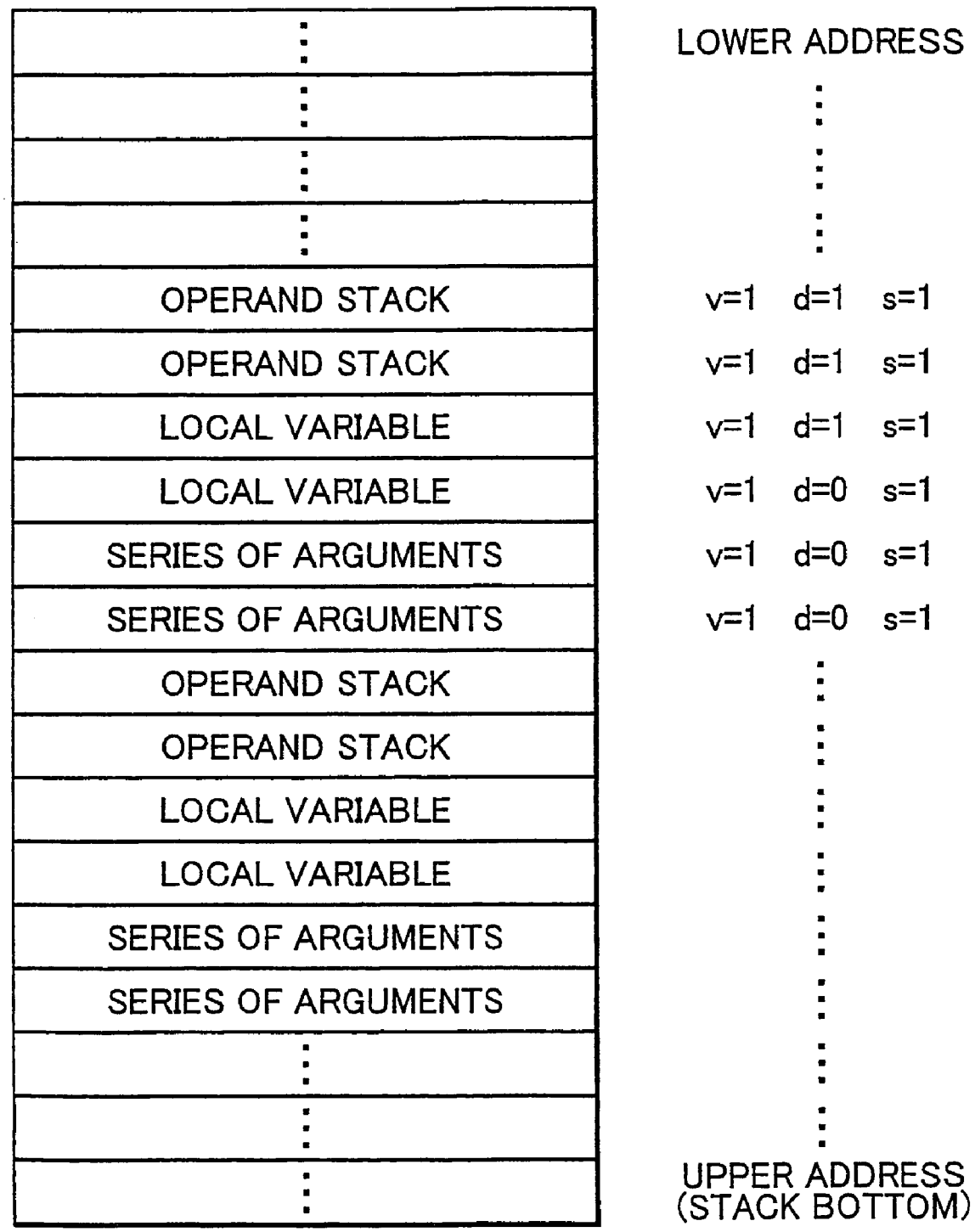
FIG. 34 is a representation, showing the state of cache lines while the function processing is being executed.
Figure 35:
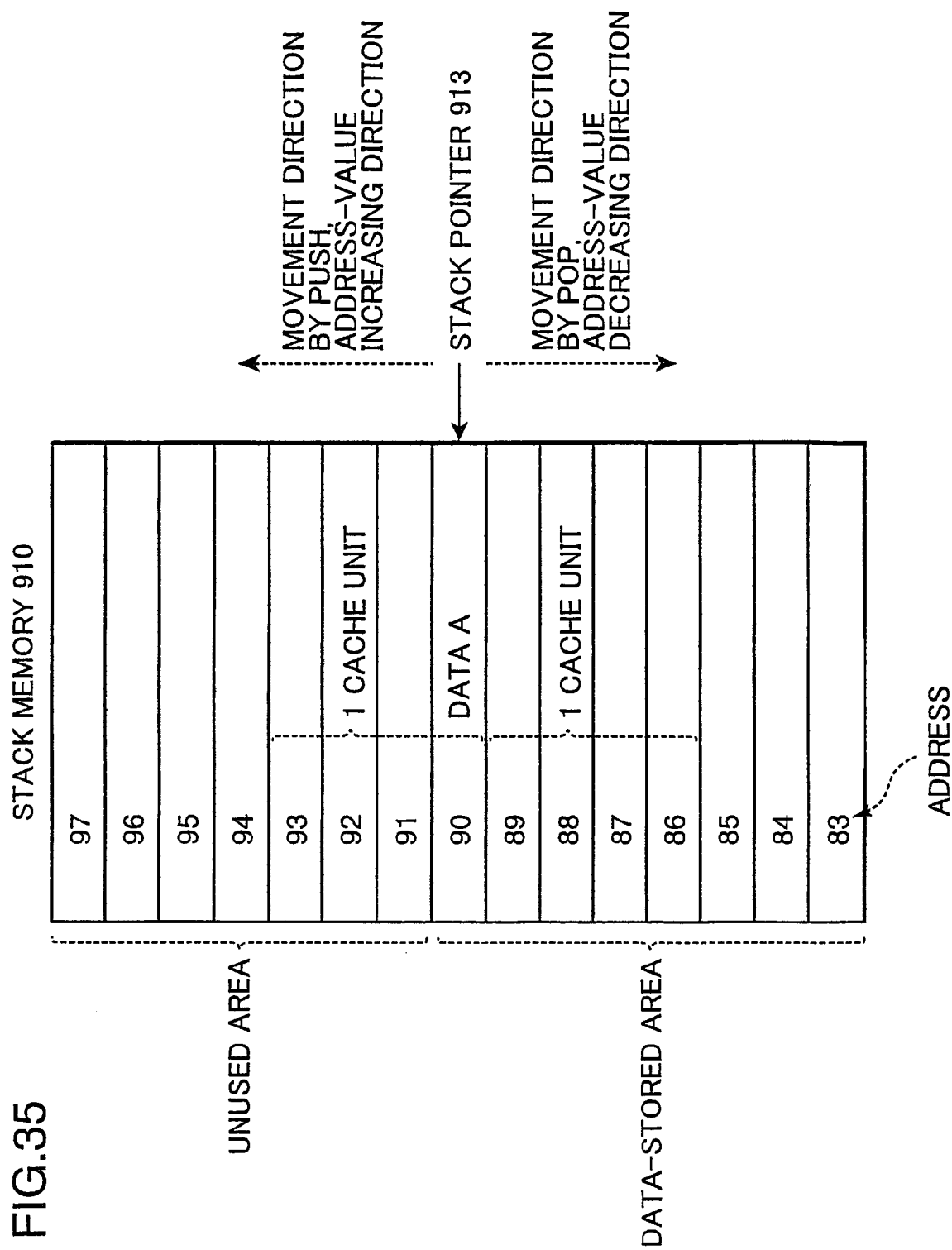
FIG. 35 is a representation, showing the state in which the contents of one unit are read into a cache memory from a main memory unit when a cache miss has taken place by a push in a conventional stack cache system.
Figure 36:
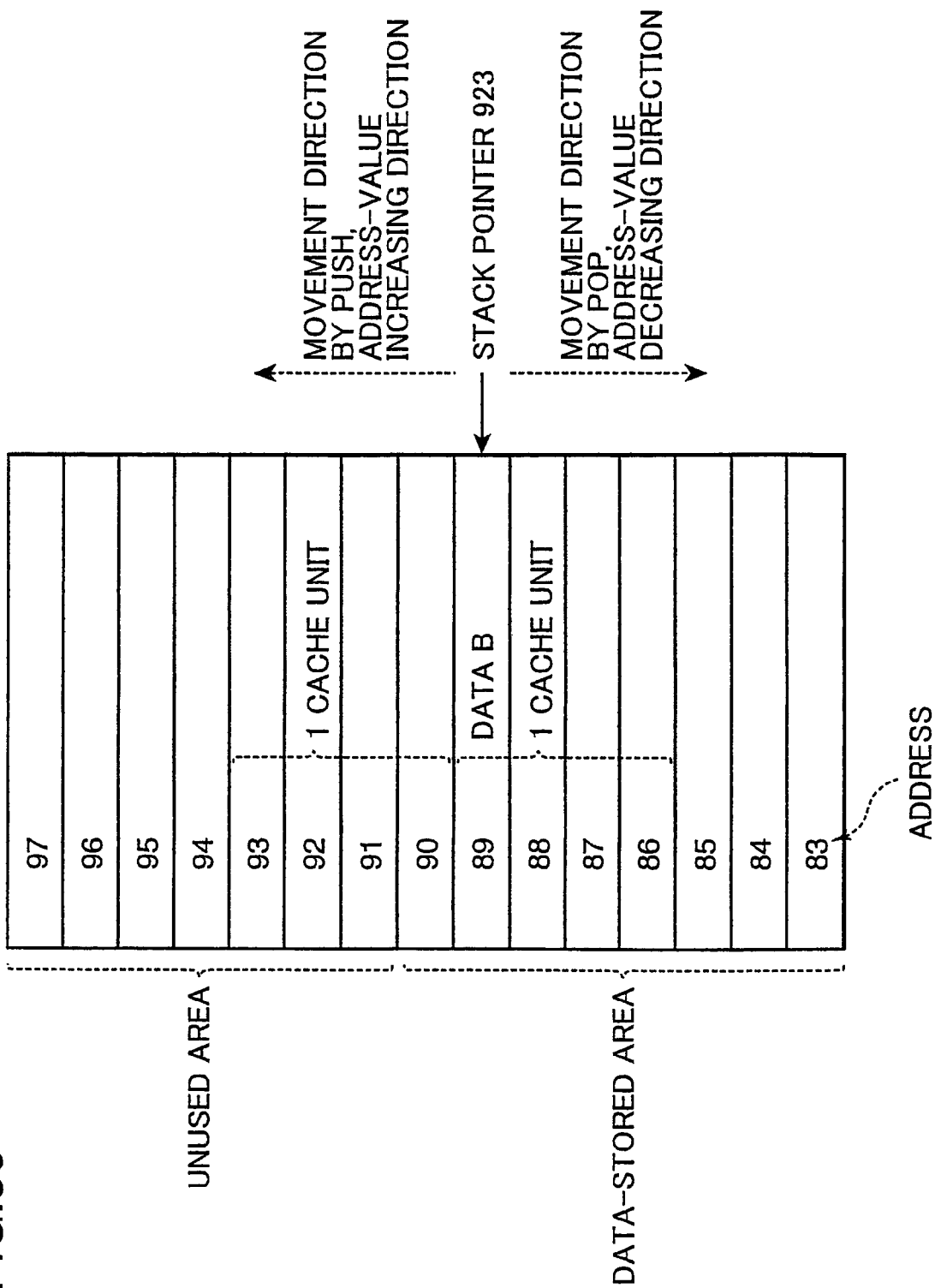
FIG. 36 is a representation, showing the state in which the contents of one unit are written back to the main memory unit read from the cache memory when a cache miss has taken place by a pop in the conventional stack cache system.
Figure 37:
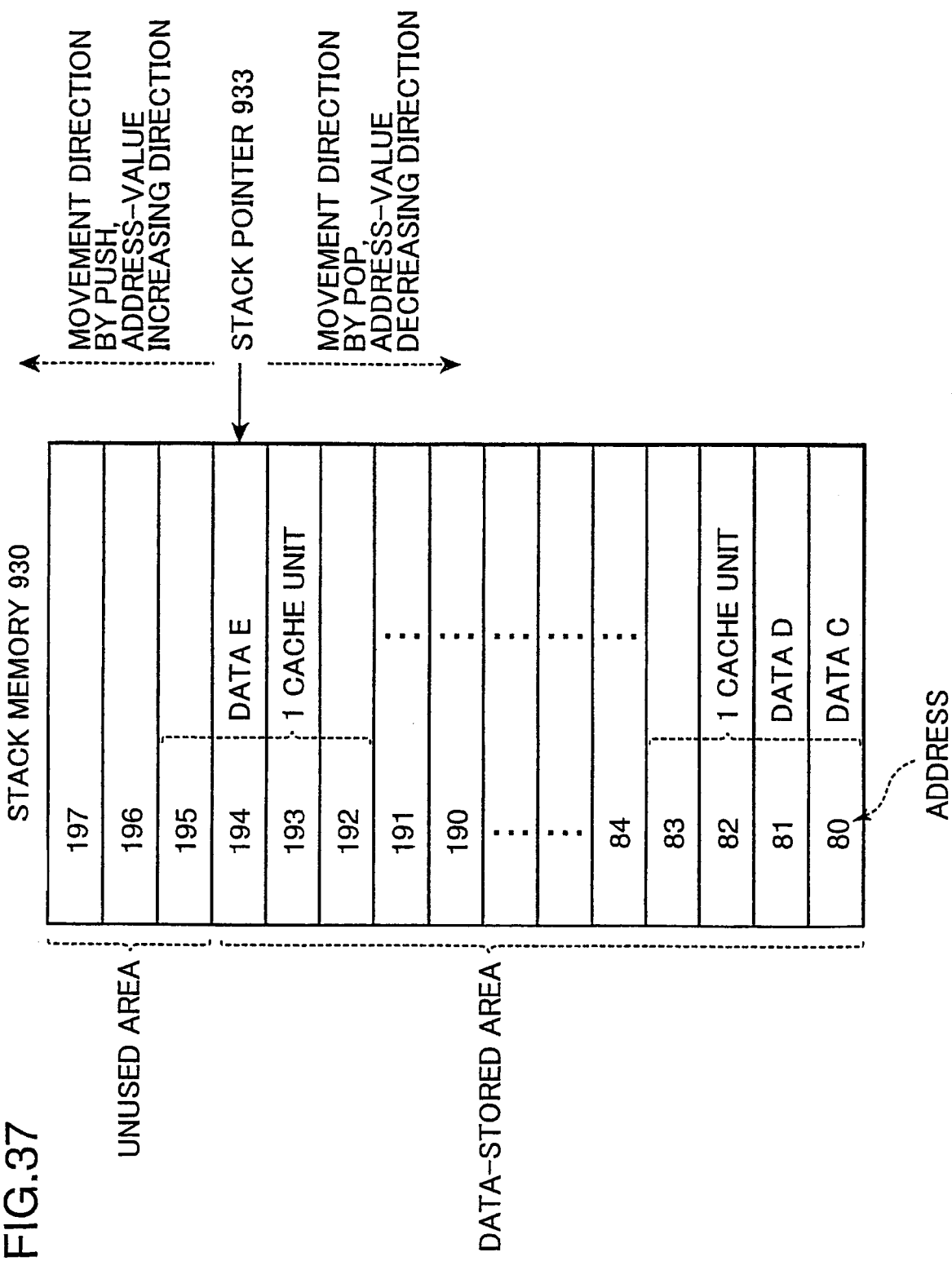
Figure 38:
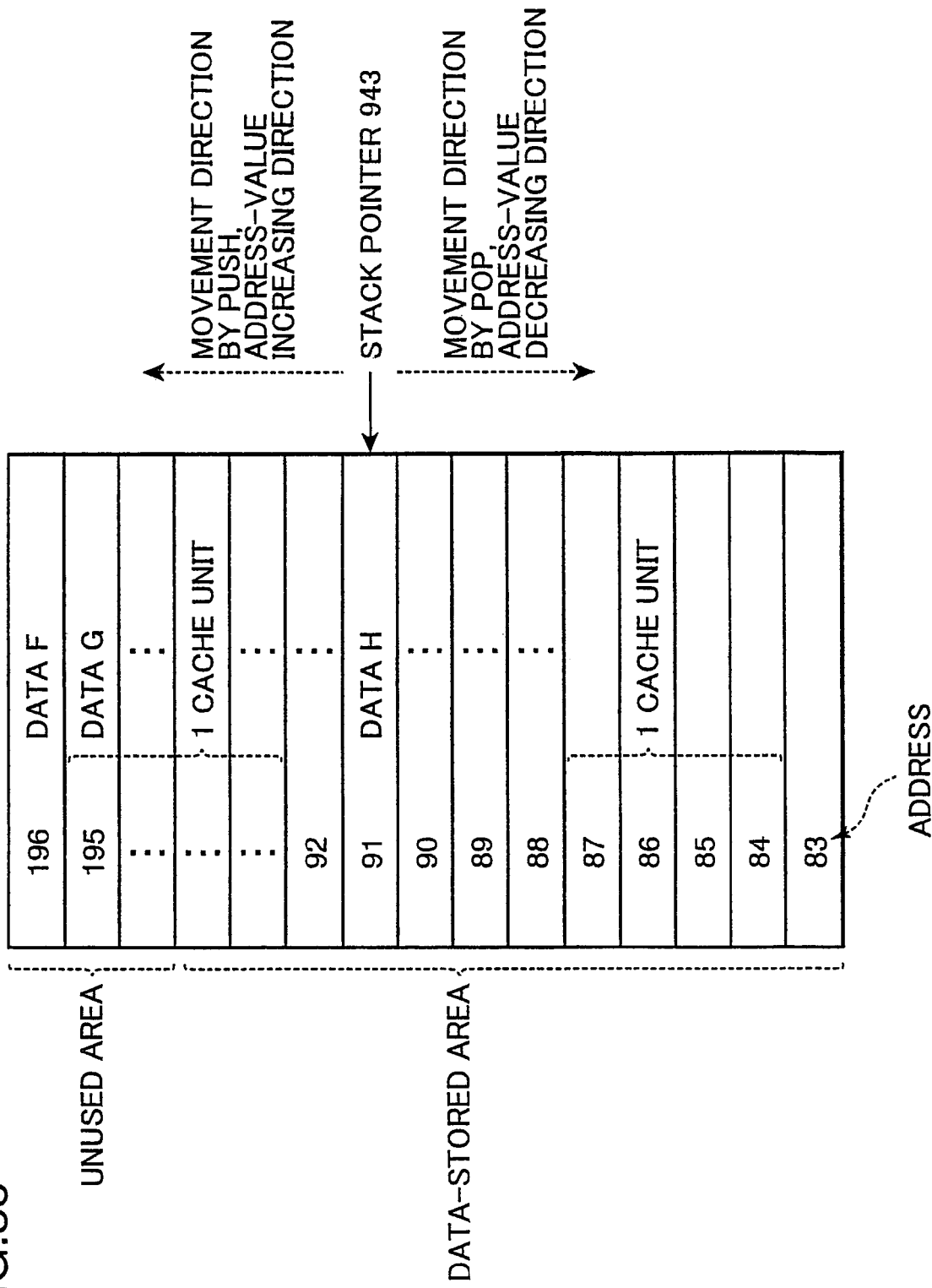
FIG. 38 is a representation, showing the state in which the data in an address area of lower values than the address indicated with a stack pointer will highly probably be read consecutively soon by a pop.

In the above described execution of the Java (which is a registered trademark) method calling processing, FIG. 34 shows the state of a cache line during the period when this processing is executed. As shown in FIG. 34, the stack-flag of the line generated for this method calling processing is set to 1. In addition, the Java (which is a registered trademark) stack pointer goes away from the stack bottom. Thereby, write-back to the line which is apart from the stack pointer is executed while a transfer-busy response signal is off. The state in which the dirty-flag of that line is set to 0 is also shown in FIG. 34.

(5. Brief Description of Embodiments)

(1) A data memory cache unit, which is used between an arithmetic unit and a main memory unit accessed by the arithmetic unit, comprises: a data holding section which includes a plurality of data areas for holding data, the data held in each of the plurality of data areas being read from and written in the main memory unit at one time, each of the plurality of data areas being divided into a plurality of small areas, and the data held in each of the plurality of small areas being read from and written in the arithmetic unit at one time; and a control section in which, if there is a consecutive-writing demand from the arithmetic unit for writing of data into consecutive addresses of the main memory unit and if a cache miss takes place in an object data area which is the data area that corresponds to an address outputted by the arithmetic unit, then the object data area is opened, and thereafter, if an object small area which is the small area that corresponds to the address outputted by the arithmetic unit in the object data area is adjacent to a data area boundary which is the boundary of the object data area located in the direction where the consecutive writing is earlier executed with respect to the order of addresses, then refill of data is not executed into the object data area from the main memory unit, and the data outputted by the arithmetic unit is written in the object small area, and if the object small area is not adjacent to the data area boundary, then refill of data is executed into the object data area from the main memory unit, and the data outputted by the arithmetic unit is written in the object small area.

In the data memory cache unit (1), if a cache miss has taken place when consecutive writing is executed into consecutive addresses from the arithmetic unit, the control section does not refill the useless data from the main memory unit into the data area into which the writing should be executed, after the data area has been opened. This heightens the speed of memory access. In addition, according to whether or not the small area into which the writing should be executed is adjacent to the data area boundary, the control section selects whether or not the refill of data into the data area after opened should be omitted. In other words, when a cache miss has taken place if the small area into which the writing should be executed is not on the data area boundary, the control section refills the data from the main memory unit into the data area after opened. Therefore, the arithmetic unit can start to execute the consecutive writing, not only from the address which corresponds to the small area which is adjacent to the data area boundary, but also from the address which corresponds to the small area which is not adjacent to the data area boundary.

(2) A data memory cache unit is the data memory cache unit (1), wherein the control section includes: a push-access detection portion which detects the consecutive-writing demand from the arithmetic unit; a cache-miss decision portion which decides whether or not there is a cache miss with respect to the object data area if the push-access detection portion detects the consecutive-writing demand; a boundary decision portion which decides whether or not the object small area is adjacent to the data area boundary if the push-access detection portion detects the consecutive-writing demand; a data-area opening portion which opens the object data area if the cache-miss decision portion decides that a cache miss has taken place; a refill portion which, in a case that the data-area opening portion opens the object data area, when the boundary decision portion makes a negative decision, refills data into the object data area opened by the data-area opening portion from the main memory unit, and when the boundary decision portion makes a positive decision, does not refill data into the object data area opened by the data-area opening portion from the main memory unit; and a data writing portion which writes the data outputted by the arithmetic unit in the object small area if the push-access detection portion detects the consecutive-writing demand.

In the data memory cache unit (2): the push-access detection portion detects the consecutive-writing demand; the cache-miss decision portion decides whether or not there is a cache miss with respect to the object data area; the boundary decision portion decides whether or not the object small area is adjacent to the data area boundary; the data-area opening portion opens the object data area according to the decision made by the cache-miss decision portion; the refill portion refills data into the opened object data area according to the decision made by the boundary decision portion; and the data writing portion writes the data from the arithmetic unit into the object small area. Therefore, the control section can easily realize the processing of omitting the refill of data into the opened data area according to whether or not the small area into which the writing of data should be executed is adjacent to the data area boundary.

(3) A data memory cache unit is the data memory cache unit (2), wherein the data holding section includes a plurality of valid-flag holding portions which hold a plurality of valid-flags that respectively show whether the plurality of data areas are opened or unopened; and further in a case that the valid-flag which corresponds to the object data area is set to show the opening, when the boundary decision portion makes a negative decision, the refill portion refills data into the object data area from the main memory unit, and when the boundary decision portion makes a positive decision, the refill portion does not refill data into the object data area from the main memory unit.

In the data memory cache unit(3), the data holding section includes the valid-flag holding portions, and not only if the object data area is opened but also if the valid-flag which corresponds to the object data area shows the opening of the object data area, the refill portion selects whether or not the refill of data should be executed into the object data area from the main memory unit, according to the position of the object small area. Therefore, also when the object data area is opened, useless refill is avoided, thereby making the speed of memory access still higher. In addition, when the object small area is not adjacent to the data area boundary, the refill portion reads data into the object data area from the main memory unit. Therefore, the arithmetic unit can start to execute the consecutive writing, not only from the address which corresponds to the small area which is adjacent to the data area boundary, but also from the address which corresponds to the small area which is not adjacent to the data area boundary.

(4) A data memory cache unit is the data memory cache unit (2) or (3), wherein the data holding section further includes a plurality of stack-flag holding portions which hold a plurality of stack-flags that respectively show whether the plurality of data areas have been used in either consecutive writing or consecutive read-out; and the control section further includes a stack-flag setting portion which, when the boundary decision portion makes a positive decision, sets the stack-flag which corresponds to the object data area on the positive side after the data writing portion finishes writing the data, and when the boundary decision portion makes a negative decision, does not change the stack-flag which corresponds to the object data area after the data writing portion finishes writing the data.

In the data memory cache unit (4), the data holding section includes the stack-flag holding portions, and the control section includes the stack-flag setting portion which operates the stack-flag according to the position of the object small area after the data has been written. Hence, in the process of consecutive writing, the control section can be configured to write back beforehand to the main memory unit the data of the data area whose writing is completed, using the period when a data bus is not in operation, before the data area is opened when a cache miss takes place. In this case, using the stack-flag, the data of the data area which has not been allocated to the stack can be prevented from being uselessly written back. In addition, in the process of consecutive read-out, the control section can be configured to refill the data beforehand into the data area before read-out is executed, from the main memory unit. Even in this case, using the stack-flag, the data of the data area which has not been allocated to the stack can be prevented from being uselessly refilled.

(5) A data memory cache unit is any one of the data memory cache units (2) to (4), wherein the plurality of data areas correspond to an intermediately significant digital part of the addresses of the main memory unit, each of the plurality of small areas corresponds to a less significant digital part of the addresses of the main memory unit, and one or more data areas correspond to the identical value of the intermediately significant digital part of the addresses of the main memory unit; the data holding section further includes a plurality of tag holding portions which hold a plurality of tags that respectively show a more significant digital part of the addresses of the data held in the plurality of data areas; the control section further includes an address extract portion which extracts the more significant digital part, the intermediately significant digital part and the less significant digital part from the address outputted by the arithmetic unit; the cache-miss decision portion compares the value shown in the tag that corresponds to each of the one or more data areas which correspond to the intermediately significant digital part extracted by the address extract portion with the more significant digital part extracted by the address extract portion, and thereby, decides that a cache miss has taken place if there is no coincidence between them; the boundary decision portion decides whether or not the small area that corresponds to the less significant digital part extracted by the address extract portion of the plurality of small areas is adjacent to the boundary located in the direction where the consecutive writing is earlier executed of the data area to which the small area belongs with respect to the order of addresses, and thereby, decides whether or not the object small area is adjacent to the data area boundary; the data-area opening portion opens one of the one or more data areas that correspond to the intermediately significant digital part extracted by the address extract portion, if the push-access detection portion detects the consecutive-writing demand, and if the cache-miss decision portion decides that a cache miss has taken place, and thereby, opens the object data area; the control section further includes a tag updating portion which updates the tag that corresponds to the data area opened by the data-area opening portion, so that the tag comes to hold the more significant digital part extracted by the address extract portion; and the data writing portion writes the data outputted by the arithmetic unit into the small area as the object small area, which corresponds to the less significant digital part extracted by the address extract portion in the data area that corresponds to the intermediately significant digital part extracted by the address extract portion and corresponds to the tag which holds the more significant digital part extracted by the address extract portion.

In the data memory cache (5): the data holding section includes the plurality of tag holding portions; the address extract portion extracts each digital part of address from the address outputted by the arithmetic unit; the cache-miss decision portion makes a decision on a cache miss, based on the tag which corresponds to the digital part of address and the data area which have been extracted by the address extract portion; the boundary decision portion decides whether or not the object small area is adjacent to the data area boundary, based on the extracted digital part of address; the data-area opening portion opens the data area, based on the digital part of address extracted by the address extract portion; the tag updating portion updates the tag that corresponds to the opened data area; and the data writing portion writes the data outputted by the arithmetic unit, based on the tag and the digital part of address which has been extracted by the address extract portion. Therefore, the control section can realize more easily and properly the processing of omitting the refill of data into and the processing of writing data in the opened data area according to whether or not the small area into which writing should be executed is adjacent to the data area boundary.

It should be noted that, according to the present invention, the less significant digital part of the addresses of the main memory unit is the part which is adjacent to the lower side of the intermediately significant part. The embodiments of the present invention have already shown an example in which each small area corresponds to the third and fourth digits except the first and second digits from the least significant digit of the addresses. Thus, the less significant digital part not necessarily includes down to the least significant digital part.

(6) A data memory cache unit, which is used between an arithmetic unit and a main memory unit accessed by the arithmetic unit, comprises: a data holding section which includes a plurality of data areas that correspond to addresses of the main memory unit and hold the data on the corresponding addresses; and a control section in which, if consecutive read-out is executed which is read-out of data from consecutive addresses of the main memory unit to the arithmetic unit, then opens the data area in which consecutive read-out is completed of the data holding section, without writing back to the main memory unit the data held in the data area in which the consecutive read-out is completed.

In the data memory cache unit (6), when consecutive read-out is executed from consecutive addresses by the arithmetic unit, the control section opens the data area in which the read-out has been executed, without writing the data held in the data area back to the main memory unit. No trouble arises even though the data area is opened, because it only holds the data which will not be read out again any more by consecutive read-out. Besides, the data held in the data area is useless data, and thus, there is no need to write it back to the main memory unit. Thus, the control section opens the data area holding the useless data without writing it back. This heightens the speed of memory access, without hindering the arithmetic unit from working properly.

(7) A data memory cache unit is the data memory cache unit (6), wherein the data held in each of the plurality of data areas is read from and written in the main memory unit at one time, each of the plurality of data areas is divided into a plurality of small areas, and the data held in each of the plurality of small areas is read from and written in the arithmetic unit at one time; and the control section, if there is a consecutive read-out demand from the arithmetic unit for the read-out of data from consecutive addresses of the main memory unit, then reads out data to the arithmetic unit from an object small area which is the small area that corresponds to the address outputted by the arithmetic unit in an object data area which is the data area that corresponds to the address outputted by the arithmetic unit, and besides, if the object small area is adjacent to a data area boundary which is the boundary of the object data area located in the direction where the consecutive read-out is later executed with respect to the order of addresses, then opens the object data area without writing the data back to the main memory unit from the object data area, and if the object small area is not adjacent to the data area boundary, then does not open the object data area.

In the data memory cache unit (7), the control section selects whether or not the object data area should be opened, according to whether or not the small area in which read-out is to be executed is adjacent to the data area boundary. In other words, if the small area in which read-out is to be executed is on the data area boundary, the control section opens the object data area. If it is not on the data area boundary, it does not open it. Therefore, the arithmetic unit can complete the consecutive read-out, not only at the address which corresponds to the small area which is adjacent to the data area boundary, but also at the address which corresponds to the small area which is not adjacent to the data area boundary.

(8) A data memory cache unit is the data memory cache unit (7), wherein the data holding section further includes a plurality of valid-flag holding portions which hold a plurality of valid-flags that respectively show whether the plurality of data areas are opened or unopened; and the control section sets the valid-flag which corresponds to the object data area to show the opening, and thereby, opens the object data area.

In the data memory cache unit (8), the control section sets the valid-flag on a predetermined side, and thereby, opens the object data area. This makes it easy to open the object data area.

(9) A data memory cache unit is the data memory cache unit (8), wherein the control section includes: a pop-access detection portion which detects the consecutive read-out demand from the arithmetic unit; a boundary decision portion which decides whether or not the object small area is adjacent to the data area boundary if the pop-access detection portion detects the consecutive read-out demand; a data read-out portion which reads out the data of the object small area to the arithmetic unit if the pop-access detection portion detects the consecutive read-out demand; and a valid-flag setting portion which, when the boundary decision portion makes a positive decision, after the data read-out portion reads out the data, sets the valid-flag which corresponds to the object data area to show the opening without writing the data back to the main memory unit from the object data area, and if the object small area is not adjacent to the data area boundary, does not change the valid-flag which corresponds to the object data area.

In the data memory cache unit (9), the pop-access detection portion detects the consecutive read-out demand, the boundary decision portion decides whether or not the object small area is adjacent to the data area boundary, the data read-out portion reads out the data of the object small area to the arithmetic unit, and the valid-flag setting portion sets the valid-flag according to the decision by the boundary decision portion. Therefore, the control section can easily realize the processing of opening the object data area according to whether or not the small area in which read-out is to be executed is adjacent to the data area boundary.

(10) A data memory cache unit, which is used between an arithmetic unit and a main memory unit accessed by the arithmetic unit, comprises: a data holding section which includes a plurality of data areas for holding data, the data held in each of the plurality of data areas being read from and written in the main memory unit at one time, each of the plurality of data areas being divided into a plurality of small areas, and the data held in each of the plurality of small areas being read from and written in the arithmetic unit at one time; and a control section in which, if there is a consecutive read-out demand from the arithmetic unit for the read-out of data from consecutive addresses of the main memory unit, then data is read out to the arithmetic unit from an object small area which is the small area that corresponds to the address outputted by the arithmetic unit in an object data area which is the data area that corresponds to the address outputted by the arithmetic unit, and besides, if the object small area is adjacent to a data area boundary which is the boundary of the object data area located in the direction where the consecutive read-out is later executed with respect to the order of addresses, a setting is executed for inhibiting data from being written back to the main memory unit from the object data area when the object data area is opened, and if the object small area is not adjacent to the data area boundary, then the setting is not executed.

In the data memory cache unit (10), when consecutive read-out is executed from consecutive addresses by the arithmetic unit, the control section executes the setting of the data area in which the read-out has been executed for inhibiting data from being written back to the main memory unit when the data area is opened. This heightens the speed of memory access. In addition, according to whether or not the small area in which read-out is to be executed is adjacent to the data area boundary, the control section selects whether or not the setting for inhibiting the write-back should be executed. In other words, when a cache miss has taken place if the small area in which read-out is to be executed is on the data area boundary, the control section executes the setting for inhibiting the write-back. On the other hand, if it is not on the data area boundary, it does not execute it. Therefore, the arithmetic unit can complete the consecutive read-out, not only at the address which corresponds to the small area which is adjacent to the data area boundary, but also at the address which corresponds to the small area which is not adjacent to the data area boundary.

(11) A data memory cache unit is the data memory cache unit (10), wherein the data holding section further includes a plurality of dirty-flag holding portions which hold a plurality of dirty-flags that respectively show whether or not the data held in the plurality of data areas coincides with the data held in the corresponding address by the main memory unit; and the control section, to execute the setting, sets the dirty-flag which corresponds to the object data area to show the coincidence.

In the data memory cache unit (11), the data holding section further includes the dirty-flag holding portions. The control section sets the dirty-flag on a predetermined side, and thereby, executes the setting for inhibiting the write-back. This allows the control section to easily execute the setting for inhibiting the write-back.

(12) A data memory cache unit is the data memory cache unit (11), wherein the control section includes: a pop-access detection portion which detects the consecutive read-out demand from the arithmetic unit; a boundary decision portion which decides whether or not the object small area is adjacent to the data area boundary if the pop-access detection portion detects the consecutive read-out demand; a data read-out portion which reads out the data of the object small area to the arithmetic unit if the pop-access detection portion detects the consecutive read-out demand; and a dirty-flag setting portion which, when the boundary decision portion makes a positive decision, after the data read-out portion reads out the data, sets the dirty-flag which corresponds to the object data area to show the coincidence, and when the boundary decision portion makes a negative decision, does not change the dirty-flag which corresponds to the object data area.

In the data memory cache unit (12): the pop-access detection portion detects the consecutive read-out demand; the boundary decision portion decides whether or not the object small area is adjacent to the data area boundary; the data read-out portion reads out the data of the object small area to the arithmetic unit; and the dirty-flag setting portion sets the dirty-flag according to the decision of the boundary decision portion. Therefore, the control section can easily realize the processing of setting the inhibition of the write-back according to whether or not the small area in which read-out is to be executed is adjacent to the data area boundary.

(13) A data memory cache unit is the data memory cache unit (9) or (12), wherein the data holding section further includes a plurality of stack-flag holding portions which hold a plurality of stack-flags that respectively show whether the plurality of data areas have been used in either consecutive writing or consecutive read-out; and the control section further includes a stack-flag setting portion which, when the boundary decision portion makes a positive decision, sets the stack-flag which corresponds to the object data area on the positive side after the data read-out portion finishes reading out the data, and when the boundary decision portion makes a negative decision, does not change the stack-flag which corresponds to the object data area after the data read-out portion finishes reading out the data.

In the data memory cache unit (13), the data holding section includes the stack-flag holding portions, and the control section includes the stack-flag setting portion which operates the stack-flag according to the position of the object small area after the data has been read out. Hence, in the process of consecutive read-out, the control section is configured to write back beforehand to the main memory unit the data of the data area whose read-out is completed, using the period when a data bus is not in operation, before the data area is opened when a cache miss takes place. In this case, using the stack-flag, the data of the data area which is not allocated to the stack can be prevented from being uselessly written back.

(14) A data memory cache unit is the data memory cache unit (9), (12) or (13), wherein the plurality of data areas correspond to an intermediately significant digital part of the addresses of the main memory unit, each of the plurality of small areas corresponds to a less significant digital part of the addresses of the main memory unit, and one or more data areas correspond to the identical value of the intermediately significant digital part of the addresses of the main memory unit; the data holding section further includes a plurality of tag holding portions which hold a plurality of tags that respectively show a more significant digital part of the addresses of the data held in the plurality of data areas; the control section further includes an address extract portion which extracts the more significant digital part, the intermediately significant digital part and the less significant digital part from the address outputted by the arithmetic unit; the boundary decision portion decides whether or not the small area that corresponds to the less significant digital part extracted by the address extract portion of the plurality of small areas is adjacent to the boundary located in the direction where the consecutive read-out is later executed of the data area to which the small area belongs with respect to the order of addresses, and thereby, decides whether or not the object small area is adjacent to the data area boundary; and the data read-out portion reads out the data of the small area as the object small area to the arithmetic unit, which corresponds to the less significant digital part extracted by the address extract portion in the data area that corresponds to the intermediately significant digital part extracted by the address extract portion and corresponds to the tag which holds the more significant digital part extracted by the address extract portion.

In the data memory cache unit (14): the data holding section includes the plurality of tag holding portions; the address extract portion extracts each digital part of address from the address outputted by the arithmetic unit; the boundary decision portion decides whether or not the object small area is adjacent to the data area boundary, based on the extracted digital part of address; and the data read-out portion reads out data to the arithmetic unit, based on the tag and the digital part of address which has been extracted by the address extract portion. Therefore, the control section can more easily open the useless data area in which the consecutive read-out is completed without writing back the data of it, or set the inhibition of the write-back when the useless data area is opened.

(15) A data memory cache unit, which is used between an arithmetic unit and a main memory unit accessed by the arithmetic unit, comprises: a data holding section which includes a plurality of data areas that correspond to addresses of the main memory unit and hold the data on the corresponding addresses; and a control section which, during the period when consecutive writing is executed which is writing of data into consecutive addresses of the main memory unit from the arithmetic unit and during the period when a data bus for transferring data between the data holding section and the main memory unit is not in operation, writes the data back to the main memory unit from the data area in the data holding section which is located in the direction where the consecutive writing is earlier executed than the consecutive writing that is presently executed with respect to the order of addresses.

In the data memory cache unit (15), during the period when consecutive writing is executed, using the period (i.e., vacant time) when a data bus is not in operation, the control section writes back beforehand to the main memory unit the data of the data area located in the direction where the consecutive writing is earlier executed than the consecutive writing that is presently executed with respect to the order of addresses, before the data area is opened. Thereby, when the control section opens later the data area in which the consecutive writing is likely to be completed and thus read-out is unlikely to be immediately executed, it does not need to execute write-back. This heightens the speed of memory access.

(16) A data memory cache unit is the data memory cache unit (15), wherein the control section includes: a push-access detection portion which detects the consecutive-writing demand from the arithmetic unit; an offset calculation portion which, if the push-access detection portion detects the consecutive-writing demand, then calculates an offset address that is the address located a predetermined distance apart in the direction where the consecutive writing is earlier executed from the address outputted by the arithmetic unit; a cache-miss decision portion which decides whether or not there is a cache miss with respect to the offset address; a transfer-busy decision portion which decides whether or not the data bus is in operation; and a write-back portion which, if the cache-miss decision portion decides that there is no cache miss and if the transfer-busy decision portion decides that the data bus is not in operation, writes the data back to the main memory unit from the data area which corresponds to the offset address.

In the data memory cache (16): the push-access detection portion detects the consecutive-writing demand, the offset calculation portion calculates an offset address; the cache-miss decision portion decides whether or not there is a cache miss with respect to the offset address; the transfer-busy decision portion decides whether or not the data bus is in operation; and the write-back portion, writes the data back to the main memory unit from the data area which corresponds to the offset address, according to the decision of the cache-miss decision portion and the decision of the transfer-busy decision portion. Therefore, using the period when a data bus is not in operation, the control section can easily and properly realize the processing of writing back beforehand to the main memory unit the data of the data area which is likely to be the data area in which the consecutive writing is completed, before the data area is opened.

(17) A data memory cache unit is the data memory cache unit (16), wherein the plurality of data areas correspond to an intermediately significant digital part of the addresses of the main memory unit, and one or more data areas correspond to the identical value of the intermediately significant digital part; each of the plurality of data areas is divided into a plurality of small areas which corresponds to a less significant digital part of the address; the data held in each of the plurality of data areas is read from and written in the main memory unit at one time, and the data held in each of the plurality of small areas is read from and written in the arithmetic unit at one time; the data holding section further includes a plurality of tag holding portions which hold a plurality of tags that respectively show a more significant digital part of the addresses of the data held in the plurality of data areas; the control section further includes an address extract portion which extracts the more significant digital part, the intermediately significant digital part and the less significant digital part from the address outputted by the arithmetic unit; the offset calculation portion, if the push-access detection portion detects the consecutive-writing demand, then calculates as the offset address the address located a predetermined distance apart in the direction where the consecutive writing is earlier executed from the address represented with the intermediately significant digital part and the more significant digital part that are extracted by the address extract portion; and the cache-miss decision portion compares the value shown in the tag that corresponds to each of the one or more data areas which correspond to the intermediately significant digital part of the offset address with the more significant digital part of the offset address, and thereby, decides that a cache miss has taken place if there is no coincidence between them.

In the data memory cache unit (17): the data holding section includes the plurality of tag holding portions; the address extract portion extracts each digital part of address from the address outputted by the arithmetic unit; the offset calculation portion calculates the offset address, based on the digital part of address extracted by the address extract portion; and the cache-miss decision portion makes a decision on a cache miss, based on the digital part of address extracted by the address extract portion and the tag that corresponds to the data area. Therefore, the control section can easily calculate the offset address and decide on a cache miss.

(18) A data memory cache unit, which is used between an arithmetic unit and a main memory unit accessed by the arithmetic unit, comprises: a data holding section which includes a plurality of data areas that correspond to addresses of the main memory unit and hold the data on the corresponding addresses; and a control section which, during the period when consecutive read-out is executed which is read-out of data from consecutive addresses of the main memory unit to the arithmetic unit an& during the period when a data bus for transferring data between the data holding section and the main memory unit is not in operation, writes the data back to the main memory unit from the data area in the data holding section which is located in the direction where the consecutive writing is earlier executed than the consecutive writing that is presently executed with respect to the order of addresses.

In the data memory cache unit (18): during the period when consecutive read-out is executed, using the period (i.e., vacant time) when a data bus is not in operation, the control section writes back beforehand to the main memory unit the data of the data area located in the direction where the consecutive read-out is earlier executed than the consecutive read-out that is presently executed with respect to the order of addresses, before the data area is opened. Thereby, when the control section opens later the data area in which the consecutive read-out is likely to be completed and thus read-out is unlikely to be executed again, it does not need to execute write-back. This heightens the speed of memory access.

(19) A data memory cache unit is the data memory cache unit (18), wherein the control section includes: a pop-access detection portion which detects the consecutive read-out demand from the arithmetic unit; an offset calculation portion which, if the pop-access detection portion detects the consecutive read-out demand, then calculates an offset address that is the address located a predetermined distance apart in the direction where the consecutive read-out is earlier executed from the address outputted by the arithmetic unit; a cache-miss decision portion which decides whether or not there is a cache miss with respect to the offset address; a transfer-busy decision portion which decides whether or not the data bus is in operation; a write-back portion which, if the cache-miss decision portion decides that there is no cache miss and if the transfer-busy decision portion decides that the data bus is not in operation, writes the data back to the main memory unit from the data area which corresponds to the offset address.

In the data memory cache unit (19): the pop-access detection portion detects the consecutive read-out demand, the offset calculation portion calculates an offset address; the cache-miss decision portion decides whether or not there is a cache miss with respect to the offset address; the transfer-busy decision portion decides whether or not the data bus is in operation; and the write-back portion, writes the data back to the main memory unit from the data area which corresponds to the offset address, according to the decision of the cache-miss decision portion and the decision of the transfer-busy decision portion. Therefore, using the period when a data bus is not in operation, the control section can easily and properly realize the processing of writing back beforehand to the main memory unit the data of the data area which is likely to be the data area in which the consecutive writing is completed, before the data area is opened.

(20) A data memory cache unit is the data memory cache unit (19), wherein the plurality of data areas correspond to an intermediately significant digital part of the addresses of the main memory unit, and one or more data areas correspond to the identical value of the intermediately significant digital part; each of the plurality of data areas is divided into a plurality of small areas which corresponds to a less significant digital part of the address; the data held in each of the plurality of data areas is read from and written in the main memory unit at one time, and the data held in each of the plurality of small areas is read from and written in the arithmetic unit at one time; the data holding section further includes a plurality of tag holding portions which hold a plurality of tags that respectively show a more significant digital part of the addresses of the data held in the plurality of data areas; the control section further includes an address extract portion which extracts the more significant digital part, the intermediately significant digital part and the less significant digital part from the address outputted by the arithmetic unit; the offset calculation portion, if the pop-access detection portion detects the consecutive read-out demand, then calculates as the offset address the address located a predetermined distance apart in the direction where the consecutive read-out is earlier executed from the address represented with the intermediately significant digital part and the more significant digital part that are extracted by the address extract portion; and the cache-miss decision portion compares the value shown in the tag that corresponds to each of the one or more data areas which correspond to the intermediately significant digital part of the offset address with the more significant digital part of the offset address, and thereby, decides that a cache miss has taken place if there is no coincidence between them.

In the data memory cache (20): the data holding section includes the plurality of tag holding portions; the address extract portion extracts each digital part of address from the address outputted by the arithmetic unit; the offset calculation portion calculates the offset address, based on the digital part of address extracted by the address extract portion; and the cache-miss decision portion makes a decision on a cache miss, based on the digital part of part extracted by the address extract portion and the tag that corresponds to the data area. Therefore, the control section can easily calculate the offset address and decide on a cache miss.

(21) A data memory cache unit is the data memory cache unit (16), (17), (19) or (20), wherein the data holding section further includes a plurality of stack-flag holding portions which hold a plurality of stack-flags that respectively show whether or not the plurality of data areas have been used in either consecutive writing or consecutive read-out; and if the cache-miss decision portion decides that there is no cache miss and if the transfer-busy decision portion decides that the data bus is not in operation, and in addition, only when the stack-flag which corresponds to the data area that corresponds to the offset address is set on the positive side, the write-back portion writes the data back to the main memory unit from the data area which corresponds to the offset address.

In the data memory cache unit (21), the data holding section includes the stack-flag holding portions, and the write-back portion refers to the stack-flag as well and selects whether or not the data should be written back. This prevents the write-back portion from uselessly writing back the data of the data area in which writing except the consecutive writing has been executed, or the data area in which read-out except the consecutive read-out has been executed.

(22) A data memory cache unit is the data memory cache unit (16), (17), (19), (20) or (21), wherein the data holding section further includes a plurality of valid-flag holding portions which hold a plurality of valid-flags that respectively show whether the plurality of data areas are opened or unopened; and if the cache-miss decision portion decides that there is no cache miss and if the transfer-busy decision portion decides that the data bus is not in operation, and in addition, only when the valid-flag which corresponds to the data area that corresponds to the offset address is set on the unopened side, the write-back portion writes the data back to the main memory unit from the data area which corresponds to the offset address.

In the data memory cache unit (22), the data holding section includes the valid-flag holding portions, and the write-back portion refers to the valid-flag as well and selects whether or not the data should be written back. This prevents the write-back portion from uselessly writing back the data of the data area which is already opened.

(23) A data memory cache unit, which is used between an arithmetic unit and a main memory unit accessed by the arithmetic unit, comprises: a data holding section which includes a plurality of data areas that correspond to addresses of the main memory unit and hold the data on the corresponding addresses; and a control section which, during the period when consecutive read-out is executed which is read-out of data from consecutive addresses of the main memory unit to the arithmetic unit and during the period when a data bus for transferring data between the data holding section and the main memory unit is not in operation, refills data from the main memory unit into the data area in the data holding section which is located in the direction where the consecutive read-out is later executed than the consecutive read-out that is presently executed with respect to the order of addresses.

In the data memory cache unit (23): during the period when consecutive read-out is executed, using the period (i.e., vacant time) when a data bus is not in operation, the control section refills data beforehand from the main memory unit into the data area where read-out is expected to be executed later. This reduces the time for the control section to refill data from the main memory unit into the data area from which the data should be read out. As a result, memory access becomes speedier.

(24) A data memory cache unit is the data memory cache unit (23), wherein the control section includes: a pop-access detection portion which detects the consecutive read-out demand from the arithmetic unit; an offset calculation portion which, if the pop-access detection portion detects the consecutive read-out demand, then calculates an offset address that is the address located a predetermined distance apart in the direction where the consecutive read-out is later executed from the address outputted by the arithmetic unit; a transfer-busy decision portion which decides whether or not the data bus is in operation; and a refill portion which refills data from the main memory unit into the data area which corresponds to the offset address if the transfer-busy decision portion decides that the data bus is not in operation.

In the data memory cache unit (24): the pop-access detection portion detects the demand to execute consecutive read-out, the offset calculation portion calculates an offset address; the transfer-busy decision portion decides whether or not the data bus is in operation; and the refill portion refill s data from the main memory unit into the data area which corresponds to the offset address, according to the decision of the transfer-busy decision portion. Therefore, the control section can easily realize the processing of, using the period when a data bus is not in operation, refilling data beforehand from the main memory unit into the data area where read-out is expected to be executed.

(25) A data memory cache unit is the data memory cache unit (24), wherein the data holding section further includes a plurality of stack-flag holding portions which hold a plurality of stack-flags that respectively show whether the plurality of data areas have been used in either consecutive writing or consecutive read-out; and if the transfer-busy decision portion decides that the data bus is not in operation, and in addition, only when the stack-flag which corresponds to the data area that corresponds to the offset address is set on the positive side, the refill portion refills data into the data area which corresponds to the offset address from the main memory unit.

In the data memory cache unit (25), the data holding section includes the stack-flag holding portions, and the refill portion refers to the stack-flag as well and selects whether or not the data should be refilled. This prevents the refill portion from executing useless refill into the data area which has not become an object for the consecutive writing, i.e., the data area which will not become an object for the consecutive read-out.

(26) A data memory cache unit is the data memory cache unit (24) or (25), wherein the data holding section further includes a plurality of valid-flag holding portions which hold a plurality of valid-flags that respectively show whether the plurality of data areas are opened or unopened; and if the transfer-busy decision portion decides that the data bus is not in operation, and in addition, only when the valid-flag which corresponds to the data area that corresponds to the offset address is set to show the opening, the refill portion refills data into the data area which corresponds to the offset address from the main memory unit.

In the data memory cache unit (26), the data holding section includes the valid-flag holding portions, and the refill portion refers to the valid-flag as well and selects whether or not the data should be refilled. This prevents the refill portion from executing useless refill into the unopened data area.

(27) A data memory cache unit is any one of the data memory cache units (24) to (26), wherein the plurality of data areas correspond to an intermediately significant digital part of the addresses of the main-memory unit, and one or more data areas correspond to the identical value of the intermediately significant digital part; each of the plurality of data areas is divided into a plurality of small areas which corresponds to a less significant digital part of the address; the data held in each of the plurality of data areas is read from and written in the main memory unit at one time, and the data held in each of the plurality of small areas is read from and written in the arithmetic unit at one time; the data holding section further includes a plurality of tag holding portions which hold a plurality of tags that respectively show a more significant digital part of the addresses of the data held in the plurality of data areas; the control section further includes an address extract portion which extracts the more significant digital part, the intermediately significant digital part and the less significant digital part from the address outputted by the arithmetic unit; the offset calculation portion, if the pop-access detection portion detects the consecutive read-out demand, then calculates as the offset address the address located a predetermined distance apart in the direction where the consecutive read-out is later executed from the address represented with the intermediately significant digital part and the more significant digital part that are extracted by the address extract portion.

In the data memory cache unit (27): the data holding section includes the plurality of tag holding portions; the address extract portion extracts each digital part of address from the address outputted by the arithmetic unit; and the offset calculation portion calculates the offset address, based on the digital part of address extracted by the address extract portion. Therefore, the control section can easily calculate the offset address.

(28) A data memory cache unit is the data memory cache unit (27), wherein the control section further includes: a cache-miss decision portion which compares the value shown in the tag that corresponds to each of the one or more data areas which correspond to the middle part of the offset address with the more significant digital part of the offset address, decides that a cache miss has taken place with the offset address if there is no coincidence between them; a data-area opening portion which opens one of the one or more data areas which correspond to the intermediately significant digital part of the offset address if the cache-miss decision portion decides that a cache miss has taken place; and a tag updating portion which updates the tag that corresponds to the data area opened by the data-area opening portion, so that the tag comes to hold the more significant digital part of the offset address.

In the data memory cache unit (28): based on the offset address calculated by an offset-address calculation portion and the tag which is related to the data area that corresponds to the offset address, the cache-miss decision portion makes a decision on a cache miss with respect to the offset address; the data-area opening portion opens the data area based on the offset address calculated by the offset-address calculation portion; and the tag updating portion updates the tag which is related to the opened data area. Therefore, the control section can refill data from the main memory unit into the data area that corresponds to the offset address, even though there is a cache miss in the offset address.

(29) A data memory cache system comprises: any one of the data memory cache units (1) to (28); an arithmetic unit which is connected to the data memory cache unit; and a main memory unit which is connected to the data memory cache unit and is accessed by the arithmetic unit.

Since the data memory cache system (29) comprises: the data memory cache unit according to the present invention; the arithmetic unit connected to this unit; and the main memory unit which is connected to the data memory cache unit and is accessed by the arithmetic unit, the system heightens the speed of memory access.

This application is based on Japanese patent application serial No. 2003-078026, filed in Japan Patent Office on Mar. 20, 2003, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A data memory cache unit which is used between an arithmetic unit and a main memory unit accessed by the arithmetic unit, comprising:

a data holding section which includes a plurality of data areas for holding data, the data held in each of the plurality of data areas being read from and written in the main memory unit at one time, each of the plurality of data areas being divided into a plurality of small areas, and the data held in each of the plurality of small areas being read from and written in the arithmetic unit at one time; and a control section in which, if there is a consecutive-writing demand from the arithmetic unit for writing of data into consecutive addresses of the main memory unit and if a cache miss takes place in an object data area which is the data area that corresponds to an address outputted by the arithmetic unit, then the object data area is opened, and thereafter, if an object small area which is the small area that corresponds to the address outputted by the arithmetic unit in the object data area is adjacent to a data area boundary which is the boundary of the object data area located in the direction where the consecutive writing is earlier executed with respect to the order of addresses, then refill of data is not executed into the object data area from the main memory unit, and the data outputted by the arithmetic unit is written into the object small area, and if the object small area is not adjacent to the data area boundary, then refill of data is executed into the object data area from the main memory unit, and the data outputted by the arithmetic unit is written into the object small area.

2. The data memory cache unit according to claim 1, wherein the control section includes:

a push-access detection portion which detects the consecutive-writing demand from the arithmetic unit;

a cache-miss decision portion which decides whether or not there is a cache miss with respect to the object data area if the push-access detection portion detects the consecutive-writing demand;

a boundary decision portion which decides whether or not the object small area is adjacent to the data area boundary if the push-access detection portion detects the consecutive-writing demand;

a data-area opening portion which opens the object data area if the cache-miss decision portion decides that a cache miss has taken place;

a refill portion which, in a case that the data-area opening portion opens the object data area, when the boundary decision portion makes a negative decision, refills data into the object data area opened by the data-area opening portion from the main memory unit, and when the boundary decision portion makes a positive decision, does not refill data into the object data area opened by the data-area opening portion from the main memory unit; and a data writing portion which writes the data outputted by the arithmetic unit into the object small area if the push-access detection portion detects the consecutive-writing demand.

3. The data memory cache unit according to claim 2, wherein:

the data holding section further includes a plurality of valid-flag holding portions which hold a plurality of valid-flags that respectively show whether the plurality of data areas are opened or unopened; and further in a case that the valid-flag which corresponds to the object data area is set to show the opening, when the boundary decision portion makes a negative decision, the refill portion refills data into the object data area from the main memory unit, and when the boundary decision portion makes a positive decision, the refill portion does not refill data into the object data area portion from the main memory unit.

4. The data memory cache unit according to claim 2, wherein:

the data holding section further includes a plurality of stack-flag holding portions which hold a plurality of stack-flags that respectively show whether the plurality of data areas have been used in either consecutive writing or consecutive read-out; and the control section further includes a stack-flag setting portion which, when the boundary decision portion makes a positive decision, sets the stack-flag which corresponds to the object data area on the positive side after the data writing portion finishes writing the data, and when the boundary decision portion makes a negative decision, does not change the stack-flag which corresponds to the object data area after the data writing portion finishes writing the data.

5. The data memory cache unit according to claim 2, wherein:

the plurality of data areas correspond to an intermediately significant digital part of the addresses of the main memory unit, each of the plurality of small areas corresponds to a less significant digital part of the addresses of the main memory unit, and one or more data areas correspond to the identical value of the intermediately significant digital part of the addresses of the main memory unit;

the data holding section further includes a plurality of tag holding portions which hold a plurality of tags that respectively show a more significant digital part of the addresses of the data held in the plurality of data areas;

the control section further includes an address extract portion which extracts the more significant digital part, the intermediately significant digital part and the less significant digital part from the address outputted by the arithmetic unit;

the cache-miss decision portion compares the value shown in the tag that corresponds to each of the one or more data areas which correspond to the intermediately significant digital part extracted by the address extract portion with the more significant digital part extracted by the address extract portion, and thereby, decides that a cache miss has taken place if there is no coincidence between them;

the boundary decision portion decides whether or not the small area that corresponds to the less significant digital part extracted by the address extract portion of the plurality of small areas is adjacent to the boundary located in the direction where the consecutive writing is earlier executed of the data area to which the small area belongs with respect to the order of addresses, and thereby, decides whether or not the object small area is adjacent to the data area boundary;

the data-area opening portion opens one of the one or more data areas that correspond to the intermediately significant digital part extracted by the address extract portion, if the push-access detection portion detects the consecutive-writing demand, and if the cache-miss decision portion decides that a cache miss has taken place, and thereby, opens the object data area;

the control section further includes a tag updating portion which updates the tag that corresponds to the data area opened by the data-area opening portion, so that the tag comes to hold the more significant digital part extracted by the address extract portion; and the data writing portion writes the data outputted by the arithmetic unit into the small area as the object small area, which corresponds to the less significant digital part extracted by the address extract portion in the data area that corresponds to the intermediately significant digital part extracted by the address extract portion and corresponds to the tag which holds the more significant digital part extracted by the address extract portion.

6. A data memory cache unit which is used between an arithmetic unit and a main memory unit accessed by the arithmetic unit, comprising:

a data holding section which includes a plurality of data areas that correspond to addresses of the main memory unit and hold the data on the corresponding addresses; and a control section in which, if consecutive read-out is executed which is read-out of data from consecutive addresses of the main memory unit to the arithmetic unit, then opens the data area in which the consecutive read-out is completed of the data holding section, without writing back to the main memory unit the data held in the data area in which the consecutive read-out is completed;

wherein:

the data held in each of the plurality of data areas is read from and written in the main memory unit at one time, each of the plurality of data areas is divided into a plurality of small areas, and the data held in each of the plurality of small areas is read from and written in the arithmetic unit at one time; and the control section, if there is a consecutive read-out demand from the arithmetic unit for the read-out of data from consecutive addresses of the main memory unit, then reads out data to the arithmetic unit from an object small area which is the small area that corresponds to the address outputted by the arithmetic unit in an object data area which is the data area that corresponds to the address outputted by the arithmetic unit, and if the object small area is adjacent to a data area boundary which is the boundary of the object data area located in the direction where the consecutive read-out is later executed with respect to the order of addresses, then opens the object data area without writing the data back to the main memory unit from the object data area, and if the object small area is not adjacent to the data area boundary, then does not open the object data area.

7. The data memory cache unit according to claim 6, wherein:
the data holding section further includes a plurality of valid-flag holding portions which hold a plurality of valid-flags that respectively show whether the plurality of data areas are opened or unopened; and
the control section sets the valid-flag which corresponds to the object data area to show the opening, and thereby, opens the object data area.

8. The data memory cache unit according to claim 7, wherein the control section includes:
a pop-access detection portion which detects the consecutive read-out demand from the arithmetic unit;
a boundary decision portion which decides whether or not the object small area is adjacent to the data area boundary if the pop-access detection portion detects the consecutive read-out demand;
a data read-out portion which reads out the data of the object small area to the arithmetic unit if the pop-access detection portion detects the consecutive read-out demand; and
a valid-flag setting portion which, when the boundary decision portion makes a positive decision, after the data read-out portion reads out the data, sets the valid-flag which corresponds to the object data area to show the opening without writing the data back to the main memory unit from the object data area, and if the object small area is not adjacent to the data area boundary, does not change the valid-flag which corresponds to the object data area.

9. The data memory cache unit according to claim 8, wherein:
the data holding section further includes a plurality of stack-flag holding portions which hold a plurality of stack-flags that respectively show whether the plurality of data areas have been used in either consecutive writing or consecutive read-out; and
the control section further includes a stack-flag setting portion which, when the boundary decision portion makes a positive decision, sets the stack-flag which corresponds to the object data area on the positive side after the data read-out portion finishes reading out the data, and when the boundary decision portion makes a negative decision, does not change the stack-flag which corresponds to the object data area after the data read-out portion finishes reading out the data.

10. The data memory cache unit according to claim 8, wherein:
the plurality of data areas correspond to an intermediately significant digital part of the addresses of the main memory unit, each of the plurality of small areas corresponds to a less significant digital part of the addresses of the main memory unit, and one or more data areas correspond to the identical value of the intermediately significant digital part of the addresses of the main memory unit;
the data holding section further includes a plurality of tag holding portions which hold a plurality of tags that respectively show a more significant digital part of the addresses of the data held in the plurality of data areas;
the control section further includes an address extract portion which extracts the more significant digital part, the intermediately significant digital part and the less significant digital part from the address outputted by the arithmetic unit;
the boundary decision portion decides whether or not the small area that corresponds to the less significant digital part extracted by the address extract portion of the plurality of small areas is adjacent to the boundary located in the direction where the consecutive read-out is later executed of the data area to which the small area belongs with respect to the order of addresses, and thereby, decides whether or not the object small area is adjacent to the data area boundary; and
the data read-out portion reads out the data of the small area as the object small area to the arithmetic unit, which corresponds to the less significant digital part extracted by the address extract portion in the data area that corresponds to the intermediately significant digital part extracted by the address extract portion and corresponds to the tag which holds the more significant digital part extracted by the address extract portion.

11. A data memory cache unit which is used between an arithmetic unit and a main memory unit accessed by the arithmetic unit, comprising:
a data holding section which includes a plurality of data areas for holding data, the data held in each of the plurality of data areas being read from and written in the main memory unit at one time, each of the plurality of data areas being divided into a plurality of small areas, and the data held in each of the plurality of small areas being read from and written in the arithmetic unit at one time; and
a control section in which, if there is a consecutive read-out demand from the arithmetic unit for the read-out of data from consecutive addresses of the main memory unit, then data is read out to the arithmetic unit from an object small area which is the small area that corresponds to the address outputted by the arithmetic unit in an object data area which is the data area that corresponds to the address outputted by the arithmetic unit, and if the object small area is adjacent to a data area boundary which is the boundary of the object data area located in the direction where the consecutive read-out is later executed with respect to the order of addresses, a setting is executed for inhibiting data from being written back to the main memory unit from the object data area when the object data area is opened, and if the object small area is not adjacent to the data area boundary, then the setting is not executed.

12. The data memory cache unit according to claim 11, wherein:
the data holding section further includes a plurality of dirty-flag holding portions which hold a plurality of dirty-flags that respectively show whether or not the data held in the plurality of data areas coincides with the data held in the corresponding address by the main memory unit; and
the control section, to execute the setting, sets the dirty-flag which corresponds to the object data area to show the coincidence.

13. The data memory cache unit according to claim 12, wherein the control section includes:

a pop-access detection portion which detects the consecutive read-out demand from the arithmetic unit;

a boundary decision portion which decides whether or not the object small area is adjacent to the data area boundary if the pop-access detection portion detects the consecutive read-out demand;

a data read-out portion which reads out the data of the object small area to the arithmetic unit if the pop-access detection portion detects the consecutive read-out demand; and a dirty-flag setting portion which, when the boundary decision portion makes a positive decision, after the data read-out portion reads out the data, sets the dirty-flag which corresponds to the object data area to show the coincidence, and when the boundary decision portion makes a negative decision, does not change the dirty-flag which corresponds to the object data area.

14. The data memory cache unit according to claim 13, wherein:

the data holding section further includes a plurality of stack-flag holding portions which hold a plurality of stack-flags that respectively show whether the plurality of data areas have been used in either consecutive writing or consecutive read-out; and the control section further includes a stack-flag setting portion which, when the boundary decision portion makes a positive decision, sets the stack-flag which corresponds to the object data area on the positive side after the data read-out portion finishes reading out the data, and when the boundary decision portion makes a negative decision, does not change the stack-flag which corresponds to the object data area after the data read-out portion finishes reading out the data.

15. The data memory cache unit according to claim 13, wherein:

the plurality of data areas correspond to an intermediately significant digital part of the addresses of the main memory unit, each of the plurality of small areas corresponds to a less significant digital part of the addresses of the main memory unit, and one or more data areas correspond to the identical value of the intermediately significant digital part of the addresses of the main memory unit;

the data holding section further includes a plurality of tag holding portions which hold a plurality of tags that respectively show a more significant digital part of the addresses of the data held in the plurality of data areas;

the control section further includes an address extract portion which extracts the more significant digital part, the intermediately significant digital part and the less significant digital part from the address outputted by the arithmetic unit;

the boundary decision portion decides whether or not the small area that corresponds to the less significant digital part extracted by the address extract portion of the plurality of small areas is adjacent to the boundary located in the direction where the consecutive read-out is later executed of the data area to which the small area belongs with respect to the order of addresses, and thereby, decides whether or not the object small area is adjacent to the data area boundary; and the data read-out portion reads out the data of the small area as the object small area to the arithmetic unit, which corresponds to the less significant digital part extracted by the address extract portion in the data area that corresponds to the intermediately significant digital part extracted by the address extract portion and corresponds to the tag which holds the more significant digital part extracted by the address extract portion.

16. A data memory cache unit which is used between an arithmetic unit and a main memory unit accessed by the arithmetic unit, comprising:

a data holding section which includes a plurality of data areas that correspond to addresses of the main memory unit and hold the data on the corresponding addresses; and a control section which, during the period when consecutive writing is executed which is writing of data into consecutive addresses of the main memory unit from the arithmetic unit and during the period when a data bus for transferring data between the data holding section and the main memory unit is not in operation, writes the data back to the main memory unit from the data area in the data holding section which is located in the direction where the consecutive writing is earlier executed than the consecutive writing that is presently executed with respect to the order of addresses.

17. The data memory cache unit according to claim 16, wherein the control section includes:

a push-access detection portion which detects the consecutive-writing demand from the arithmetic unit;

an offset calculation portion which, if the push-access detection portion detects the consecutive-writing demand, then calculates an offset address that is the address located a predetermined distance apart in the direction where the consecutive writing is earlier executed from the address outputted by the arithmetic unit;

a cache-miss decision portion which decides whether or not there is a cache miss with respect to the offset address;

a transfer-busy decision portion which decides whether or not the data bus is in operation; and a write-back portion which, if the cache-miss decision portion decides that there is no cache miss and if the transfer-busy decision portion decides that the data bus is not in operation, writes the data back to the main memory unit from the data area which corresponds to the offset address.

18. The data memory cache unit according to claim 17, wherein:

the plurality of data areas correspond to an intermediately significant digital part of the addresses of the main memory unit, and one or more data areas correspond to the identical value of the intermediately significant digital part;

each of the plurality of data areas is divided into a plurality of small areas which corresponds to a less significant digital part of the address;

the data held in each of the plurality of data areas is read from and written in the main memory unit at one time, and the data held in each of the plurality of small areas is read from and written in the arithmetic unit at one time;

the data holding section further includes a plurality of tag holding portions which hold a plurality of tags that respectively show a more significant digital part of the addresses of the data held in the plurality of data areas;

the control section further includes an address extract portion which extracts the more significant digital part, the intermediately significant digital part and the less significant digital part from the address outputted by the arithmetic unit;

the offset calculation portion, if the push-access detection portion detects the consecutive-writing demand, then calculates as the offset address the address located a predetermined distance apart in the direction where the consecutive writing is earlier executed from the address represented with the intermediately significant digital part and the more significant digital part that are extracted by the address extract portion; and the cache-miss decision portion compares the value shown in the tag that corresponds to each of the one or more data areas which correspond to the intermediately significant digital part of the offset address with the more significant digital part of the offset address, and thereby, decides that a cache miss has taken place if there is no coincidence between them.

19. The data memory cache unit according to claim 17, wherein:

the data holding section further includes a plurality of stack-flag holding portions which hold a plurality of stack-flags that respectively show whether or not the plurality of data areas have been used in either consecutive writing or consecutive read-out; and if the cache-miss decision portion decides that there is no cache miss and if the transfer-busy decision portion decides that the data bus is not in operation, and in addition, only when the stack-flag which corresponds to the data area that corresponds to the offset address is set on the positive side, the write-back portion writes the data back to the main memory unit from the data area which corresponds to the offset address.

20. The data memory cache unit according to claim 17, wherein:

the data holding section further includes a plurality of valid-flag holding portions which hold a plurality of valid-flags that respectively show whether the plurality of data areas are opened or unopened; and if the cache-miss decision portion decides that there is no cache miss and if the transfer-busy decision portion decides that the data bus is not in operation, and in addition, only when the valid-flag which corresponds to the data area that corresponds to the offset address is set on the unopened side, the write-back portion writes the data back to the main memory unit from the data area which corresponds to the offset address.

21. A data memory cache unit which is used between an arithmetic unit and a main memory unit accessed by the arithmetic unit, comprising:

a data holding section which includes a plurality of data areas that correspond to addresses of the main memory unit and hold the data on the corresponding addresses; and a control section which, during the period when consecutive read-out is executed which is read-out of data from consecutive addresses of the main memory unit to the arithmetic unit and during the period when a data bus for transferring data between the data holding section and the main memory unit is not in operation, writes the data back to the main memory unit from the data area in the data holding section which is located in the direction where the consecutive writing is earlier executed than the consecutive writing that is presently executed with respect to the order of addresses.

22. The data memory cache unit according to claim 21, wherein the control section includes:

a pop-access detection portion which detects the consecutive read-out demand from the arithmetic unit;

an offset calculation portion which, if the pop-access detection portion detects the consecutive read-out demand, then calculates an offset address that is the address located a predetermined distance apart in the direction where the consecutive read-out is earlier executed from the address outputted by the arithmetic unit;

a cache-miss decision portion which decides whether or not there is a cache miss with respect to the offset address;

a transfer-busy decision portion which decides whether or not the data bus is in operation; and a write-back portion which, if the cache-miss decision portion decides that there is no cache miss and if the transfer-busy decision portion decides that the data bus is not in operation, writes the data back to the main memory unit from the data area which corresponds to the offset address.

23. The data memory cache unit according to claim 22, wherein:

the plurality of data areas correspond to an intermediately significant digital part of the addresses of the main memory unit, and one or more data areas correspond to the identical value of the intermediately significant digital part;

each of the plurality of data areas is divided into a plurality of small areas which corresponds to a less significant digital part of the address;

the data held in each of the plurality of data areas is read from and written in the main memory unit at one time, and the data held in each of the plurality of small areas is read from and written in the arithmetic unit at one time;

the data holding section further includes a plurality of tag holding portions which hold a plurality of tags that respectively show a more significant digital part of the addresses of the data held in the plurality of data areas;

the control section further includes an address extract portion which extracts the more significant digital part, the intermediately significant digital part and the less significant digital part from the address outputted by the arithmetic unit;

the offset calculation portion, if the pop-access detection portion detects the consecutive read-out demand, then calculates as the offset address the address located a predetermined distance apart in the direction where the consecutive read-out is earlier executed from the address represented with the intermediately significant digital part and the more significant digital part that are extracted by the address extract portion; and the cache-miss decision portion compares the value shown in the tag that corresponds to each of the one or more data areas which correspond to the intermediately significant digital part of the offset address with the more significant digital part of the offset address, and thereby, decides that a cache miss has taken place if there is no coincidence between them.

24. The data memory cache unit according to claim 22, wherein:

the data holding section further includes a plurality of stack-flag holding portions which hold a plurality of stack-flags that respectively show whether or not the plurality of data areas have been used in either consecutive writing or consecutive read-out; and if the cache-miss decision portion decides that there is no cache miss and if the transfer-busy decision portion decides that the data bus is not in operation, and in addition, only when the stack-flag which corresponds to the data area that corresponds to the offset address is set on the positive side, the write-back portion writes the data back to the main memory unit from the data area which corresponds to the offset address.

25. The data memory cache unit according to claim 22, wherein:
the data holding section further includes a plurality of valid-flag holding portions which hold a plurality of valid-flags that respectively show whether the plurality of data areas are opened or unopened; and
if the cache-miss decision portion decides that there is no cache miss and if the transfer-busy decision portion decides that the data bus is not in operation, and in addition, only when the valid-flag which corresponds to the data area that corresponds to the offset address is set on the unopened side, the write-back portion writes the data back to the main memory unit from the data area which corresponds to the offset address.

26. A data memory cache unit which is used between an arithmetic unit and a main memory unit accessed by the arithmetic unit, comprising:
a data holding section which includes a plurality of data areas that correspond to addresses of the main memory unit and hold the data on the corresponding addresses; and
a control section which, during the period when consecutive read-out is executed which is read-out of data from consecutive addresses of the main memory unit to the arithmetic unit and during the period when a data bus for transferring data between the data holding section and the main memory unit is not in operation, refills data from the main memory unit into the data area in the data holding section which is located in the direction where the consecutive read-out is later executed than the consecutive read-out that is presently executed with respect to the order of addresses.

27. The data memory cache unit according to claim 26, wherein the control section includes:
a pop-access detection portion which detects the consecutive read-out demand from the arithmetic unit;
an offset calculation portion which, if the pop-access detection portion detects the consecutive read-out demand, then calculates an offset address that is the address located a predetermined distance apart in the direction where the consecutive read-out is later executed from the address outputted by the arithmetic unit;
a transfer-busy decision portion which decides whether or not the data bus is in operation; and
a refill portion which refills data from the main memory unit into the data area which corresponds to the offset address if the transfer-busy decision portion decides that the data bus is not in operation.

28. The data memory cache unit according to claim 27, wherein:
the data holding section further includes a plurality of stack-flag holding portions which hold a plurality of stack-flags that respectively show whether the plurality of data areas have been used in either consecutive writing or consecutive read-out; and
if the transfer-busy decision portion decides that the data bus is not in operation, and in addition, only when the stack-flag which corresponds to the data area that corresponds to the offset address is set on the positive side, the refill portion refills data into the data area which corresponds to the offset address from the main memory unit.

29. The data memory cache unit according to claim 27, wherein:
the data holding section further includes a plurality of valid-flag holding portions which hold a plurality of valid-flags that respectively show whether the plurality of data areas are opened or unopened; and
if the transfer-busy decision portion decides that the data bus is not in operation, and in addition, only when the valid-flag which corresponds to the data area that corresponds to the offset address is set to show the opening, the refill portion refills data into the data area which corresponds to the offset address from the main memory unit.

30. The data memory cache unit according to claim 27, wherein:
the plurality of data areas correspond to an intermediately significant digital part of the addresses of the main memory unit, and one or more data areas correspond to the identical value of the intermediately significant digital part;
each of the plurality of data areas is divided into a plurality of small areas which corresponds to the less significant digital part of the address;
the data held in each of the plurality of data areas is read from and written in the main memory unit at one time, and the data held in each of the plurality of small areas is read from and written in the arithmetic unit at one time;
the data holding section further includes a plurality of tag holding portions which hold a plurality of tags that respectively show the more significant digital part of the addresses of the data held in the plurality of data areas;
the control section further includes an address extract portion which extracts the more significant digital part, the intermediately significant digital part and the less significant digital part from the address outputted by the arithmetic unit;
the offset calculation portion, if the pop-access detection portion detects the consecutive read-out demand, then calculates as the offset address the address located a predetermined distance apart in the direction where the consecutive read-out is later executed from the address represented with the intermediately significant digital part and the more significant digital part that are extracted by the address extract portion.

31. The data memory cache unit according to claim 30, wherein the control section further includes:
a cache-miss decision portion which compares the value shown in the tag that corresponds to each of the one or more data areas which correspond to the intermediately significant digital part of the offset address with the more significant digital part of the offset address, decides that a cache miss has taken place with the offset address if there is no coincidence between them;
a data-area opening portion which opens one of the one or more data areas which correspond to the intermediately significant digital part of the offset address if the cache-miss decision portion decides that a cache miss has taken place; and
a tag updating portion which updates the tag that corresponds to the data area opened by the data-area opening portion, so that the tag comes to hold the more significant digital part of the offset address.

32. A data memory cache system, comprising:

a data memory cache unit which is used between an arithmetic unit and a main memory unit accessed by the arithmetic unit, comprising:

a data holding section which includes a plurality of data areas for holding data, the data held in each of the plurality of data areas being read from and written in the main memory unit at one time, each of the plurality of data areas being divided into a plurality of small areas, and the data held in each of the plurality of small areas being read from and written in the arithmetic unit at one time; and a control section in which, if there is a consecutive-writing demand from the arithmetic unit for writing of data into consecutive addresses of the main memory unit and if a cache miss takes place in an object data area which is the data area that corresponds to an address outputted by the arithmetic unit, then the object data area is opened, and thereafter, if an object small area which is the small area that corresponds to the address outputted by the arithmetic unit in the object data area is adjacent to a data area boundary which is the boundary of the object data area located in the direction where the consecutive writing is earlier executed with respect to the order of addresses, then refill of data is not executed into the object data area from the main memory unit, and the data outputted by the arithmetic unit is written into the object small area, and if the object small area is not adjacent to the data area boundary, then refill of data is executed into the object data area from the main memory unit, and the data outputted by the arithmetic unit is written into the object small area;

an arithmetic unit which is connected to the data memory cache unit; and a main memory unit which is connected to the data memory cache unit and is accessed by the arithmetic unit.

* * * * *